US011894632B2

(12) United States Patent
Huang et al.

(10) Patent No.: US 11,894,632 B2
(45) Date of Patent: Feb. 6, 2024

(54) HIGH-SPEED CONNECTOR

(71) Applicant: Cheng Uei Precision Industry Co., LTD., New Taipei (TW)

(72) Inventors: Sheng-Yuan Huang, New Taipei (TW); Chun-Fu Lin, New Taipei (TW); Yun-Chien Lee, New Taipei (TW); Pei-Yi Lin, New Taipei (TW); Yi-Ching Hsu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 234 days.

(21) Appl. No.: 17/567,862

(22) Filed: Jan. 3, 2022

(65) Prior Publication Data

US 2022/0344854 A1 Oct. 27, 2022

(30) Foreign Application Priority Data

Apr. 26, 2021 (CN) ........................ 202120876316.2

(51) Int. Cl.
*H01R 13/405* (2006.01)
*H01R 13/6471* (2011.01)
*H01R 12/72* (2011.01)
*H01R 12/70* (2011.01)

(52) U.S. Cl.
CPC ....... *H01R 13/405* (2013.01); *H01R 13/6471* (2013.01); *H01R 12/707* (2013.01); *H01R 12/727* (2013.01)

(58) Field of Classification Search
CPC ...... H01R 13/40; H01R 13/405; H01R 13/41; H01R 13/6461; H01R 13/6471; H01R 12/70; H01R 12/7005; H01R 12/7011; H01R 12/707; H01R 12/71; H01R 12/712; H01R 12/716; H01R 12/72; H01R 12/722; H01R 12/727
USPC .................................................... 439/79, 701
See application file for complete search history.

(56) References Cited

U.S. PATENT DOCUMENTS

2021/0075164 A1* 3/2021 Chen .................. H01R 13/6471
2022/0344854 A1* 10/2022 Huang ................. H01R 13/405
2022/0344877 A1* 10/2022 Lin .................... H01R 13/6597
2023/0144251 A1* 5/2023 Lee .................... H01R 13/6585 439/607.05
2023/0187881 A1* 6/2023 Lee .................... H01R 13/6585 439/607.05

* cited by examiner

*Primary Examiner* — Khiem M Nguyen
(74) *Attorney, Agent, or Firm* — Cheng-Ju Chiang

(57) ABSTRACT

A high-speed connector includes an insulating housing, and a first terminal assembly mounted in the insulating housing. The first terminal assembly includes a plurality of first terminals, a first base body and a first conductive film. The plurality of the first terminals include at least two first grounding terminals and at least two first signal terminals. At least one portion of a bottom of the first base body extends downward to form at least one first protruding portion. The at least two first signal terminals penetrate through the at least one first protruding portion. The first conductive film is covered to the at least one first protruding portion. The first conductive film has a first metal layer. The first metal layer is electrically connected with the at least two first grounding terminals to form a grounding structure.

20 Claims, 28 Drawing Sheets

HIGH-SPEED CONNECTOR

CROSS-REFERENCE TO RELATED APPLICATION

The present application is based on, and claims priority from, China Patent Application No. 202120876316.2, filed Apr. 26, 2021, the disclosure of which is hereby incorporated by reference herein in its entirety.

BACKGROUND OF THE INVENTION

1. Field of the Invention

The present invention generally relates to a high-speed connector, and more particularly to a high-speed connector which is capable of reducing a resonance point and is capable of improving a far-end crosstalk, a near-end crosstalk, an insertion loss and a return loss.

2. The Related Art

Nowadays, a high-speed connector is usually connected to several grounding terminals by a grounding plate, so an insertion loss and a crosstalk are reduced. The grounding plate includes a main body, and a plurality of elastic arms extended from the main body. The main body is formed as a sheet shape. The plurality of the elastic arms are integrally stamped with the main body. Each elastic arm is formed as a cantilever beam form. However, a structural strength of the grounding plate is insufficient, and the grounding plate hardly shields differential signal terminals of the high-speed connector, so the grounding plate can be further improved to be beneficial to improve a performance of the high-speed connector.

Conventionally, the high-speed connector includes a housing, an insulating core inserted into the housing, a plurality of terminals fastened to the insulating core, a transmission module and a shielding element. The plurality of the terminals include a plurality of first conductive terminals fastened to the insulating core, and a plurality of second conductive terminals fixed to the insulating core. The plurality of the first conductive terminals are arranged along a transverse direction. The plurality of the first conductive terminals include two differential signal terminals and two grounding terminals. The two grounding terminals are located adjacent to two outer sides of the two differential signal terminals. The two outer sides of the two differential signal terminals are opposite to each other. The shielding element has a substrate separably assembled to the housing, and a metal plating layer plated to the substrate. The metal plating layer contacts with the two grounding terminals to establish an electrical connection between the two grounding terminals. Two portions of the metal plating layer are arranged at the two outer sides of the two differential signal terminals, so the metal plating layer shields the two differential signal terminals along the transverse direction.

However, the above-mentioned shielding element of the high-speed connector is fully covered with the metal plating layer to achieve a shielding function, the high-speed connector has following disadvantages, when a signal is radiated towards the metal plating layer, a signal reflection is generated, and an oscillation is easily caused to generate many unnecessary resonance points. When the high-speed connector transmits higher speed signals, a high-frequency characteristic of the high-speed connector becomes poorer. When the higher speed signals are transmitted among adjacent terminals, a crosstalk interference of the high-speed connector is hardly avoided. Moreover, the above-mentioned shielding element of the high-speed connector is fully covered with the metal plating layer to make the high-frequency characteristic poorer, so a crosstalk phenomenon is caused. In addition, the high-speed connector is fully covered with the metal plating layer to cause the oscillation, and the oscillation causes more insertion losses and more return losses.

Thus, it is essential to provide an innovative high-speed connector which is capable of reducing a resonance point and is capable of improving a far-end crosstalk, a near-end crosstalk, an insertion loss and a return loss.

SUMMARY OF THE INVENTION

An object of the present invention is to provide a high-speed connector. The high-speed connector includes an insulating housing, and a first terminal assembly mounted in the insulating housing. The first terminal assembly includes a plurality of first terminals, a first base body and a first conductive film. The plurality of the first terminals are fastened to the first base body. The first conductive film is disposed under the first base body. The plurality of the first terminals include at least two first grounding terminals and at least two first signal terminals. Each two adjacent first signal terminals are located between two first grounding terminals. A middle of a bottom surface of the first base body is recessed upward to form a first fastening groove. The first conductive film is disposed in the first fastening groove. At least one portion of a bottom of the first base body extends downward to form at least one first protruding portion. Two sides of the at least one first protruding portion define at least two first lacking grooves. The at least one first protruding portion is integrally molded in the first fastening groove. The at least two first signal terminals penetrate through the at least one first protruding portion along a longitudinal direction. The at least two first grounding terminals are fastened in the at least two first lacking grooves. The first conductive film is covered to the at least one first protruding portion. The at least one first protruding portion is blocked among the first conductive film and the at least two first signal terminals. The first conductive film has a first metal layer. The first metal layer is located at a top surface of the first conductive film. The first metal layer is a pattern with a plurality of pores. The plurality of the pores are formed by a plurality of interlaced lines. At least two portions of the first metal layer of the first conductive film project into the at least two first lacking grooves. The first metal layer is electrically connected with the at least two first grounding terminals to form a grounding structure.

Another object of the present invention is to provide a high-speed connector. The high-speed connector includes an insulating housing, a first terminal assembly mounted in the insulating housing, a second terminal assembly mounted in the insulating housing, a third terminal assembly mounted in the insulating housing, and a fourth terminal assembly mounted in the insulating housing. The first terminal assembly includes a plurality of first terminals, a first base body and a first conductive film. The plurality of the first terminals are fastened to the first base body. The plurality of the first terminals include a plurality of first grounding terminals and a plurality of first signal terminals. A middle of a bottom surface of the first base body is recessed upward to form a first fastening groove. The first conductive film is disposed in the first fastening groove. Several portions of a bottom of the first base body extend downward to form a plurality of first protruding portions. The plurality of the first protruding portions are arranged in three rows. The plurality of the first protruding portions are located at a front end, a middle and a rear end of the first fastening groove. Each row of the first protruding portions is arranged transversely. Each first protruding portion surrounds two adjacent first signal terminals along a longitudinal direction. The first conductive film is adhered to bottom surfaces of the plurality of the first protruding portions. The plurality of the first protruding portions are blocked among the first conductive film and the plurality of the first signal terminals. Each two adjacent first protruding portions are spaced from each other to form a first lacking groove. Each first grounding terminal is buckled in one first lacking groove. The first conductive film has a first metal layer. The first metal layer is located at a top surface of the first conductive film. The first metal layer is a pattern with a plurality of pores. Corresponding portions of the first metal layer of the first conductive film project into the plurality of the first lacking grooves of the first base body. The corresponding portions of the first metal layer are electrically connected to the plurality of the first grounding terminals to make the plurality of the first grounding terminals form a grounding structure. The second terminal assembly is corresponding to the first terminal assembly along an up-down direction. The second terminal assembly includes a plurality of second terminals, a second base body and a second conductive film. The plurality of the second terminals are fastened to the second base body. The plurality of the second terminals include a plurality of second grounding terminals and a plurality of second signal terminals. A middle of a top surface of the second base body is recessed downward to form a second fastening groove. The second conductive film is disposed in the second fastening groove. Several portions of a top of the second base body extend upward to form a plurality of second protruding portions. The plurality of the second protruding portions are located at a front end wall and a rear end wall of the second fastening groove. The plurality of the second protruding portions are arranged in two rows. Each row of the second protruding portions are arranged transversely. Each second protruding portion surrounds two adjacent second signal terminals along the longitudinal direction. The second conductive film is adhered to top surfaces of the plurality of the second protruding portions. The plurality of the second protruding portions are blocked among the second conductive film and the plurality of the second signal terminals. Each two adjacent second protruding portions are spaced from each other to form a second lacking groove. The plurality of the second grounding terminals are partially fastened in the plurality of the second lacking grooves of the second base body. The second conductive film has a second metal layer. The second metal layer is located at a bottom surface of the second conductive film. The second metal layer is the pattern with the plurality of the pores. Corresponding portions of the second metal layer of the second conductive film project into the plurality of the second lacking grooves among the plurality of the second protruding portions. The corresponding portions of the second metal layer of the second conductive film are electrically connected with the plurality of the second grounding terminals to make the plurality of the second grounding terminals form the grounding structure. The third terminal assembly is corresponding to the first terminal assembly. The third terminal assembly includes a plurality of third terminals, a third base body and a third conductive film. The plurality of the third terminals are fastened to the third base body. The plurality of the third terminals include a plurality of third grounding terminals and a plurality of third signal terminals. A middle of a bottom surface of the third base body is recessed upward to form a third fastening groove. The third conductive film is disposed in the third fastening groove. Several portions of a bottom of the third base body extend downward to form a plurality of third protruding portions. The plurality of the third protruding portions are located at inner surfaces of a front end wall and a rear end wall of the third fastening groove. The plurality of the third protruding portions are arranged in two rows. Each row of the third protruding portions are arranged transversely. Each third protruding portion surrounds two adjacent third signal terminals along the longitudinal direction. The third conductive film is adhered to bottom surfaces of the plurality of the third protruding portions. The plurality of the third protruding portions are blocked among the third conductive film and the plurality of the third signal terminals. The third base body has a plurality of third lacking grooves. Each third protruding portion is located between two adjacent third lacking grooves. The plurality of the third grounding terminals are partially fastened in the plurality of the third lacking grooves. The third conductive film has a third metal layer. The third metal layer is located at a top surface of the third conductive film. The third metal layer is the pattern with the plurality of the pores. Corresponding portions of the third metal layer of the third conductive film project into the plurality of the third lacking grooves of the third base body. The corresponding portions of the third metal layer of the third conductive film are electrically connected with the plurality of the third grounding terminals to make the plurality of the third grounding terminals form the grounding structure. The fourth terminal assembly is corresponding to an upper portion of the third terminal assembly along the up-down direction. The fourth terminal assembly is corresponding to a lower portion of the third terminal assembly along the longitudinal direction. The fourth terminal assembly includes a plurality of fourth terminals, a fourth base body and a fourth conductive film. The plurality of the fourth terminals are fastened to the fourth base body. The plurality of the fourth terminals include a plurality of fourth grounding terminals and a plurality of fourth signal terminals. A middle of a bottom surface of the fourth base body is recessed upward to form a fourth fastening groove. The fourth conductive film is disposed in the fourth fastening groove. Several portions of a bottom of the fourth base body extend downward to form a plurality of fourth protruding portions. The plurality of the fourth protruding portions are located at inner surfaces of a front end wall and a rear end wall of the fourth fastening groove. The plurality of the fourth protruding portions are longitudinally arranged in two rows. Each row of the fourth protruding portions are arranged transversely. Each fourth protruding portion surrounds two adjacent fourth signal terminals along the longitudinal direction. The fourth conductive film is adhered to bottom surfaces of the plurality of the fourth protruding portions. The plurality of the fourth protruding portions are blocked among the fourth conductive film and the plurality of the fourth signal terminals. The fourth base body has a plurality of fourth lacking grooves. Each fourth protruding portion is located between two adjacent fourth lacking grooves. The plurality of the fourth grounding terminals are partially disposed in the plurality of the fourth lacking grooves of the fourth base body. The fourth conductive film has a fourth metal layer. The fourth metal layer is located at a bottom surface of the fourth conductive film. The fourth metal layer is the pattern with the plurality of the pores. Corresponding portions of the fourth metal layer of the fourth conductive film project into the plurality of the fourth lacking grooves of the fourth base body. The corresponding portions of the fourth metal layer of the fourth conductive film are electrically connected with the plurality of the fourth grounding terminals to make the plurality of the fourth grounding terminals form the grounding structure.

Another object of the present invention is to provide a high-speed connector. The high-speed connector includes an insulating housing, a first terminal assembly mounted in the insulating housing, a second terminal assembly mounted in the insulating housing, a third terminal assembly mounted in the insulating housing, and a fourth terminal assembly mounted in the insulating housing. The first terminal assembly includes a plurality of first terminals, a first base body and a first conductive film. The plurality of the first terminals are fastened to the first base body. The plurality of the first terminals include a plurality of first grounding terminals and a plurality of first signal terminals. A middle of a bottom surface of the first base body is recessed upward to form a first fastening groove. The first conductive film is disposed in the first fastening groove. Several portions of a bottom of the first base body extend downward to form a plurality of first protruding portions. The plurality of the first protruding portions are transversely arranged in a row. The plurality of the first protruding portions are transversely arranged in two groups. In each group of the first protruding portions, each two adjacent first lacking grooves are isolated by two first protruding portions. The two first protruding portions clamp two adjacent first signal terminals. The plurality of the first protruding portions extend longitudinally in the first fastening groove. A front end and a rear end of each first protruding portion are connected to a front end wall and a rear end wall of the first fastening groove, respectively. The first base body has a plurality of first lacking grooves. The plurality of the first lacking grooves are disposed among the plurality of the first protruding portions. In each group of the first protruding portions, the plurality of the first grounding terminals are partially fastened in the plurality of the first lacking grooves. Each first protruding portion is located between one first grounding terminal and one first signal terminal. The first conductive film is adhered to bottom surfaces of the plurality of first protruding portions. The plurality of the first protruding portions are blocked among the first conductive film and the plurality of the first signal terminals. The first conductive film has a first metal layer. The first metal layer is located at a top surface of the first conductive film. The first metal layer is a pattern with a plurality of pores. Corresponding portions of the first metal layer project into the plurality of the first lacking grooves of the first base body. The corresponding portions of the first metal layer are electrically connected to the plurality of the first grounding terminals to make the plurality of the first grounding terminals form a grounding structure. The second terminal assembly is corresponding to the first terminal assembly along an up-down direction. The second terminal assembly includes a plurality of second terminals, a second base body and a second conductive film. The plurality of the second terminals are fastened to the second base body. The plurality of the second terminals include a plurality of second grounding terminals and a plurality of second signal terminals. A middle of a top surface of the second base body is recessed downward to form a second fastening groove. The second conductive film is disposed in the second fastening groove. Several portions of a top of the second base body extend upward to form a plurality of second protruding portions. The second base body has a plurality of second lacking grooves. The plurality of the second protruding portions are transversely arranged in a row. The plurality of the second protruding portions are longitudinally extended in the second fastening groove. A front end and a rear end of each second protruding portion are connected to a front end wall and a rear end wall of the second fastening groove. The plurality of the second protruding portions are transversely arranged in two groups. In each group of the second protruding portions, each two adjacent second lacking grooves are isolated by two second protruding portions. The two second protruding portions clamp two adjacent second signal terminals. The plurality of the second grounding terminals are partially fastened in the plurality of the second lacking grooves. Each second protruding portion is located between one second grounding terminal and one second signal terminal. The second conductive film is adhered to top surfaces of the plurality of the second protruding portions. The plurality of the second protruding portions are blocked among the second conductive film and the plurality of the second signal terminals. The second conductive film has a second metal layer. The second metal layer is located at a bottom surface of the second conductive film. The second metal layer is the pattern with the plurality of the pores. Corresponding portions of the second metal layer of the second conductive film project into the plurality of the second lacking grooves among the plurality of the second protruding portions. The corresponding portions of the second metal layer of the second conductive film are electrically connected with the plurality of the second grounding terminals to make the plurality of the second grounding terminals form the grounding structure. The third terminal assembly is corresponding to the first terminal assembly. The third terminal assembly includes a plurality of third terminals, a third base body and a third conductive film. The plurality of the third terminals are fastened to the third base body. The plurality of the third terminals include a plurality of third grounding terminals and a plurality of third signal terminals. A middle of a bottom surface of the third base body is recessed upward to form a third fastening groove. The third conductive film is disposed in the third fastening groove. Several portions of a bottom of the third base body extend downward to form a plurality of third protruding portions. The third base body has a plurality of third lacking grooves. The plurality of the third protruding portions are transversely arranged in a row. The plurality of the third protruding portions are longitudinally extended in the third fastening groove. Front ends and rear ends of the plurality of the third protruding portions are connected to inner surfaces of a front end wall and a rear end wall of the third fastening groove. The plurality of the third protruding portions are transversely arranged in two groups. In each group of the third protruding portions, each two adjacent third lacking grooves are isolated by two third protruding portions. The two third protruding portions clamp two adjacent third signal terminals. The plurality of the third grounding terminals are partially fastened in the plurality of the third lacking grooves. Each third protruding portion is located between one third grounding terminal and one third signal terminal. The third conductive film is adhered to bottom surfaces of the plurality of the third protruding portions. The plurality of the third protruding portions are blocked among the third conductive film and the plurality of the third signal terminals. The third conductive film has a third metal layer. The third metal layer is located at a top surface of the third conductive film. The third metal layer is the pattern with the plurality of the pores. Corresponding portions of the third metal layer of the third conductive film project into the plurality of the third lacking grooves of the third base body. The corresponding portions of the third metal layer of the third conductive film are electrically connected with the plurality of the third grounding terminals to make the plurality of the third grounding terminals form the grounding structure. The fourth terminal assembly is corresponding to an upper portion of the third terminal assembly along the up-down direction. The fourth terminal assembly is corresponding to a lower portion of the third terminal assembly along the longitudinal direction. The fourth terminal assembly includes a plurality of fourth terminals, a fourth base body and a fourth conductive film. The plurality of the fourth terminals are fastened to the fourth base body. The plurality of the fourth terminals include a plurality of fourth grounding terminals and a plurality of fourth signal terminals. A middle of a bottom surface of the fourth base body is recessed upward to form a fourth fastening groove. The fourth conductive film is disposed in the fourth fastening groove. Several portions of a bottom of the fourth base body extend downward to form a plurality of fourth protruding portions. The fourth base body has a plurality of fourth lacking grooves. The plurality of the fourth protruding portions are transversely arranged in a row. The plurality of the fourth protruding portions are longitudinally extended in the fourth fastening groove. A front end and a rear end of each fourth protruding portion are connected to inner surfaces of a front end wall and a rear end wall of the fourth fastening groove. The plurality of the fourth protruding portions are transversely arranged in two groups. In each group of the fourth protruding portions, each two adjacent fourth lacking grooves are isolated by two fourth protruding portions. The two fourth protruding portions clamp two adjacent fourth signal terminals. The plurality of the fourth grounding terminals are partially fastened in the plurality of the fourth lacking grooves. Each fourth protruding portion is located between one fourth grounding terminal and one fourth signal terminal. The fourth conductive film is adhered to top surfaces of the plurality of the fourth protruding portions. The plurality of the fourth protruding portions are blocked among the fourth conductive film and the plurality of the fourth signal terminals. The fourth conductive film has a fourth metal layer. The fourth metal layer is located at a bottom surface of the fourth conductive film. The fourth metal layer is the pattern with the plurality of the pores. Corresponding portions of the fourth metal layer project into the plurality of the fourth lacking grooves of the fourth base body. The corresponding portions of the fourth metal layer are electrically connected with the plurality of the fourth grounding terminals to make the plurality of the fourth grounding terminals form the grounding structure.

As described above, the first conductive film, the second conductive film, the third conductive film and the fourth conductive film are adhered to the plurality of the first protruding portions, the second protruding portions, the third protruding portions and the fourth protruding portions. The first metal layer of the first terminal assembly contacts the first grounding terminals in the plurality of the first lacking grooves, the second metal layer of the second terminal assembly contacts the second grounding terminals in the plurality of the second lacking grooves, the third metal layer of the third terminal assembly contacts the third grounding terminals in the plurality of the third lacking grooves, and the fourth metal layer of the fourth terminal assembly contacts the fourth grounding terminals in the plurality of the fourth lacking grooves to form the grounding structure. Furthermore, the pattern of each of the first metal layer of the first terminal assembly, the second metal layer of the second terminal assembly, the third metal layer of the third terminal assembly and the fourth metal layer of the fourth terminal assembly has the plurality of the same pores or the plurality of the different pores. So signals partially penetrate through the first conductive film, the second conductive film, the third conductive film and the fourth conductive film, and the signals are partially reflected by the first conductive film, the second conductive film, the third conductive film and the fourth conductive film. As a result, the pattern of the fourth metal layer of the high-speed connector is capable of reducing a resonance point, the high-speed connector is capable of improving a far-end crosstalk, a near-end crosstalk, an insertion loss and a return loss, so performances of the far-end crosstalk, the near-end crosstalk, the insertion loss and the return loss are better.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
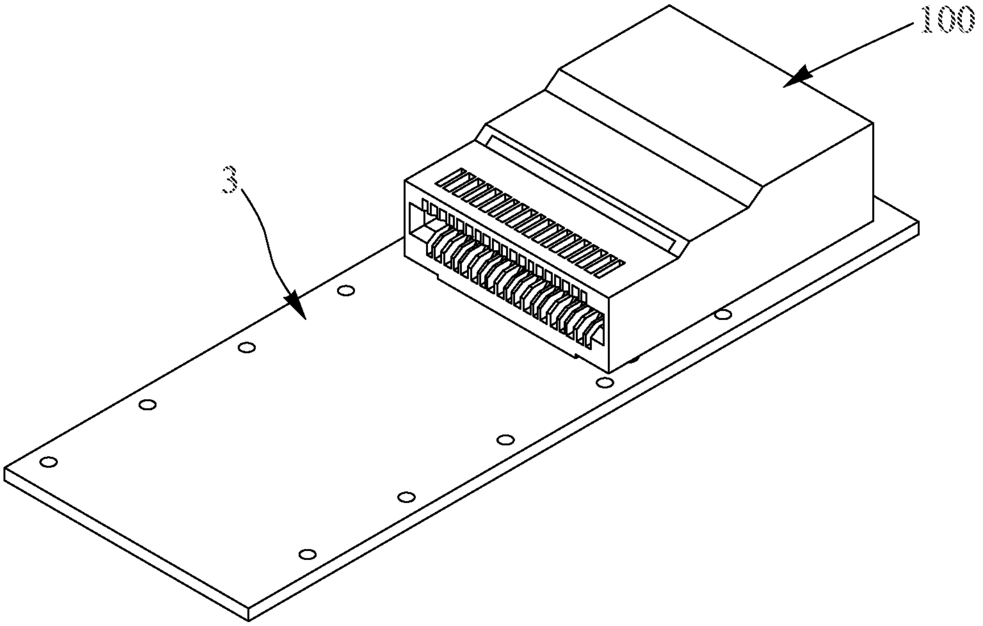
FIG. 1 is a perspective view of a high-speed connector in accordance with a first preferred embodiment of the present invention, wherein the high-speed connector is fastened on a circuit board.
Figure 2:
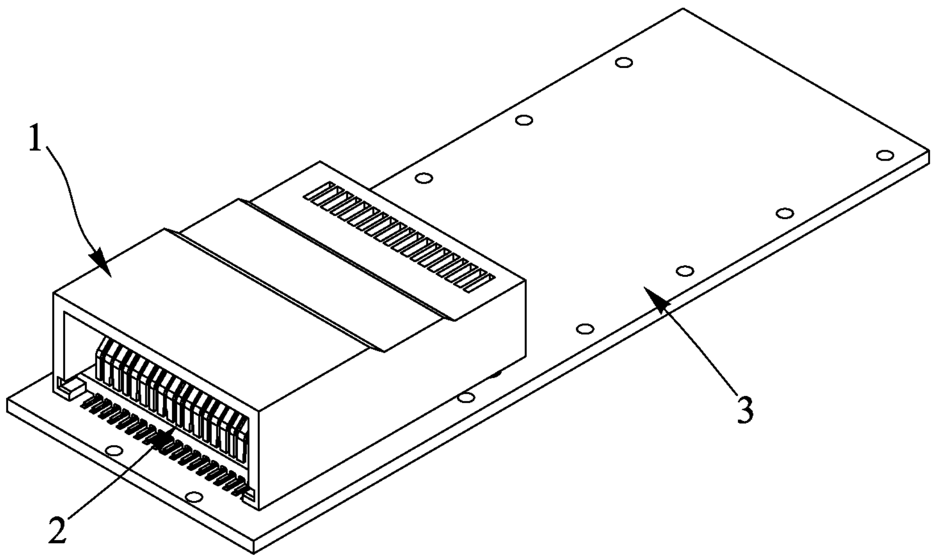
FIG. 2 is another perspective view of the high-speed connector of FIG. 1, wherein the high-speed connector is fastened on a circuit board.

With reference to FIG. 1 and FIG. 2, a high-speed connector 100 in accordance with a first preferred embodiment of the present invention is shown. The high-speed connector 100 includes an insulating housing 1 and a terminal module 2. The high-speed connector 100 is mounted on a circuit board 3. The insulating housing 1 is fastened on the circuit board 3. The terminal module 2 is disposed in the insulating housing 1. The terminal module 2 is soldered to the circuit board 3.

Figure 23:
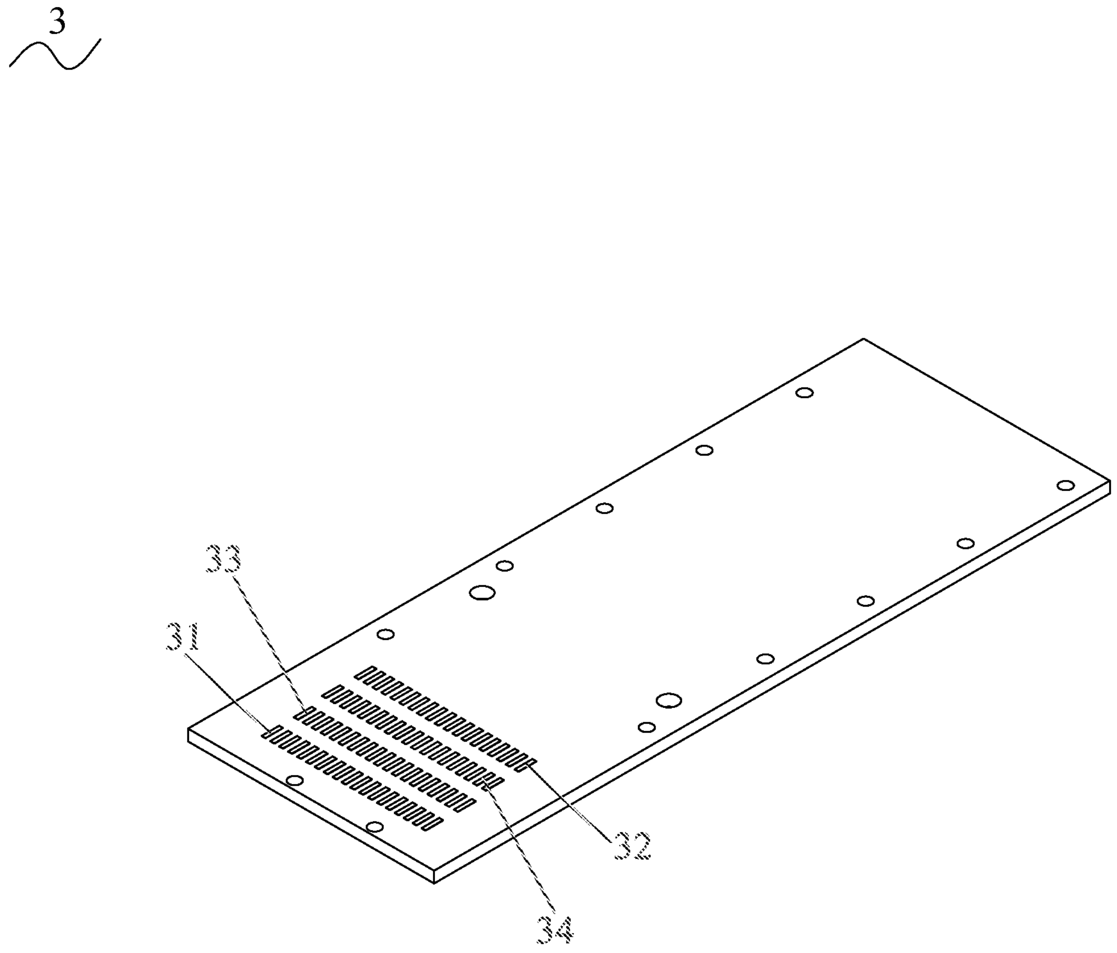
FIG. 23 is a perspective view of the circuit board of the high-speed connector in accordance with the present invention.

Referring to FIG. 23, the circuit board 3 has a first soldering zone 31, a second soldering zone 32, a third soldering zone 33 and a fourth soldering zone 34. The first soldering zone 31, the second soldering zone 32, the third soldering zone 33 and the fourth soldering zone 34 are used for being soldered with a corresponding mechanism of the terminal module 2, so that the terminal module 2 is located to the circuit board 3, and the terminal module 2 is fastened to the circuit board 3. Signals are transmitted between the terminal module 2 and the circuit board 3.

Figure 3:
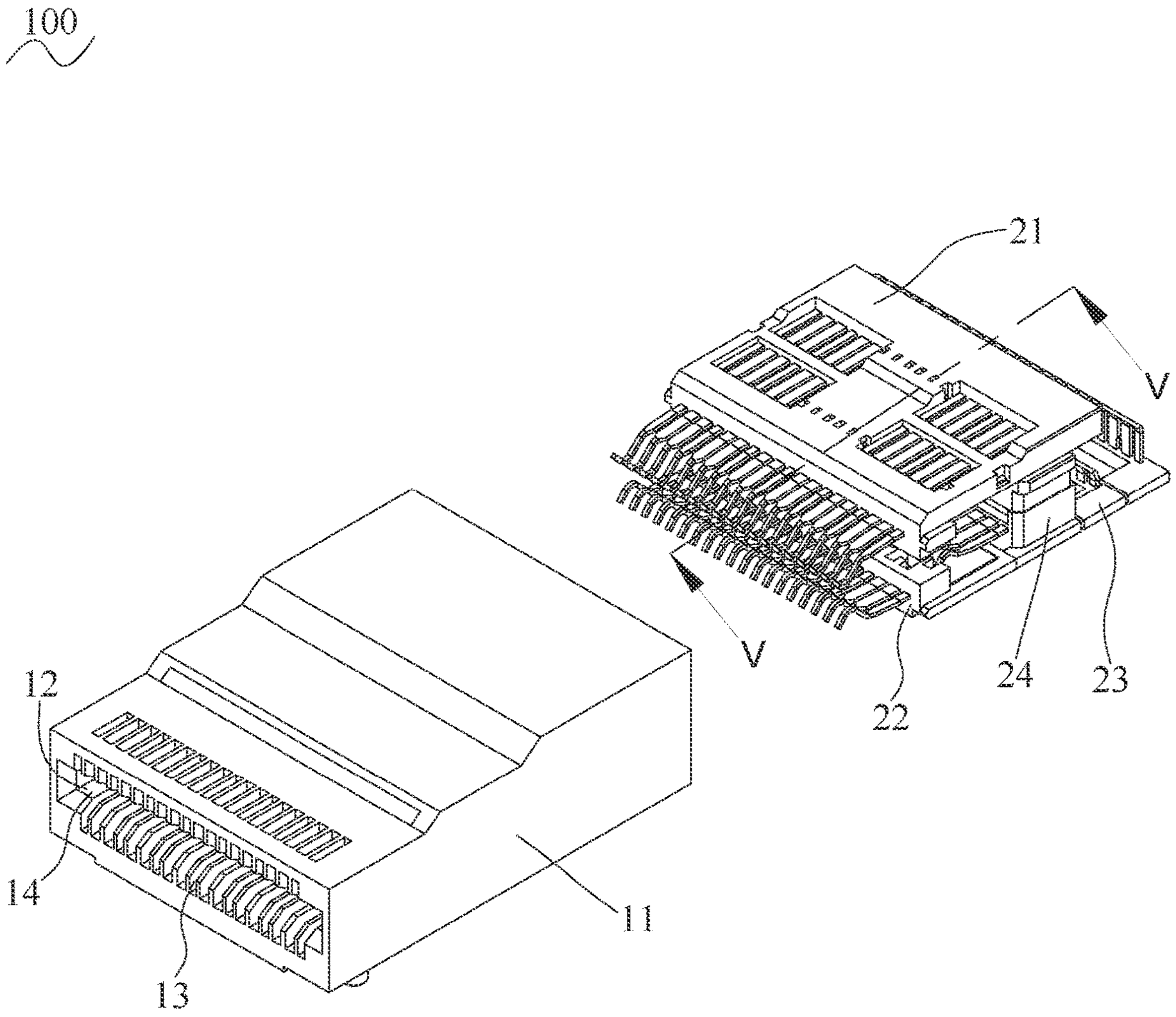
FIG. 3 is a partially exploded view of the high-speed connector of FIG. 1.
Figure 4:
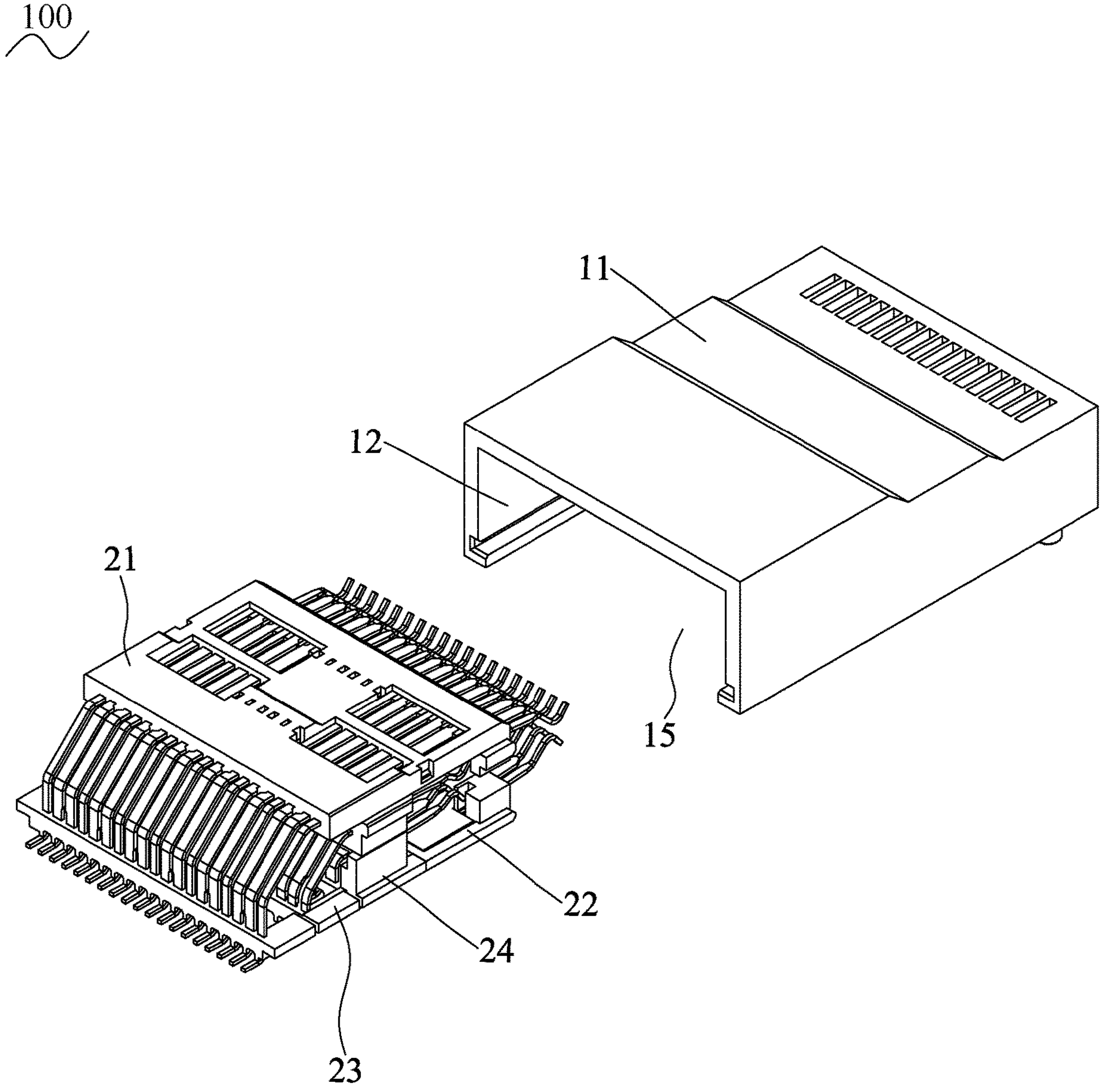
FIG. 4 is another partially exploded view of the high-speed connector of FIG. 3.

Referring to FIG. 3 and FIG. 4, the insulating housing 1 has a main portion 11, an accommodating space 12, a plurality of terminal slots 13, a penetrating groove 14 and an assembling groove 15. An inside of the main portion 11 defines the accommodating space 12. The accommodating space 12 penetrates through a bottom of a rear end of the main portion 11. Several portions of a front end of the main portion 11 of the insulating housing 1 form the plurality of the terminal slots 13. The plurality of the terminal slots 13 are arranged in two rows, and the plurality of the terminal slots 13 are arranged along an up-down direction. The plurality of the terminal slots 13 are arranged in an upper row and a lower row. The upper row of the terminal slots 13 penetrate through a front surface, an upper surface, a lower surface and a rear surface of an upper portion of the main portion 11 of the insulating housing 1. The lower row of the terminal slots 13 penetrate through a front surface, an upper surface, a lower surface and a rear surface of a lower portion of the main portion 11 of the insulating housing 1. The plurality of the terminal slots 13 are communicated with an upper portion and a lower portion of the accommodating space 12. The upper row of the terminal slots 13 are connected to a front end of the upper portion of the accommodating space 12. The lower row of the terminal slots 13 are connected to a front end of the lower portion of the accommodating space 12.

The penetrating groove 14 is formed at the front end of the main portion 11. The penetrating groove 14 penetrates through a middle of the front end of the main portion 11 along a longitudinal direction. The penetrating groove 14 is located in front of a front end of the accommodating space 12. The penetrating groove 14 is communicated between an outside and the front end of the accommodating space 12. The assembling groove 15 is formed at the rear end of the main portion 11. The assembling groove 15 penetrates through a rear surface of the main portion 11. The assembling groove 15 is located behind a rear end of the accommodating space 12. The assembling groove 15 is communicated with the rear end of the accommodating space 12. Front ends of the upper row and the lower row of the terminal slots 13 are communicated with the penetrating groove 14. The penetrating groove 14 is located between the two rows of the terminal slots 13. The penetrating groove 14 is communicated with the front end of the accommodating space 12.

Figure 5:
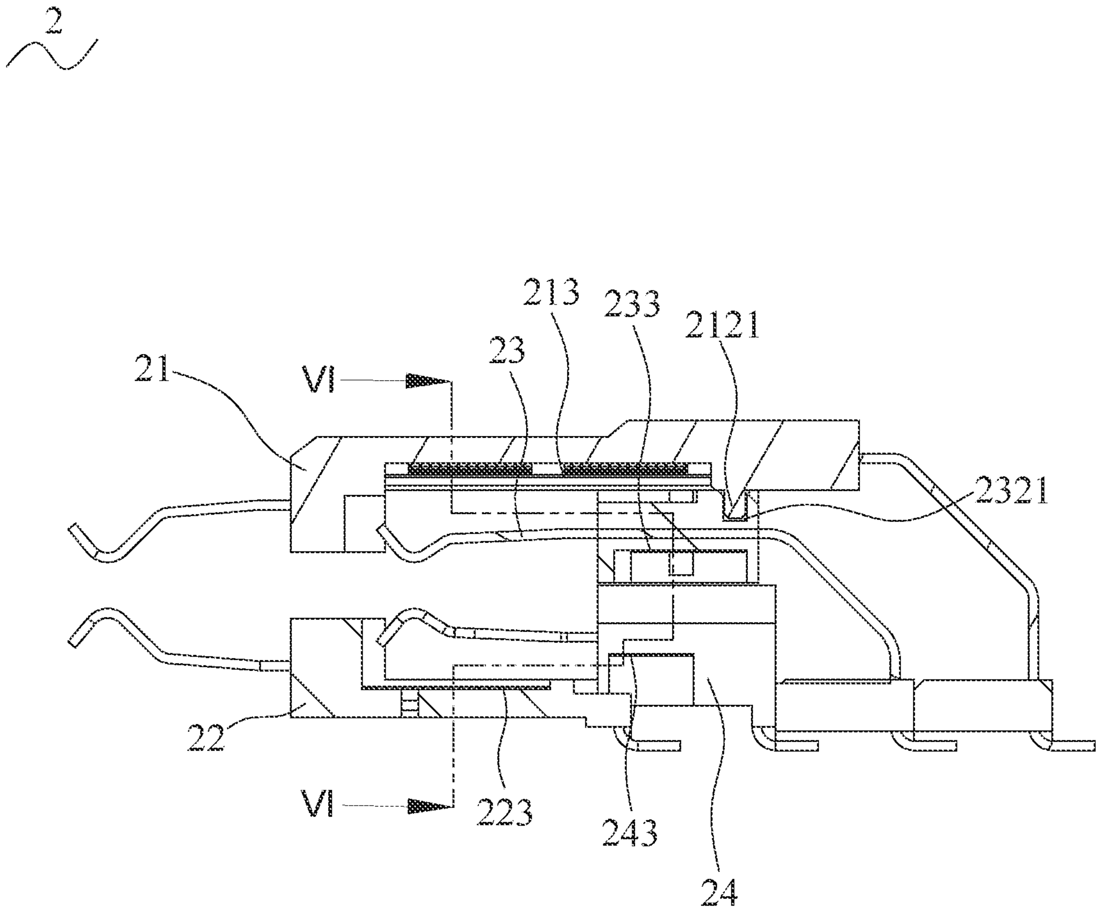
FIG. 5 is a sectional view of a terminal module of the high-speed connector along a line V-V of FIG. 3.

Referring to FIG. 3 to FIG. 5, the terminal module 2 is inserted into the accommodating space 12 from the assembling groove 15 of the insulating housing 1. In the first preferred embodiment, the terminal module 2 includes a first terminal assembly 21, a second terminal assembly 22, a third terminal assembly 23 and a fourth terminal assembly 24. The first terminal assembly 21, the second terminal assembly 22, the third terminal assembly 23 and the fourth terminal assembly 24 of the terminal module 2 are mounted in the insulating housing 1. In a concrete implementation, the terminal module 2 is without being limited to include the first terminal assembly 21, the second terminal assembly 22, the third terminal assembly 23 and the fourth terminal assembly 24. The first terminal assembly 21, the second terminal assembly 22, the third terminal assembly 23 and the fourth terminal assembly 24 are inserted into the accommodating space 12 from the assembling groove 15 of the insulating housing 1.

The first terminal assembly 21 is corresponding to the second terminal assembly 22. The third terminal assembly 23 is corresponding to the fourth terminal assembly 24. In the first preferred embodiment, the first terminal assembly 21 and the second terminal assembly 22 form a QSFP (Quad Small Form-Factor Pluggable) terminal assembly. The third terminal assembly 23 and the fourth terminal assembly 24 form another QSFP (Quad Small Form-Factor Pluggable) terminal assembly. In practice, the high-speed connector 100 is configured with the first terminal assembly 21, the second terminal assembly 22, the third terminal assembly 23 and the fourth terminal assembly 24 to form a QSFP-DD (Quad Small Form Factor Pluggable-Double Density) high-speed connector. The high-speed connector 100 is able to be just configured with the first terminal assembly 21 and the second terminal assembly 22 to form a QSFP high-speed connector. The high-speed connector 100 is also able to be just configured with the third terminal assembly 23 and the fourth terminal assembly 24 to form another QSFP high-speed connector.

Referring to FIG. 7 to FIG. 10, the first terminal assembly 21 includes a plurality of first terminals 211, a first base body 212, a first conductive film 213 and a first holding element 214. The plurality of the first terminals 211 are fastened to the first base body 212, and the plurality of the first terminals 211 are partially surrounded by the first base body 212. The first conductive film 213 is disposed under the first base body 212. Rear ends of the plurality of the first terminals 211 are surrounded by the first holding element 214.

Each first terminal 211 has a first fastening portion 2111, a first stepping portion 2112, a first contact portion 2113, a first bending portion 2114 and a first soldering portion 2115. The plurality of the first terminals 211 include at least two first grounding terminals 2116 and at least two first signal terminals 2117. The plurality of the first terminals 211 include a plurality of the first grounding terminals 2116 and a plurality of the first signal terminals 2117. In the first preferred embodiment, the plurality of the first terminals 211 includes seven first grounding terminals 2116 and twelve first signal terminals 2117. In the preferred embodiment, each two adjacent first signal terminals 2117 are located between two first grounding terminals 2116. Each first signal terminal 2117 is used for transmitting the signals.

Bottom surfaces of the plurality of the first fastening portions 2111 of the plurality of the first terminals 211 are exposed out to a bottom surface of the first base body 212. A front end of the first fastening portion 2111 of each first terminal 211 is bent downward to form the first stepping portion 2112. The first stepping portions 2112 of the plurality of the first terminals 211 are mounted in a front end of the first base body 212. A front end of the first stepping portion 2112 of each first terminal 211 extends frontward and then is arched downward to form the first contact portion 2113. The first contact portion 2113 of each first terminal 211 projects beyond a front surface of the first base body 212. The plurality of the first contact portions 2113 of the plurality of the first terminals 211 are disposed in the upper row of the terminal slots 13.

Bottom surfaces of the plurality of the first contact portions 2113 of the plurality of the first terminals 211 are exposed out of bottoms of the upper row of the terminal slots 13 and project into the penetrating groove 14. A rear end of the first fastening portion 2111 of each first terminal 211 extends rearward, then slantwise extends downward and rearward, and further extends downward to form the first bending portion 2114. The first bending portion 2114 of each first terminal 211 projects beyond a rear surface of the first base body 212. Tail ends of the plurality of the first bending portions 2114 of the plurality of the first terminals 211 are surrounded by the first holding element 214. The tail end of the first bending portion 2114 of each first terminal 211 is bent rearward and extends rearward to form the first soldering portion 2115. The plurality of the first soldering portions 2115 of the plurality of the first terminals 211 are soldered to the first soldering zone 31 of the circuit board 3.

The first base body 212 surrounds the front ends and rear ends of the plurality of the first fastening portions 2111 and the plurality of the first stepping portions 2112 of the plurality of the first terminals 211. The first holding element 214 surrounds lower ends of the first bending portions 2114 of the plurality of the first terminals 211. The first base body 212 has a protrusion 2121, a first fastening groove 2122, a plurality of first perforations 2123 and at least one first protruding portion 2124. The first base body 212 further includes a plurality of the first protruding portions 2124. In the first preferred embodiment, the first base body 212 has the protrusion 2121, the first fastening groove 2122, four first perforations 2123 and twelve first protruding portions 2124. A middle of a rear end of the bottom surface of the first base body 212 extends downward to form the protrusion 2121. The protrusion 2121 is used for being fastened to a corresponding mechanism of the third terminal assembly 23 to realize that the first terminal assembly 21 is located to the third terminal assembly 23 and that the first terminal assembly 21 is fixed to the third terminal assembly 23.

A middle of the bottom surface of the first base body 212 is recessed upward to form the first fastening groove 2122. The first conductive film 213 is disposed in the first fastening groove 2122 of the first base body 212. Two sides of the first base body 212 define the plurality of the first perforations 2123 penetrating through a top surface and the bottom surface of the first base body 212. The first fastening groove 2122 is communicated with each first perforation 2123. The plurality of the first fastening portions 2111 of the plurality of the first grounding terminals 2116 and the plurality of the first fastening portions 2111 of the plurality of the first signal terminals 2117 are partially exposed outside to the plurality of the first perforations 2123. The two sides of the first base body 212 define the four first perforations 2123 penetrating through the top surface and the bottom surface of the first base body 212. In the first preferred embodiment, the plurality of the first fastening portions 2111 of the plurality of the first grounding terminals 2116 and the plurality of the first fastening portions 2111 of the plurality of the first signal terminals 2117 are partially exposed outside to the four first perforations 2123. The first fastening portions 2111 of six first grounding terminals 2116 are exposed to the four first perforations 2123 of the two sides of the first base body 212. The first fastening portion 2111 of the middle first grounding terminal 2116 is surrounded by a middle of the first base body 212.

At least one portion of a bottom of the first base body 212 extends downward to form at least one first protruding portion 2124. Two sides of the at least one first protruding portion 2124 define at least two first lacking grooves 2125. The at least one first protruding portion 2124 is integrally molded in the first fastening groove 2122. Several portions of the bottom of the first base body 212 extend downward to form the plurality of the first protruding portions 2124. Several portions of a bottom surface of a top wall of the first fastening groove 2122 extend downward to form the plurality of the first protruding portions 2124. The plurality of the first protruding portions 2124 are integrally molded in the first fastening groove 2122. The plurality of the first protruding portions 2124 are arranged in three rows, and the plurality of the first protruding portions 2124 are arranged at a front end, a middle and a rear end of the first fastening groove 2122 along a front-to-rear direction. Each row of the first protruding portions 2124 are arranged transversely. Each first protruding portion 2124 extends transversely, and a middle of each first terminal 211 extends longitudinally. An extending direction of each first protruding portion 2124 is perpendicular to an extending direction of the middle of each first terminal 211. The extending direction of each first protruding portion 2124 is perpendicular to an extending direction of the first fastening portion 2111 of each first terminal 211.

In the first preferred embodiment, the at least two first signal terminals 2117 penetrate through the at least one first protruding portion 2124 along a longitudinal direction. The at least two first grounding terminals 2116 are fastened in the at least two first lacking grooves 2125. Each first protruding portion 2124 is corresponding to two first signal terminals 2117. Each first protruding portion 2124 surrounds the two adjacent first signal terminals 2117 along the longitudinal direction. The bottom surfaces of the first fastening portions 2111 of the plurality of the first signal terminals 2117 are partially surrounded by the plurality of the first protruding portions 2124. Each two adjacent first protruding portions 2124 are spaced from each other to form the first lacking groove 2125. Each first protruding portion 2124 is located between two adjacent first lacking grooves 2125.

In the first preferred embodiment, each first grounding terminal 2116 is corresponding to one first lacking groove 2125. Each first grounding terminal 2116 is buckled in the one first lacking groove 2125. The first base body 212 has at least two first lacking grooves 2125. The at least two first lacking grooves 2125 are located beside two sides of the at least one first protruding portion 2124. At least two of the plurality of the first grounding terminals 2116 are disposed in the at least two first lacking grooves 2125. The at least one first protruding portion 2124 is clamped between two of the plurality of the first grounding terminals 2116. The first conductive film 213 is disposed in the first fastening groove 2122. The first conductive film 213 is covered to the at least one first protruding portion 2124, middles of the at least two first signal terminals 2117 and the at least two first grounding terminals 2116. At least two portions of the first conductive film 213 project into the at least two first lacking grooves 2125. The bottom surfaces of the first fastening portions 2111 of the plurality of the first grounding terminals 2116 are exposed out of the plurality of the first lacking grooves 2125 of the first base body 212.

Figure 6:
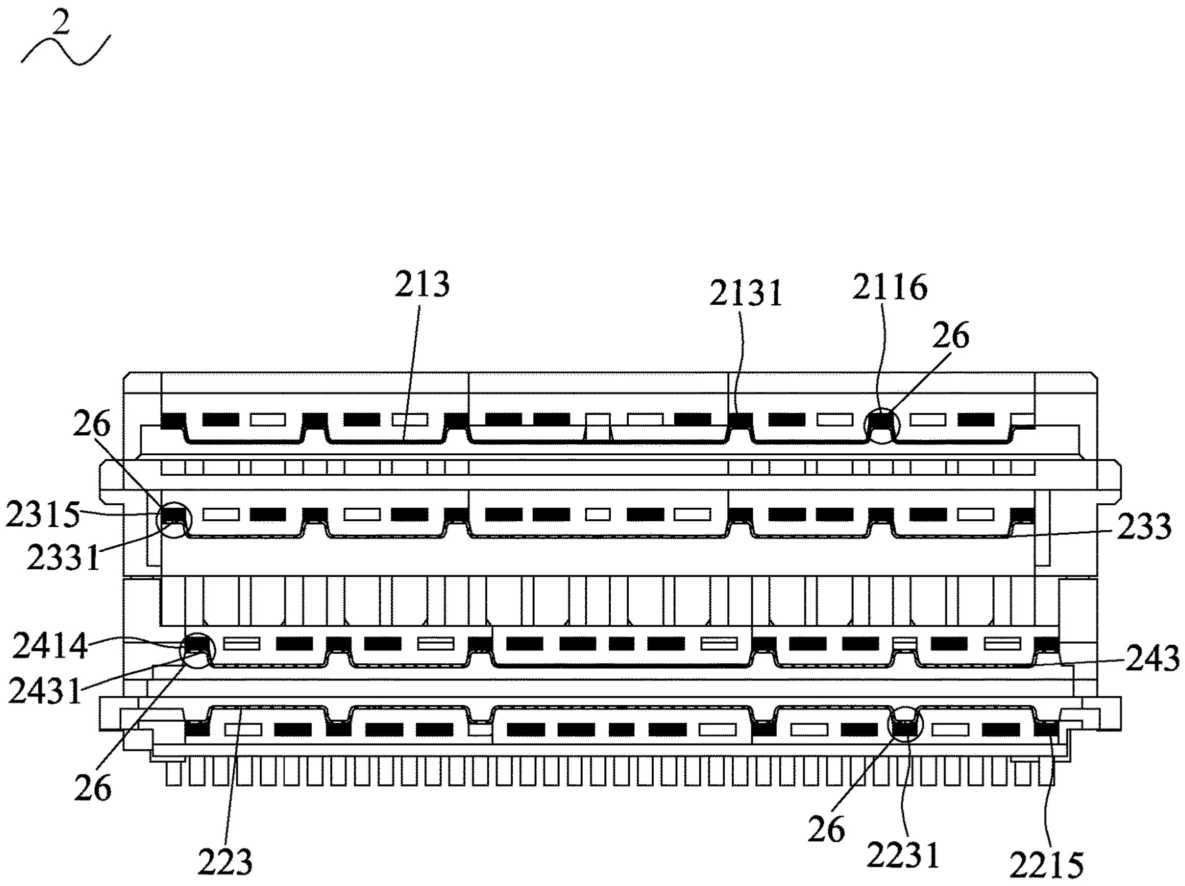
FIG. 6 is a sectional view of the terminal module of the high-speed connector along a line VI-VI of FIG. 5.
Figure 7:
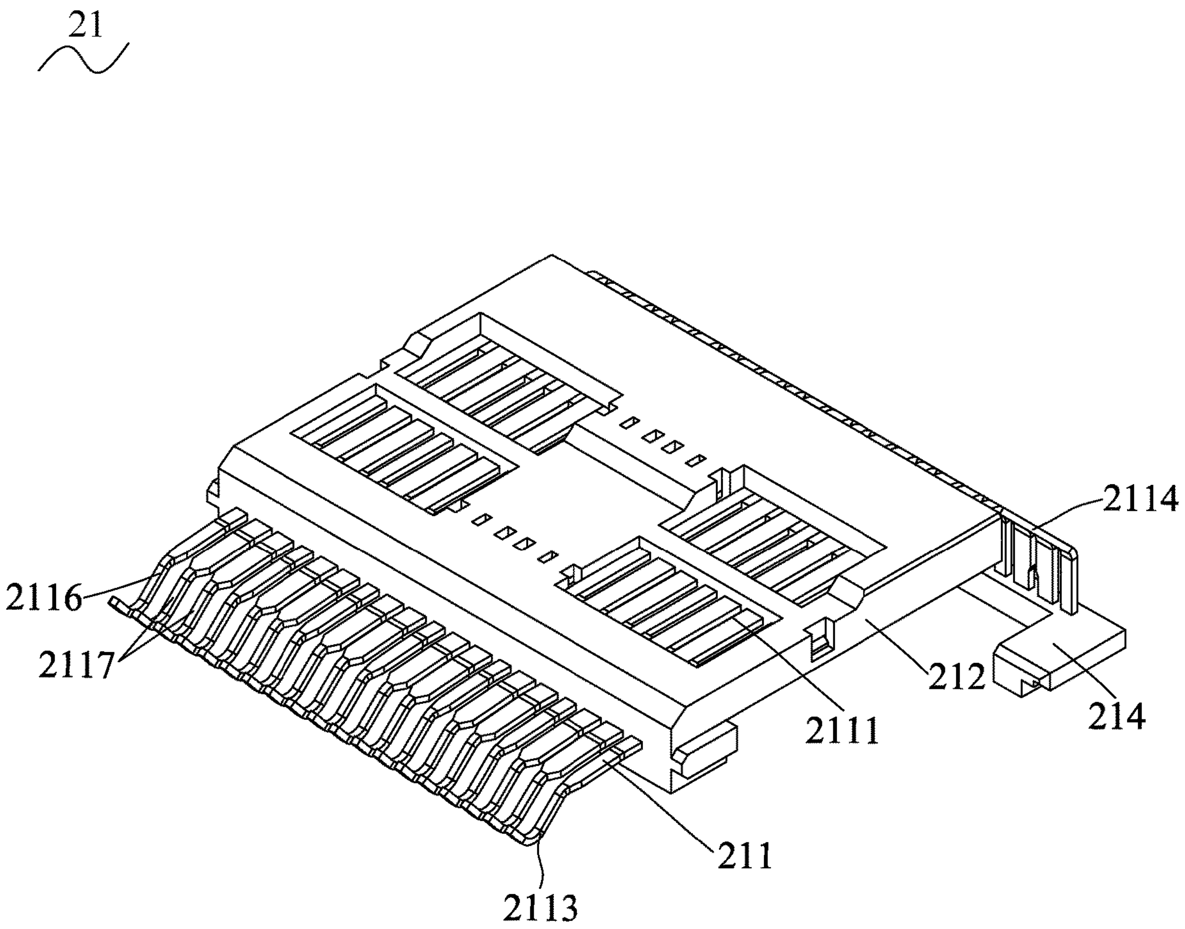
FIG. 7 is a perspective view of a first terminal assembly of the terminal module of the high-speed connector of FIG. 3.
Figure 8:
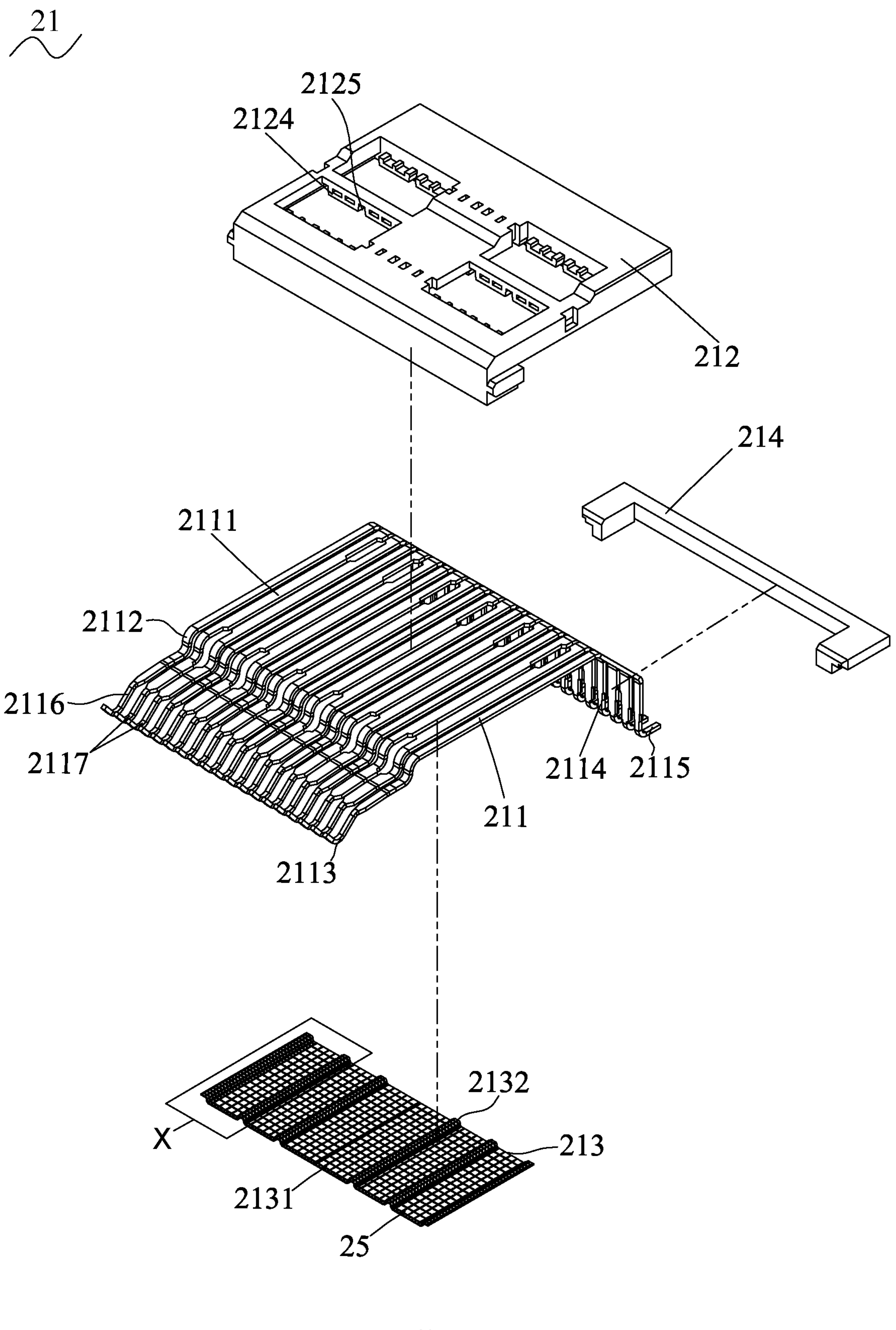
FIG. 8 is an exploded view of the first terminal assembly of the terminal module of the high-speed connector of FIG. 3.
Figure 9:
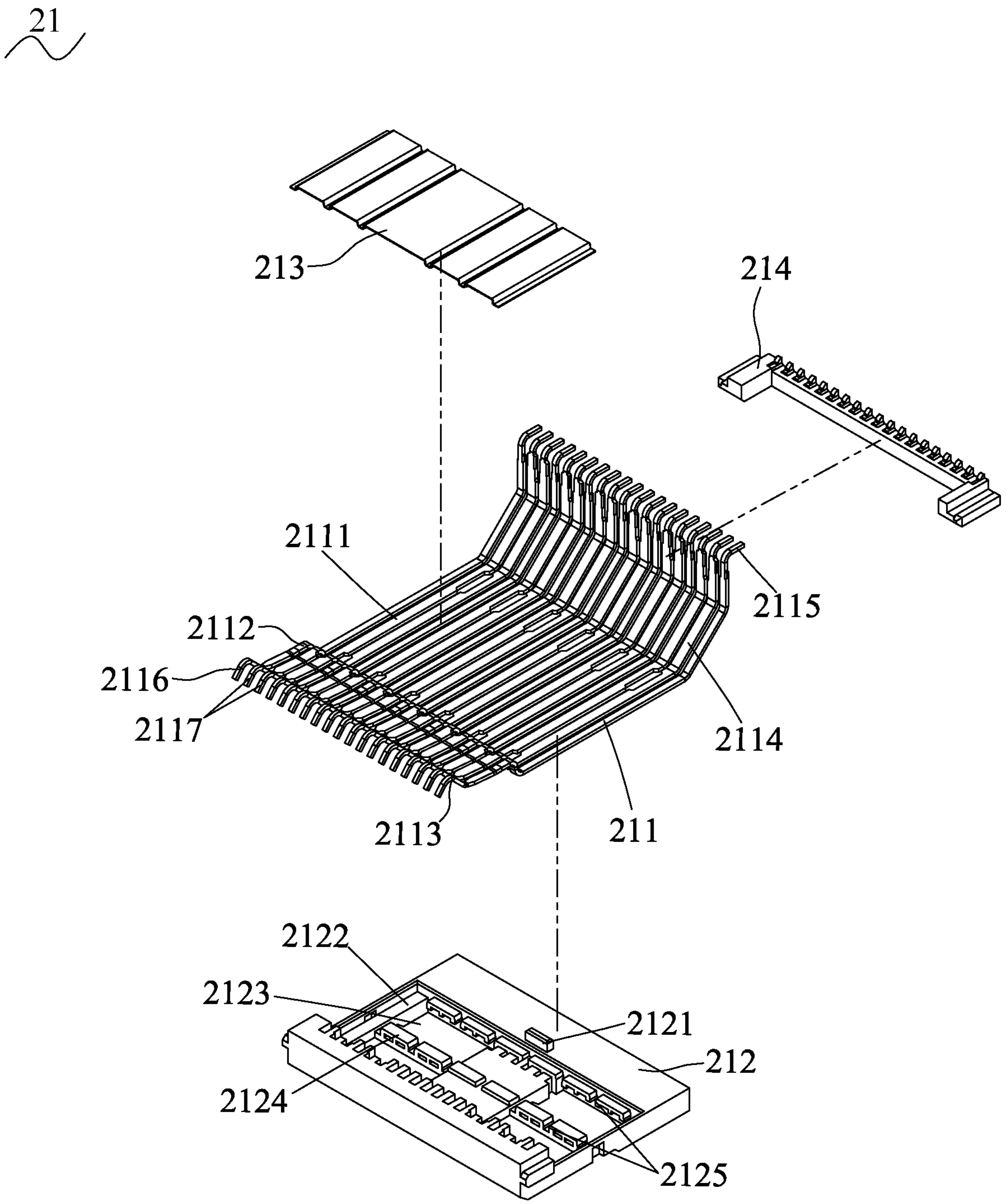
FIG. 9 is another exploded view of the first terminal assembly of the terminal module of the high-speed connector of FIG. 8.
Figure 10:
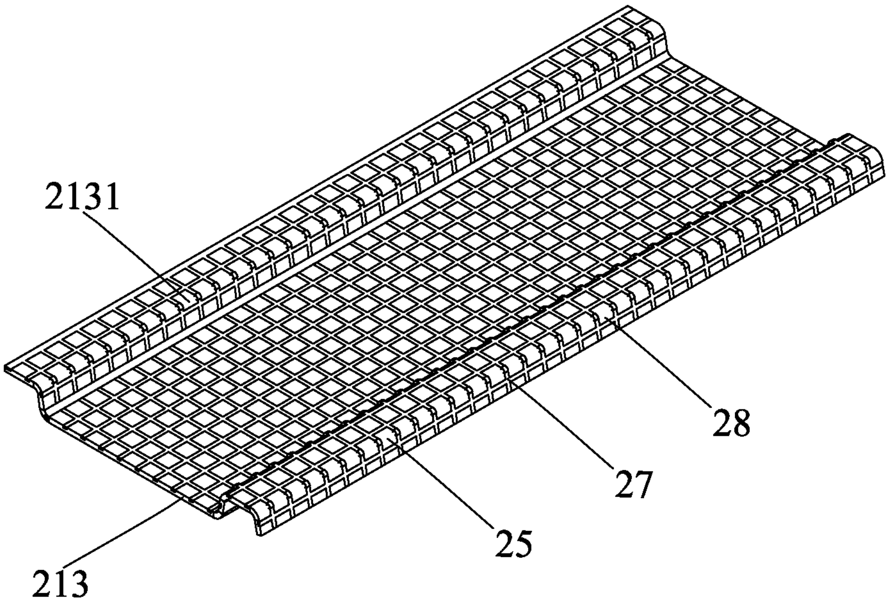
FIG. 10 is an enlarged view of an encircled portion X of the high-speed connector of FIG. 8.
Figure 11:
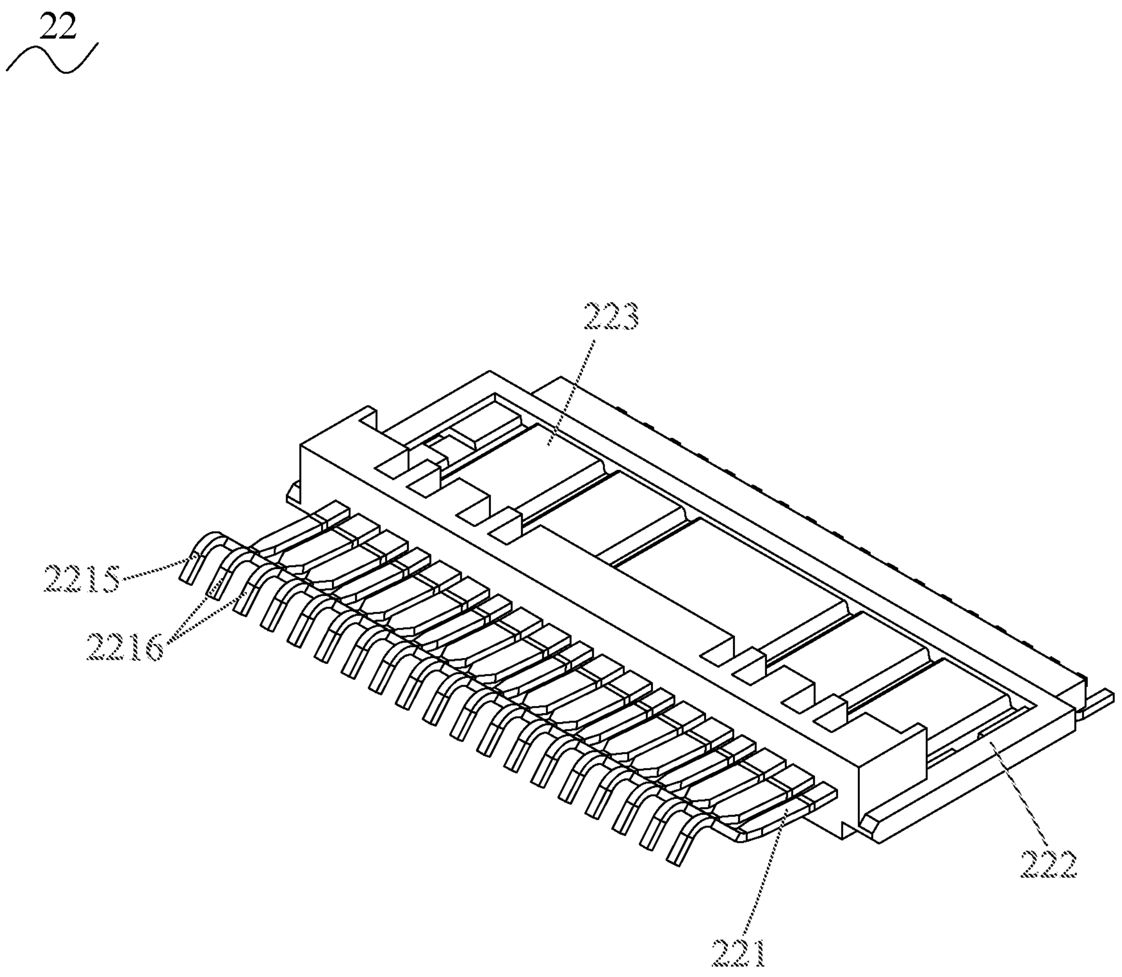
FIG. 11 is a perspective view of a second terminal assembly of the terminal module of the high-speed connector of FIG. 3.

Referring to FIG. 6, FIG. 8 and FIG. 9, in the first preferred embodiment, the first conductive film 213 is adhered to bottom surfaces of the plurality of the first protruding portions 2124 along a shape of each first protruding portion 2124, and the first conductive film 213 covers inner walls of the plurality of the first lacking grooves 2125 of the first base body 212 along a shape of each first lacking groove 2125. The at least one first protruding portion 2124 is blocked among the first conductive film 213 and the first fastening portions 2111 of the at least two first signal terminals 2117. The first conductive film 213 is isolated from the first fastening portions 2111 of the at least two first signal terminals 2117 by the at least one first protruding portion 2124. The plurality of the first protruding portions 2124 are blocked among the first conductive film 213 and the first fastening portions 2111 of the plurality of the first signal terminals 2117. The first conductive film 213 is isolated from the first fastening portions 2111 of the plurality of the first signal terminals 2117 by the plurality of the first protruding portions 2124, so that the first conductive film 213 is prevented from contacting the first fastening portions 2111 of the plurality of the first signal terminals 2117.

In the first preferred embodiment, corresponding portions of the first conductive film 213 of the first terminal assembly 21 project into the plurality of the first lacking grooves 2125 of the first base body 212. The corresponding portions of the first conductive film 213 are electrically connected to the first fastening portions 2111 of the plurality of the first grounding terminals 2116 to make the plurality of the first grounding terminals 2116 form a grounding structure 26. The plurality of the first grounding terminals 2116 in the first perforations 2123 of the first base body 212 form the grounding structure 26. In this way, a signal noise is able to be effectively absorbed and suppressed for improving transmission quality of a high-frequency signal.

Figure 24:
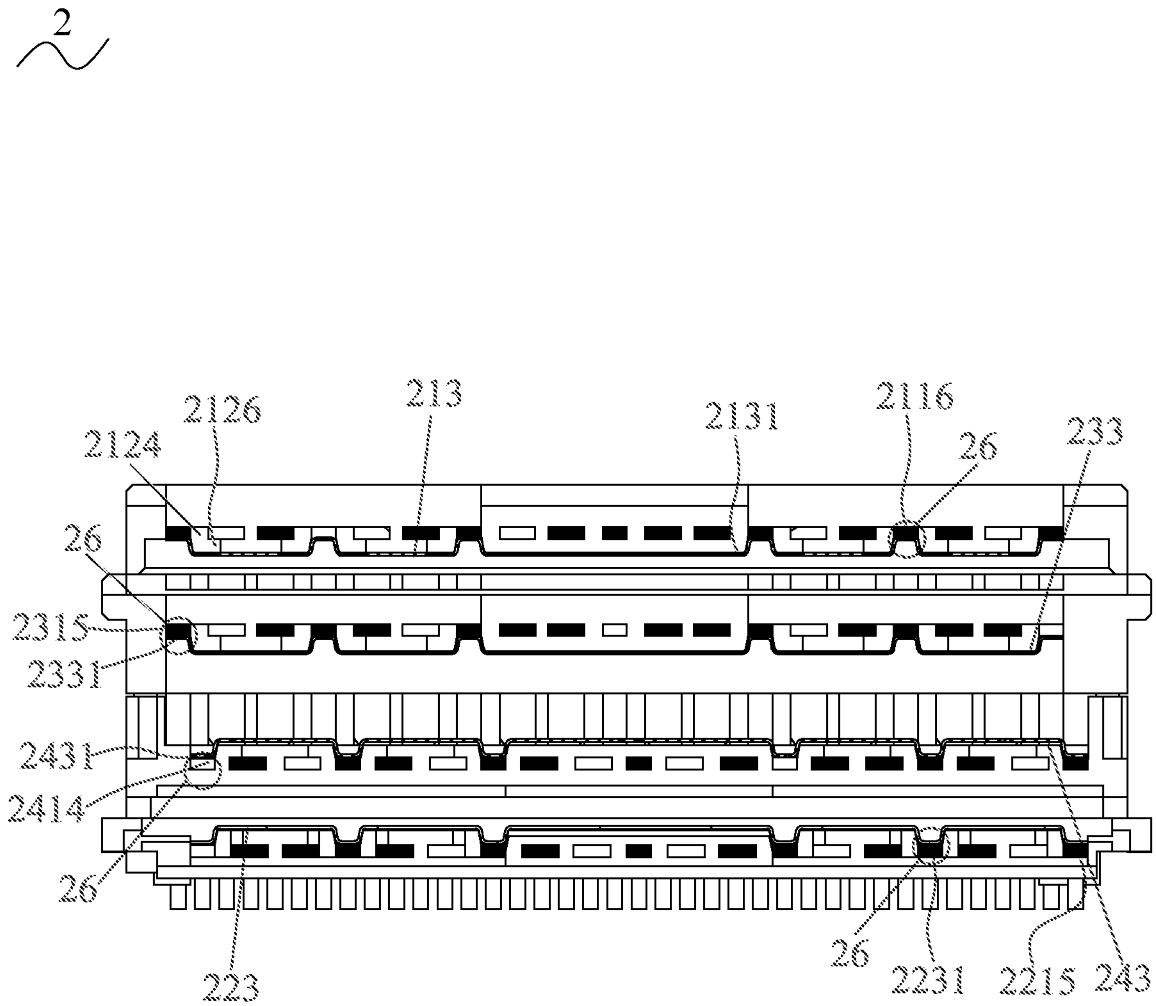
FIG. 24 is a sectional view of the high-speed connector in accordance with a second preferred embodiment of the present invention.
Figure 25:
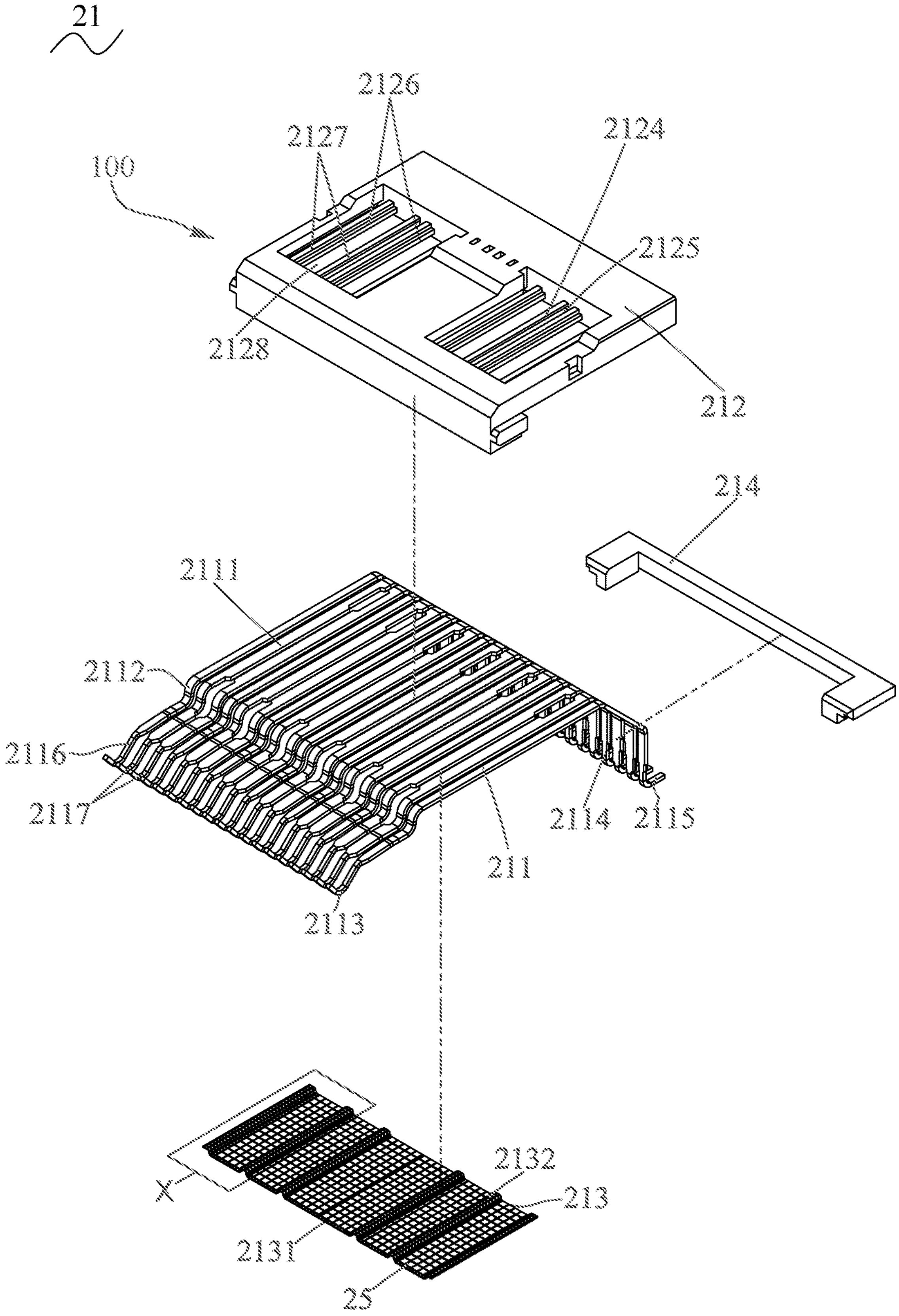
FIG. 25 is an exploded view of the first terminal assembly of the terminal module of the high-speed connector in accordance with the second preferred embodiment of the present invention.
Figure 26:
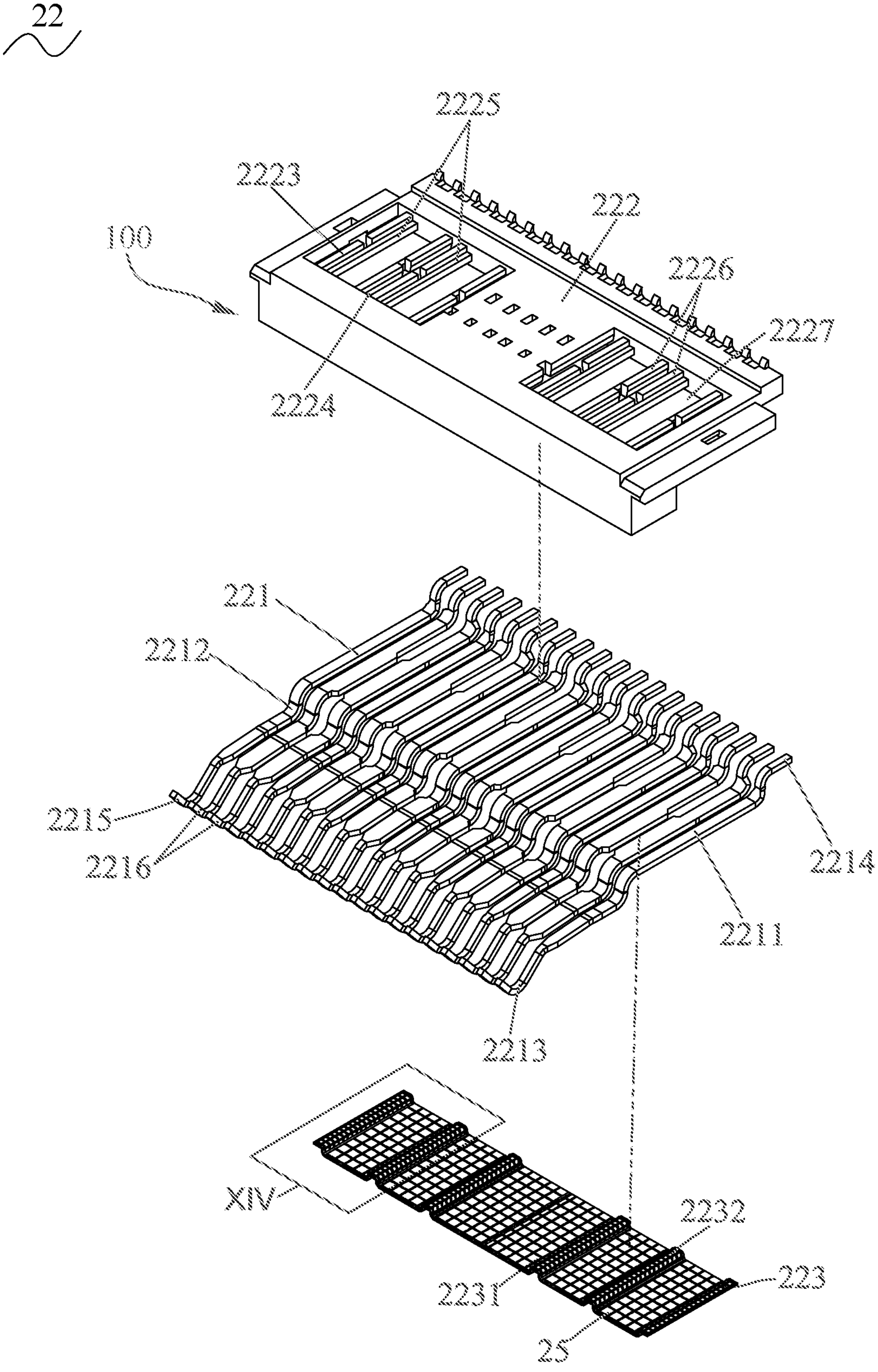
FIG. 26 is an exploded view of the second terminal assembly of the terminal module of the high-speed connector in accordance with the second preferred embodiment of the present invention.

Referring to FIG. 24 and FIG. 25, a high-speed connector 100 in accordance with a second preferred embodiment of the present invention is shown. An exploded view of the high-speed connector 100 is shown in FIG. 25. Differences between the first terminal assembly 21 of the high-speed connector 100 in accordance with the first preferred embodiment and the first terminal assembly 21 of the high-speed connector 100 in accordance with the second preferred embodiment are described as follows. In the second preferred embodiment, several portions of the bottom of the first base body 212 extend downward to form the plurality of the first protruding portions 2124. The plurality of the first protruding portions 2124 are integrally molded in the first fastening groove 2122. The plurality of the first protruding portions 2124 are transversely arranged in a row. The plurality of the first protruding portions 2124 are transversely arranged in two groups. The first base body 212 has the plurality of the first lacking grooves 2125. The plurality of the first lacking grooves 2125 are disposed among the plurality of the first protruding portions 2124. In each group of the first protruding portions 2124, each two adjacent first lacking grooves 2125 are isolated by two first protruding portions 2124. The two first protruding portions 2124 clamp the two adjacent first signal terminals 2117. The plurality of the first protruding portions 2124 extend longitudinally in the first fastening groove 2122. A front end and a rear end of each first protruding portion 2124 are connected to a front end wall and a rear end wall of the first fastening groove 2122, respectively. An extending direction of each first protruding portion 2124 and an extending direction of a middle of each first terminal 211 are the same.

In the second preferred embodiment, the first conductive film 213 is adhered to bottom surfaces of the plurality of the first protruding portions 2124 along shapes of the plurality of the first terminals 211 and shapes of the plurality of the first protruding portions 2124.

In the second preferred embodiment, each first protruding portion 2124 has a first restricting portion 2126 and a first blocking portion 2127. The plurality of the first protruding portions 2124 are transversely arranged in the first fastening groove 2122, and each first protruding portion 2124 extends along the longitudinal direction. One side of each first blocking portion 2127 is recessed inward to form the first restricting portion 2126. The other side of each first protruding portion 2124 extends upward to form the first blocking portion 2127. Top spaces of each two facing first restricting portions 2126 of two first protruding portions 2124 extend towards each other to form a first interval 2128. Each first blocking portion 2127 is disposed between one first grounding terminal 2116 and one first signal terminal 2117. The plurality of the first signal terminals 2117 are corresponding to the plurality of the first restricting portions 2126 of the plurality of the first protruding portions 2124. Each first interval 2128 accommodates the two adjacent first signal terminals 2117. The plurality of the first signal terminals 2117 are disposed to the plurality of the first restricting portions 2126. The plurality of the first grounding terminals 2116 are disposed corresponding to the plurality of the first blocking portions 2127 and are disposed away from the plurality of the first restricting portions 2126. The plurality of the first grounding terminals 2116 project into the first lacking grooves 2125 among the plurality of the first protruding portions 2124. The plurality of the first grounding terminals 2116 are partially fastened in the plurality of the first lacking grooves 2125. The six first grounding terminals 2116 project into the six first lacking grooves 2125 among the plurality of the first protruding portions 2124. Each first protruding portion 2124 is located between the one first grounding terminal 2116 and the one first signal terminal 2117. Each first blocking portion 2127 is located between the one first signal terminal 2117 and the one first grounding terminal 2116. The bottom surfaces of the plurality of the first fastening portions 2111 of the plurality of the first signal terminals 2117 are partially blocked by the plurality of the first restricting portions 2126.

The first conductive film 213 is disposed in the first fastening groove 2122 of the first base body 212, and the first conductive film 213 is covered to the plurality of the first protruding portions 2124, middles of the plurality of the first signal terminals 2117 and the plurality of the first grounding terminals 2116. The first conductive film 213 is adhered to bottom surfaces of the plurality of first protruding portions 2124 along a shape of each first protruding portion 2124 and the plurality of the first grounding terminals 2116. The plurality of the first restricting portions 2126 of the plurality of first protruding portions 2124 are blocked among the first conductive film 213 and the first fastening portions 2111 of the plurality of the first signal terminals 2117, so that the first conductive film 213 is prevented from contacting the first fastening portions 2111 of the plurality of the first signal terminals 2117.

The first conductive film 213 has a first metal layer 2131, a plurality of first ribs 2132 and a plurality of interlaced lines 27. Several portions of the first conductive film 213 are arched upward to form the plurality of the first ribs 2132. A quantity of the plurality of the first ribs 2132 is six. The first metal layer 2131 is located at a top surface of the first conductive film 213. The first metal layer 2131 is designed to be a pattern 28 with a plurality of pores 25, and shapes of the plurality of the pores 25 of the pattern 28 of the first metal layer 2131 are the same. The plurality of the pores 25 are formed by the plurality of the interlaced lines 27. The plurality of the interlaced lines 27 are extended on the top surface of the first conductive film 213, so the signals partially penetrate through the plurality of the pores 25 of the first metal layer 2131, and the signals are partially reflected by the first metal layer 2131.

At least two portions of the first metal layer 2131 of the first conductive film 213 project into the at least two first lacking grooves 2125. The first metal layer 2131 is electrically connected with the at least two first grounding terminals 2116 to form the grounding structure 26. Corresponding portions of the first metal layer 2131 of the first conductive film 213 project into the plurality of the first lacking grooves 2125 of the first base body 212. The corresponding portions of the first metal layer 2131 of the first conductive film 213 of the first terminal assembly 21 are electrically connected to the first fastening portions 2111 of the plurality of the first grounding terminals 2116 to make the plurality of the first grounding terminals 2116 form the grounding structure 26. The plurality of the first grounding terminals 2116 in the first perforations 2123 of the first base body 212 form the grounding structure 26. In this way, the signal noise is able to be effectively absorbed and suppressed for improving the transmission quality of the high-frequency signal.

In the concrete implementation, the plurality of the pores 25 of the pattern 28 of the first metal layer 2131 are different shapes. A shape of the pattern 28 of the first metal layer 2131 is without being limited.

The high-speed connector 100 is capable of reducing a resonance point in a high frequency characteristic by virtue of the pattern 28 of the first metal layer 2131 with the plurality of the pores 25, so an oscillation is reduced to improve the high frequency characteristic of the high-speed connector 100, and an oscillation affection is smaller in the high frequency characteristic. The high-speed connector 100 is capable of improving a far-end crosstalk, a near-end crosstalk, an insertion loss and a return loss, so performances of the far-end crosstalk, the near-end crosstalk, the insertion loss and the return loss are better.

In the first preferred embodiment and the second preferred embodiment, each pore 25 is shown as a square shape. In the concrete implementation, each pore 25 is any shape, and the pattern 28 is any shape. The pattern 28 is able to be composed by at least two groups of the pores 25, and the plurality of the pores 25 of the at least two groups are different. When the pattern 28 is composed by two groups of the pores 25, each pore 25 of the one group is shown as the square shape, and each pore 25 of the other group is shown as an L shape. The first metal layer 2131 is formed on the top surface of the first conductive film 213 by an electroplating technology and a laser engraving technology etc. The first metal layer 2131 is formed on the first conductive film 213 by an evaporation technology.

Referring to FIG. 6, FIG. 8 and FIG. 9, in the first preferred embodiment, the first metal layer 2131 is adhered to the bottom surface of the at least one first protruding portion 2124. The first metal layer 2131 is adhered to the bottom surfaces of the plurality of the first protruding portions 2124. The first metal layer 2131 of the first conductive film 213 is partially inserted into the at least two first lacking grooves 2125. The first metal layer 2131 of the first conductive film 213 is electrically connected with the first fastening portions 2111 of the at least two first grounding terminals 2116 to make the at least two first grounding terminals 2116 form the grounding structure 26. The plurality of the first ribs 2132 are received in the plurality of the first lacking grooves 2125. The plurality of the first ribs 2132 of the first metal layer 2131 of the first conductive film 213 are electrically connected with the first fastening portions 2111 of the plurality of the first grounding terminals 2116 to make the plurality of the first grounding terminals 2116 form the grounding structure 26. The plurality of the first grounding terminals 2116 in the first perforations 2123 of the first base body 212 form the grounding structure 26. In this way, the signal noise is able to be effectively absorbed and suppressed for improving the transmission quality of the high-frequency signal.

Referring to FIG. 11 to FIG. 14, the second terminal assembly 22 is corresponding to the first terminal assembly 21 along the up-down direction. The second terminal assembly 22 includes a plurality of second terminals 221, a second base body 222 and a second conductive film 223. The plurality of the second terminals 221 are fastened to the second base body 222, and the plurality of the second terminals 221 are partially surrounded by the second base body 222. The second conductive film 223 is disposed on the second base body 222.

Each second terminal 221 has a second fastening portion 2211, a second stepping portion 2212, a second contact portion 2213 and a second soldering portion 2214. The plurality of the second terminals 221 include at least two second grounding terminals 2215 and at least two second signal terminals 2216. The plurality of the second terminals 221 include a plurality of second grounding terminals 2215 and a plurality of second signal terminals 2216. In the first preferred embodiment, the plurality of the second terminals 221 include seven second grounding terminals 2215 and twelve second signal terminals 2216. Each two adjacent second signal terminals 2216 are located between two second grounding terminals 2215. Each second signal terminal 2216 is used for transmitting the signals.

A front end of the second fastening portion 2211 of each second terminal 221 is bent upward to form the second stepping portion 2212. The second stepping portion 2212 of each second terminal 221 is disposed in a front end of the second base body 222. A front end of the second stepping portion 2212 of each second terminal 221 extends frontward and then is arched upward to form the second contact portion 2213. The second contact portion 2213 of each second terminal 221 projects beyond a front surface of the second base body 222. The plurality of the second contact portions 2213 of the plurality of the second terminals 221 are disposed in the lower row of the plurality of the terminal slots 13. Top surfaces of the plurality of the second contact portions 2213 of the plurality of the second terminals 221 are exposed out of the lower row of the terminal slots 13 and project into the penetrating groove 14. A rear end of the second fastening portion 2211 of each second terminal 221 is bent downward and then extends rearward to form the second soldering portion 2214. The plurality of the second soldering portions 2214 of the plurality of the second terminals 221 are soldered to the second soldering zone 32 of the circuit board 3.

Referring to FIG. 5 to FIG. 12, lengths of the plurality of the first fastening portions 2111 of the plurality of the first terminals 211 are longer than lengths of the plurality of the second fastening portions 2211 of the plurality of the second terminals 221 along the longitudinal direction. Lengths of the plurality of the first stepping portions 2112 of the plurality of the first terminals 211 and lengths of the plurality of the second stepping portions 2212 of the plurality of the second terminals 221 are the same along the longitudinal direction. Lengths of the plurality of the first contact portions 2113 of the plurality of the first terminals 211 and lengths of the plurality of the second contact portions 2213 of the plurality of the second terminals 221 are the same along the longitudinal direction.

Referring to FIG. 11 to FIG. 14, the second base body 222 surrounds the plurality of the second fastening portions 2211 and the plurality of the second stepping portions 2212 of the plurality of the second terminals 221. The second base body 222 has a second fastening groove 2221, at least one second protruding portion 2223 and at least two second perforations 2222. In the first preferred embodiment, the second base body 222 has the second fastening groove 2221 and two second perforations 2222. A middle of a top surface of the second base body 222 is recessed downward to form the second fastening groove 2221. The second conductive film 223 is disposed in the second fastening groove 2221 of the second base body 222. The at least one second protruding portion 2223 is protruded upward from a bottom wall of the second fastening groove 2221, and the at least one second protruding portion 2223 is integrally molded in the second fastening groove 2221. Two sides of the second base body 222 define the at least two second perforations 2222 penetrating through the top surface and a bottom surface of the second base body 222. The second fastening groove 2221 is communicated with each second perforation 2222. The at least two second signal terminals 2216 penetrate through the at least one second protruding portion 2223 along the longitudinal direction. The at least one second protruding portion 2223 is blocked among the at least two second signal terminals 2216 and the second conductive film 223.

The second fastening portions 2211 of the at least two second grounding terminals 2215 and the second fastening portions 2211 of the at least two second signal terminals 2216 are partially exposed outside to the at least two second perforations 2222. The plurality of the second fastening portions 2211 of the plurality of the second grounding terminals 2215 and the plurality of the second fastening portions 2211 of the plurality of the second signal terminals 2216 are partially exposed outside to the at least two second perforations 2222. In the first preferred embodiment, the two sides of the second base body 222 define the two second perforations 2222 penetrating through the top surface and the bottom surface of the second base body 222. The plurality of the second fastening portions 2211 of the plurality of the second grounding terminals 2215 and the plurality of the second fastening portions 2211 of the plurality of the second signal terminals 2216 are partially exposed outside to the two second perforations 2222. The second fastening portions 2211 of six second grounding terminals 2215 are exposed to the two second perforations 2222 of the two sides of the second base body 222. The second fastening portion 2211 of the middle second grounding terminal 2215 is surrounded by a middle of the second base body 222.

The second base body 222 has a plurality of the second protruding portions 2223. Several portions of a top of the second base body 222 extend upward to form the plurality of the second protruding portions 2223. The at least two second signal terminals 2216 penetrate through the at least one second protruding portion 2223 along the longitudinal direction. In the first preferred embodiment, the plurality of the second protruding portions 2223 are protruded upward from the bottom wall of the second fastening groove 2221, and the plurality of the second protruding portions 2223 are integrally molded in the second fastening groove 2221. The plurality of the second protruding portions 2223 are located at a front end wall and a rear end wall of the second fastening groove 2221. The plurality of the second protruding portions 2223 are arranged in two rows. Each row of the second protruding portions 2223 are arranged transversely. Each second protruding portion 2223 extends transversely, and a middle of each second terminal 221 extends horizontally. An extending direction of each second protruding portion 2223 is perpendicular to an extending direction of the middle of each second terminal 221.

In the first preferred embodiment, each second protruding portion 2223 is corresponding to two second signal terminals 2216. Each second protruding portion 2223 surrounds the two adjacent second signal terminals 2216 along the longitudinal direction. Top surfaces of the second fastening portions 2211 of the plurality of the second signal terminals 2216 are partially surrounded by the plurality of the second protruding portions 2223. Two sides of the at least one second protruding portion 2223 define at least two second lacking grooves 2224. The at least two second grounding terminals 2215 are fastened in the at least two second lacking grooves 2224. The second conductive film 223 is covered on the at least one second protruding portion 2223. The at least one second protruding portion 2223 is blocked among the second conductive film 223 and the at least two second signal terminals 2216. The second conductive film 223 is isolated from the at least two second signal terminals 2216 by the at least one second protruding portion 2223. Each two adjacent second protruding portions 2223 are spaced from each other to form a second lacking groove 2224 therebetween. Each second protruding portion 2223 is located between two adjacent second lacking grooves 2224. In the first preferred embodiment, each second lacking groove 2224 is corresponding to one second grounding terminal 2215. The plurality of the second grounding terminals 2215 are partially fastened in the plurality of the second lacking grooves 2224 of the second base body 222. Top surfaces of the second fastening portions 2211 of the plurality of the second grounding terminals 2215 are partially exposed outside to the plurality of the second lacking grooves 2224. The plurality of the second protruding portions 2223 are blocked among the second conductive film 223 and the plurality of the second signal terminals 2216. The second conductive film 223 is isolated from the plurality of the second signal terminals 2216 by the plurality of the second protruding portions 2223.

Referring to FIG. 6 to FIG. 13, in the first preferred embodiment, the second conductive film 223 is adhered to top surfaces of the plurality of the second protruding portions 2223 along a shape of each second protruding portion 2223 and a shape of each second lacking groove 2224. The second conductive film 223 covers inner walls of the plurality of the second lacking grooves 2224 along the shape of each second lacking groove 2224. The second conductive film 223 covers the at least one second protruding portion 2223 along a shape of each second protruding portion 2223. The plurality of the second grounding terminals 2215 in the second perforations 2222 of the second base body 222 form the grounding structure 26. In this way, the signal noise is able to be effectively absorbed and suppressed for improving the transmission quality of the high-frequency signal. The plurality of the second protruding portions 2223 are blocked among the second conductive film 223 and the second fastening portions 2211 of the plurality of the second signal terminals 2216 to prevent that the second conductive film 223 contacts the second fastening portions 2211 of the plurality of the second signal terminals 2216.

Referring to, FIG. 1 to FIG. 26, the high-speed connector 100 in accordance with a second preferred embodiment of the present invention is shown. Differences between the high-speed connector 100 in accordance with the first preferred embodiment and the high-speed connector 100 in accordance with the second preferred embodiment are described as follows.

In the second preferred embodiment, several portions of the top of the second base body 222 extend upward to form the plurality of the second protruding portions 2223. The plurality of the second protruding portions 2223 are integrally molded in the second fastening groove 2221. The second base body 222 has the plurality of the second lacking grooves 2224. Each second protruding portion 2223 extends longitudinally. The plurality of the second protruding portions 2223 are transversely arranged in a row. The plurality of the second protruding portions 2223 are transversely arranged in two groups. In each group of the second protruding portions 2223, each two adjacent second lacking grooves 2224 are isolated by two second protruding portions 2223. The two second protruding portions 2223 clamp the two adjacent second signal terminals 2216. The plurality of the second protruding portions 2223 are longitudinally extended in the second fastening groove 2221. A front end and a rear end of each second protruding portion 2223 are connected to a front end wall and a rear end wall of the second fastening groove 2221, respectively. An extending direction of each second protruding portion 2223 and an extending direction of a middle of each second terminal 221 are the same. The plurality of the second grounding terminals 2215 are partially fastened in the plurality of the second lacking grooves 2224. Each second protruding portion 2223 is located between one second grounding terminal 2215 and one second signal terminal 2216. The plurality of the second protruding portions 2223 are blocked among the second conductive film 223 and the plurality of the second signal terminals 2216.

In the second preferred embodiment, the second conductive film 223 is adhered to top surfaces of the plurality of the second protruding portions 2223 along a shape of each second grounding terminal 2215 and a shape of each second protruding portion 2223.

Each second protruding portion 2223 has a second restricting portion 2225 and a second blocking portion 2226. One side of each second protruding portion 2223 protrudes downward to form the second blocking portion 2226. The other side of each second protruding portion 2223 is recessed upward to form the second restricting portion 2225. Two opposite sides of each two opposite second protruding portions 2223 in each second perforation 2222 protrude downward to form two opposite second blocking portions 2226 away from each other. Bottom spaces of each two facing second restricting portions 2225 of two second protruding portions 2223 extend towards each other to form a second interval 2227. Each second blocking portion 2226 is located between one second grounding terminal 2215 and one second signal terminal 2216. Each second interval 2227 accommodates the two adjacent second signal terminals 2216.

In the second preferred embodiment, the plurality of the second signal terminals 2216 are corresponding to the plurality of the second restricting portions 2225 of the plurality of the second protruding portions 2223. The plurality of the second signal terminals 2216 are disposed in the second intervals 2227 among the plurality of the second restricting portions 2225 and the second blocking portions 2226 of the plurality of the second protruding portions 2223. The plurality of the second signal terminals 2216 in each second perforation 2222 are located under the plurality of the second restricting portions 2225 of the plurality of the second protruding portions 2223. The plurality of the second grounding terminals 2215 in each second perforation 2222 are disposed corresponding to the plurality of the second blocking portions 2226. Each second grounding terminal 2215 in each second perforation 2222 is located adjacent to one side of the second blocking portion 2226 of one second protruding portion 2223 which is away from the second restricting portion 2225 of the one second protruding portion 2223. The plurality of the second grounding terminals 2215 are disposed away from the plurality of the second restricting portions 2225 of the plurality of the second protruding portions 2223. The plurality of the second grounding terminals 2215 project into the second lacking grooves 2224 among the plurality of the second protruding portions 2223. The six second grounding terminals 2215 project into the six second lacking grooves 2224 among the plurality of the second protruding portions 2223. The second fastening portions 2211 of the middle second signal terminals 2216 are molded in a middle of the second base body 222. The top surfaces of the second fastening portions 2211 of the plurality of the second signal terminals 2216 in each second perforation 2222 are blocked by the plurality of the second restricting portions 2225. The plurality of the second restricting portions 2225 of the plurality of the second protruding portions 2223 are blocked among the second conductive film 223 and the top surfaces of the second fastening portions 2211 of the plurality of the second signal terminals 2216 in each second perforation 2222 to prevent that the second conductive film 223 contacts the second fastening portions 2211 of the plurality of the second signal terminals 2216 in each second perforation 2222.

In the second preferred embodiment, the second conductive film 223 is disposed in the second fastening groove 2221 of the second base body 222. The second conductive film 223 is covered to the plurality of the second protruding portions 2223, middles of the plurality of the second signal terminals 2216 and the second grounding terminals 2215. The second conductive film 223 has a second metal layer 2231, a plurality of second ribs 2232 and the plurality of the interlaced lines 27. Corresponding portions of the second metal layer 2231 of the second conductive film 223 project into the plurality of the second lacking grooves 2224 among the plurality of the second protruding portions 2223. The corresponding portions of the second metal layer 2231 of the second conductive film 223 of the second terminal assembly 22 are electrically connected with the plurality of the second fastening portions 2211 of the plurality of the second grounding terminals 2215 to make the plurality of the second grounding terminals 2215 form the grounding structure 26. The plurality of the second grounding terminals 2215 in the second perforations 2222 of the second base body 222 form the grounding structure 26. In this way, the signal noise is able to be effectively absorbed and suppressed for improving the transmission quality of the high-frequency signal.

Several portions of the second conductive film 223 are arched downward to form the plurality of the second ribs 2232. A quantity of the plurality of the second ribs 2232 is six. The second metal layer 2231 is located at a bottom surface of the second conductive film 223. The second metal layer 2231 is designed to be the pattern 28 with the plurality of the pores 25, and the shapes of the plurality of the pores 25 of the pattern 28 of the second metal layer 2231 are the same. The plurality of the pores 25 are formed by the plurality of the interlaced lines 27. The plurality of the interlaced lines 27 are extended on the bottom surface of the second conductive film 223, so the signals partially penetrate through the plurality of the pores 25 of the second metal layer 2231, and the signals are partially reflected by the second metal layer 2231. At least two portions of the second metal layer 2231 of the second conductive film 223 project into the at least two second lacking grooves 2224. The second metal layer 2231 is electrically connected with the at least two second grounding terminals 2215 to form the grounding structure.

In the second preferred embodiment, the pattern 28 of the second metal layer 2231 with the plurality of the pores 25 is capable of reducing the resonance point in the high frequency characteristic of the high-speed connector 100, so the oscillation is reduced to improve the high frequency characteristic of the high-speed connector 100. The high-speed connector 100 is capable of improving the far-end crosstalk, the near-end crosstalk, the insertion loss and the return loss, so the performances of the far-end crosstalk, the near-end crosstalk, the insertion loss and the return loss are better.

In the concrete implementation, the plurality of the pores 25 of the pattern 28 of the second metal layer 2231 is without being limited to the shape in accordance with the present invention. The plurality of the pores 25 of the pattern 28 of the second metal layer 2231 are able to be different shapes. In the concrete implementation, each pore 25 is any shape, and the pattern 28 is any shape. In the first preferred embodiment and the second preferred embodiment, the plurality of the pores 25 are square shapes. The pattern 28 is able to be composed by the at least two groups of the pores 25, and the plurality of the pores 25 of the at least two groups are different. When the pattern 28 is composed by three groups of the pores 25, the three groups of the pores 25 include a first group of the pores 25, a second group of the pores 25 and a third group of the pores 25. Each pore 25 of the first group is shown as the square shape, each pore 25 of the second group is shown as an inverted T shape, and each pore 25 of the third group is shown as a cross shape.

In the concrete implementation, the second metal layer 2231 is formed on the bottom surface of the second conductive film 223 by the electroplating technology and the laser engraving technology etc. The second metal layer 2231 is formed on the bottom surface of the second conductive film 223 by the evaporation technology. The pattern 28 of the first metal layer 2131 is different from the pattern 28 of the second metal layer 2231. The pattern 28 of the first metal layer 2131 is able to be designed to be cooperated with an overall structure of the first terminal assembly 21. The pattern 28 of the second metal layer 2231 is able to be designed to be cooperated with an overall structure of the second terminal assembly 22.

Figure 12:
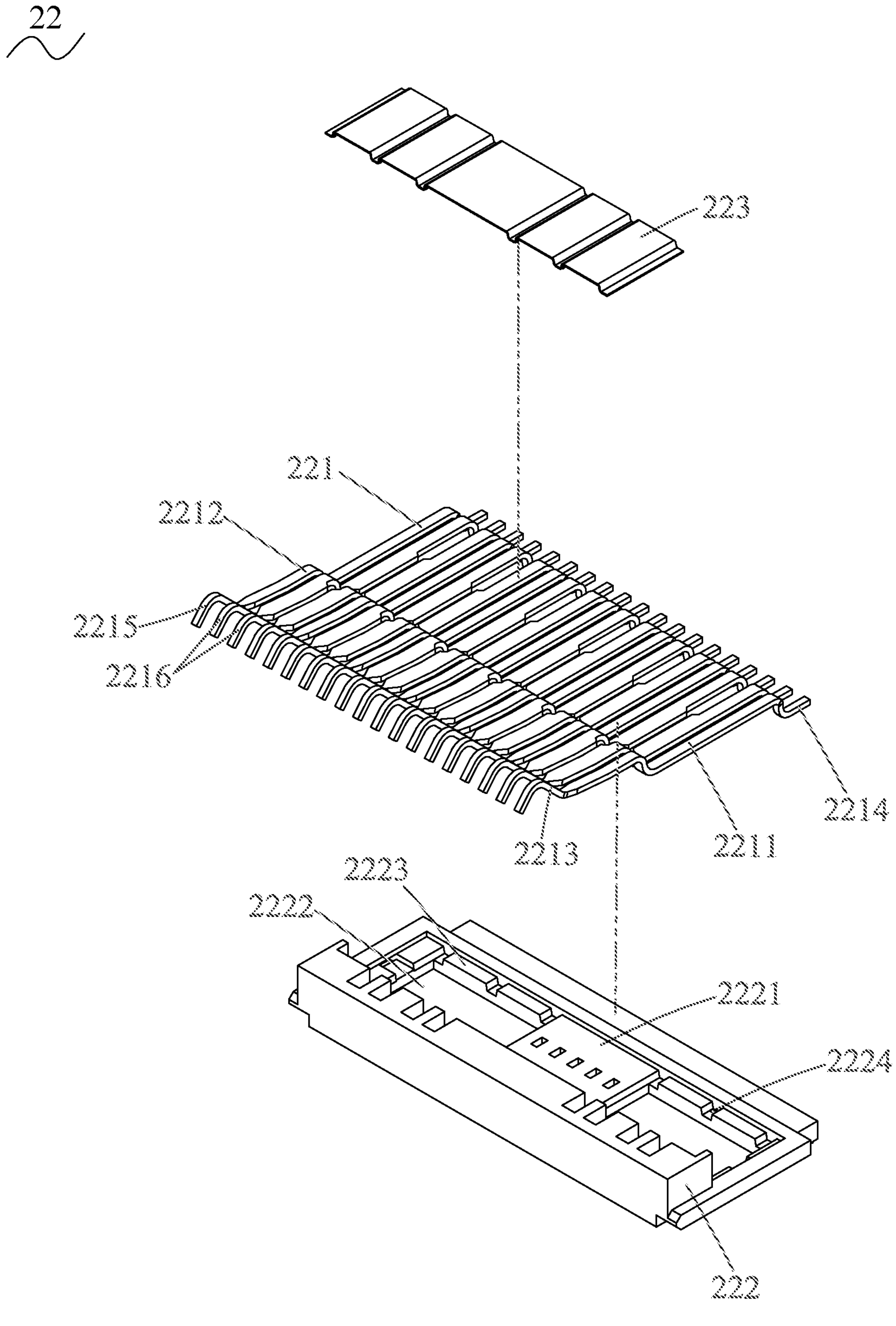
FIG. 12 is an exploded view of the second terminal assembly of the terminal module of the high-speed connector of FIG. 3.
Figure 13:
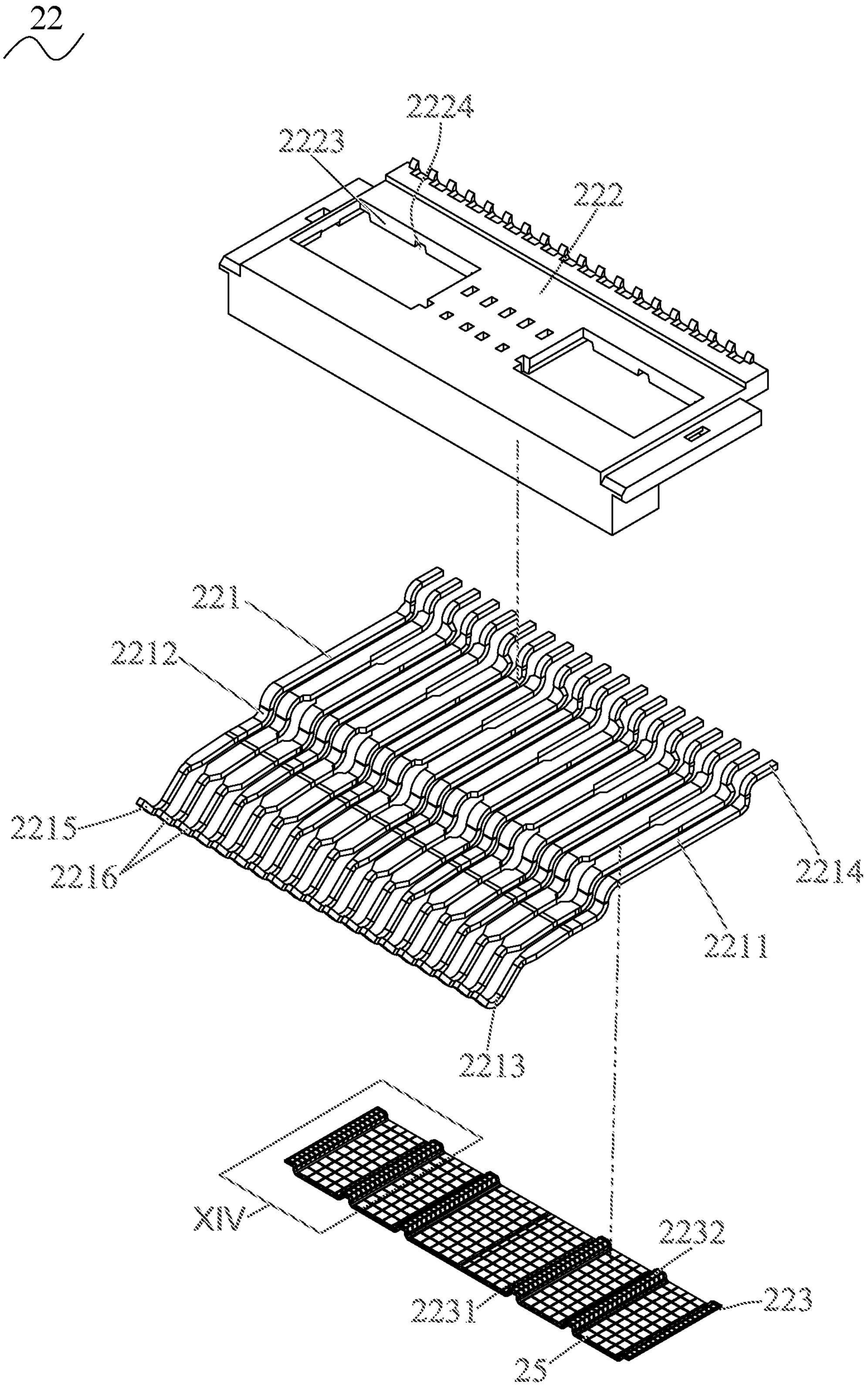
FIG. 13 is another exploded view of the second terminal assembly of the terminal module of the high-speed connector of FIG. 3.
Figure 14:
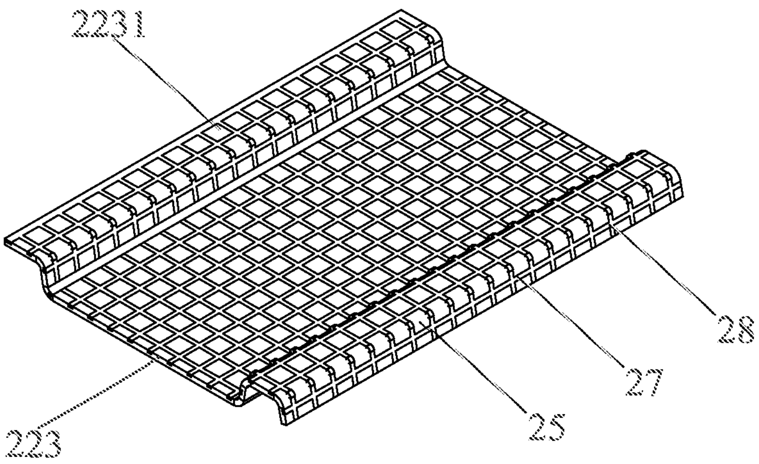
FIG. 14 is an enlarged view of an encircled portion XIV of the high-speed connector of FIG. 13.
Figure 15:
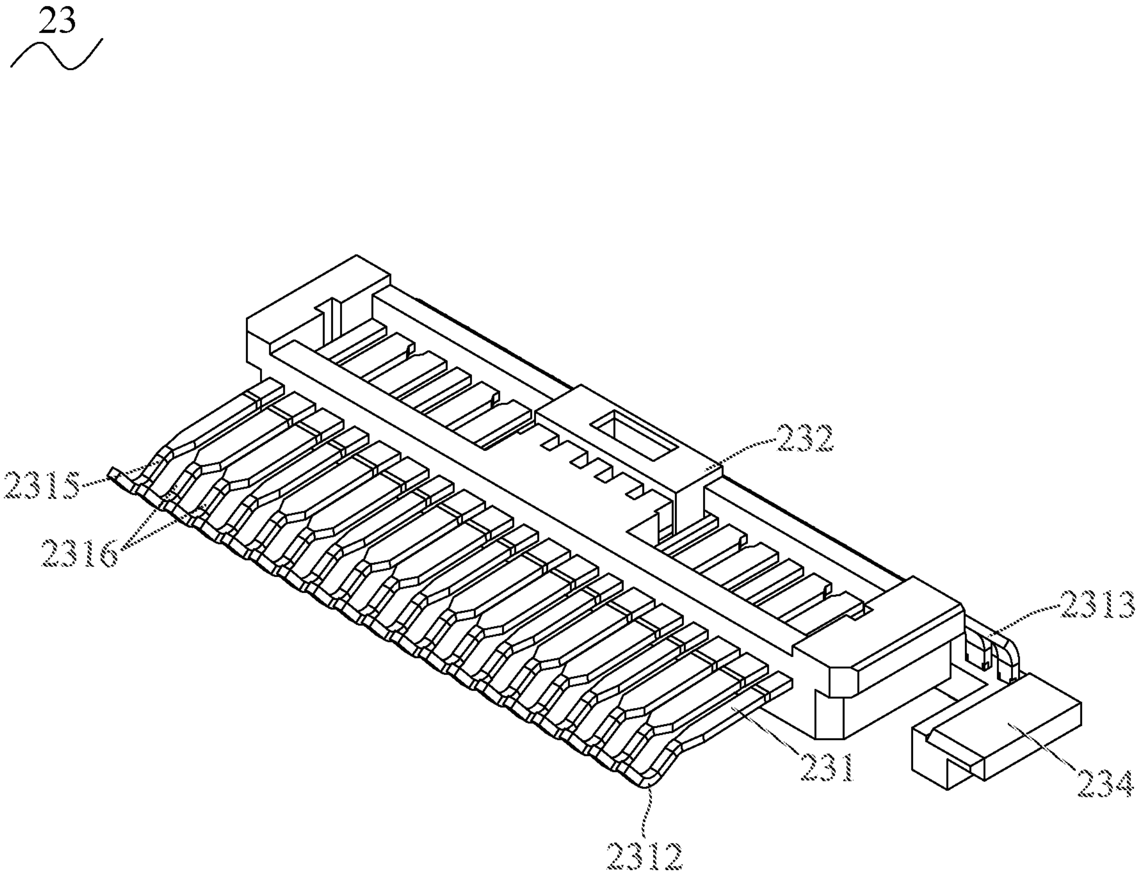
FIG. 15 is a perspective view of a third terminal assembly of the terminal module of the high-speed connector of FIG. 3.
Figure 16:
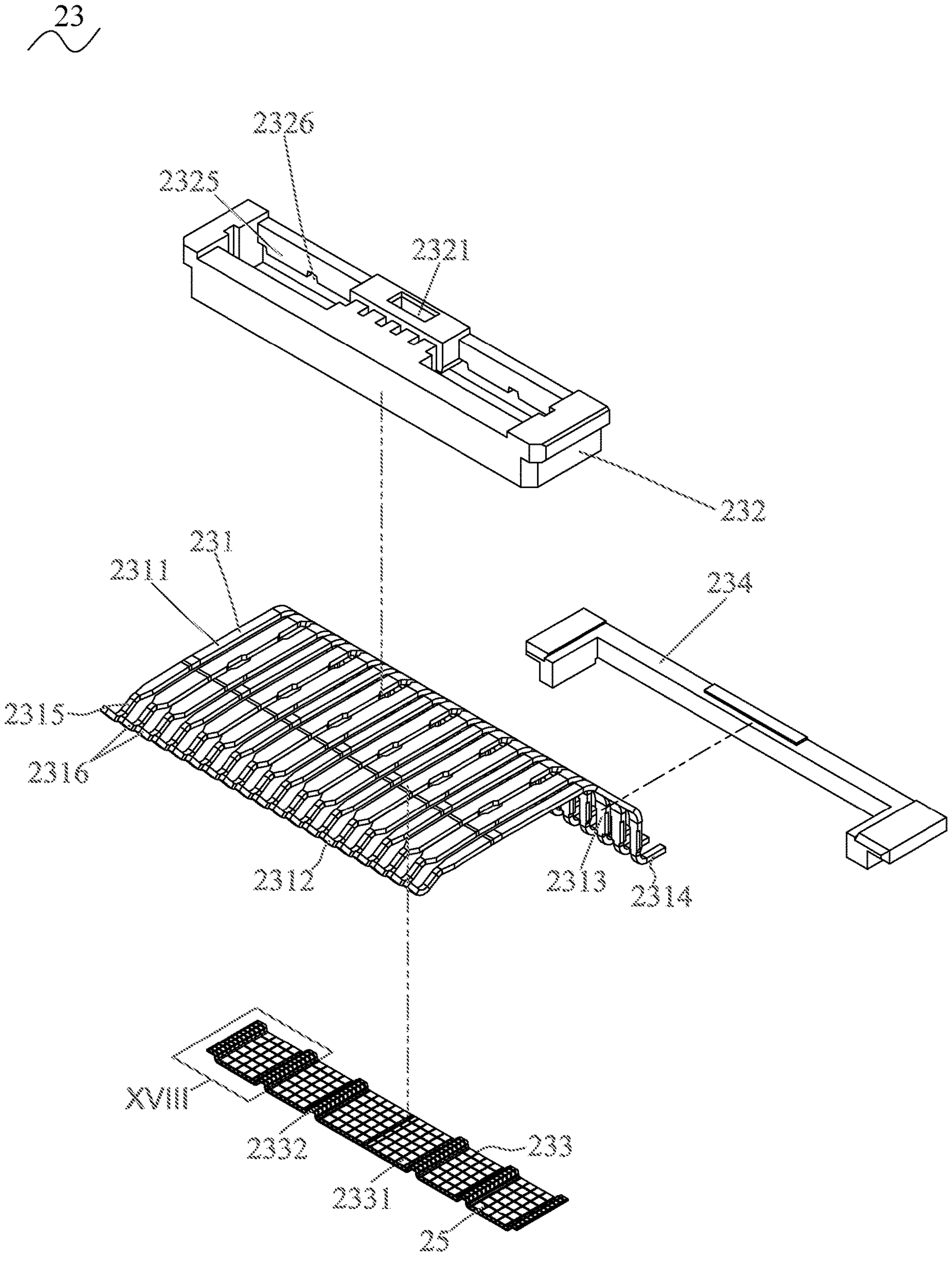
FIG. 16 is an exploded view of the third terminal assembly of the terminal module of the high-speed connector of FIG. 3.
Figure 17:
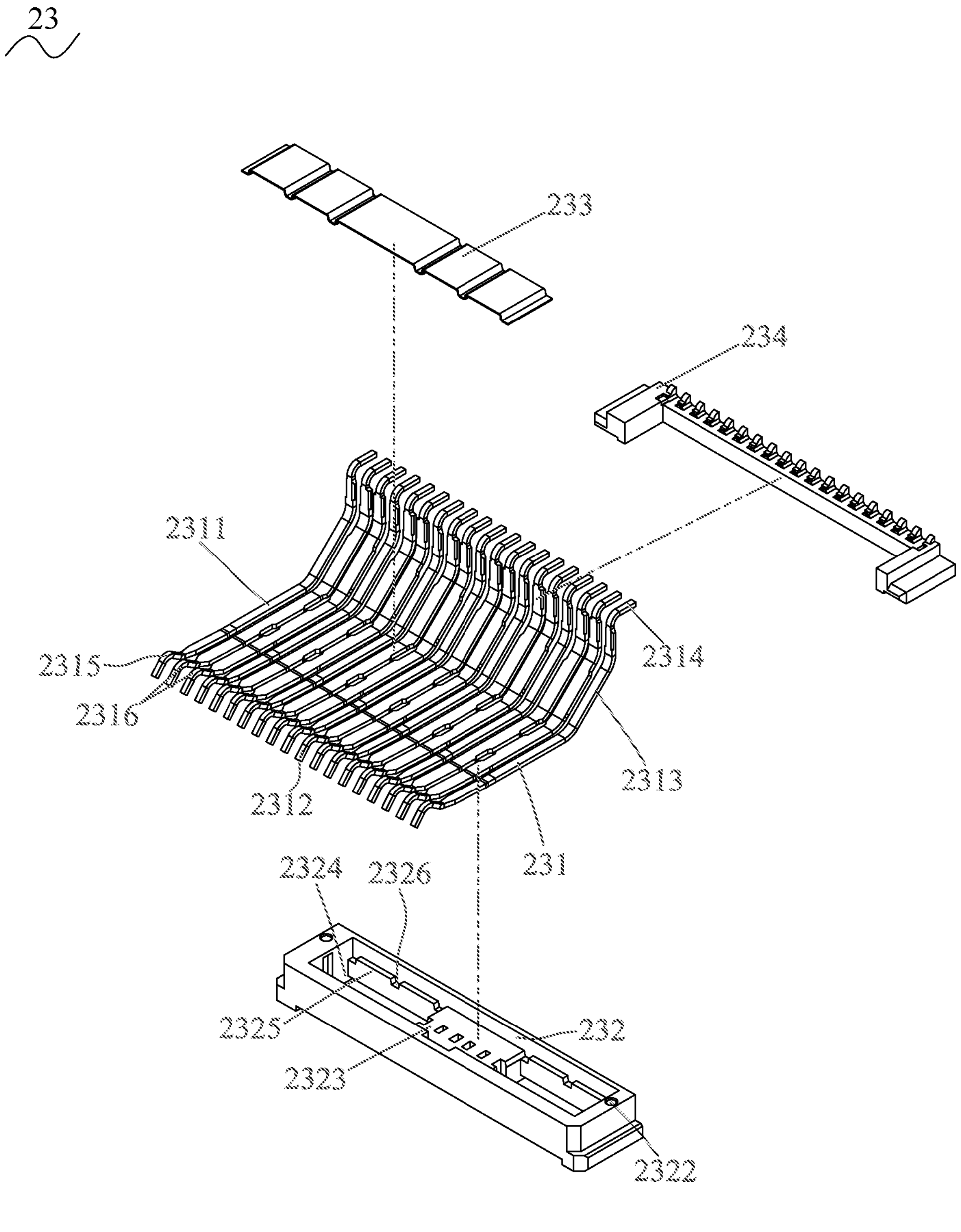
FIG. 17 is another exploded view of the third terminal assembly of the terminal module of the high-speed connector of FIG. 16.
Figure 18:
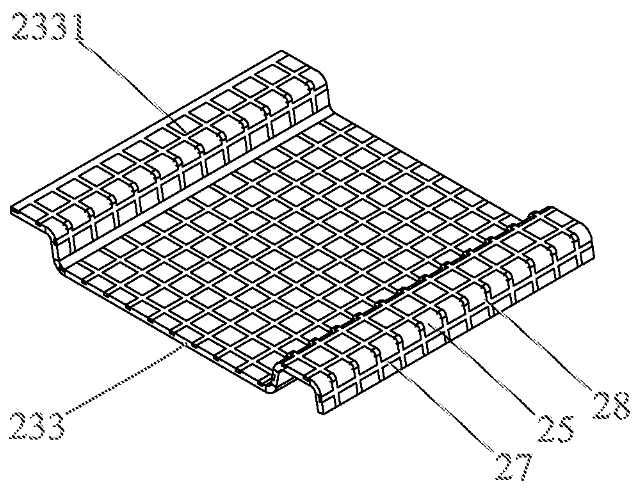
FIG. 18 is an enlarged view of an encircled portion XVIII of the high-speed connector of FIG. 16.
Figure 19:
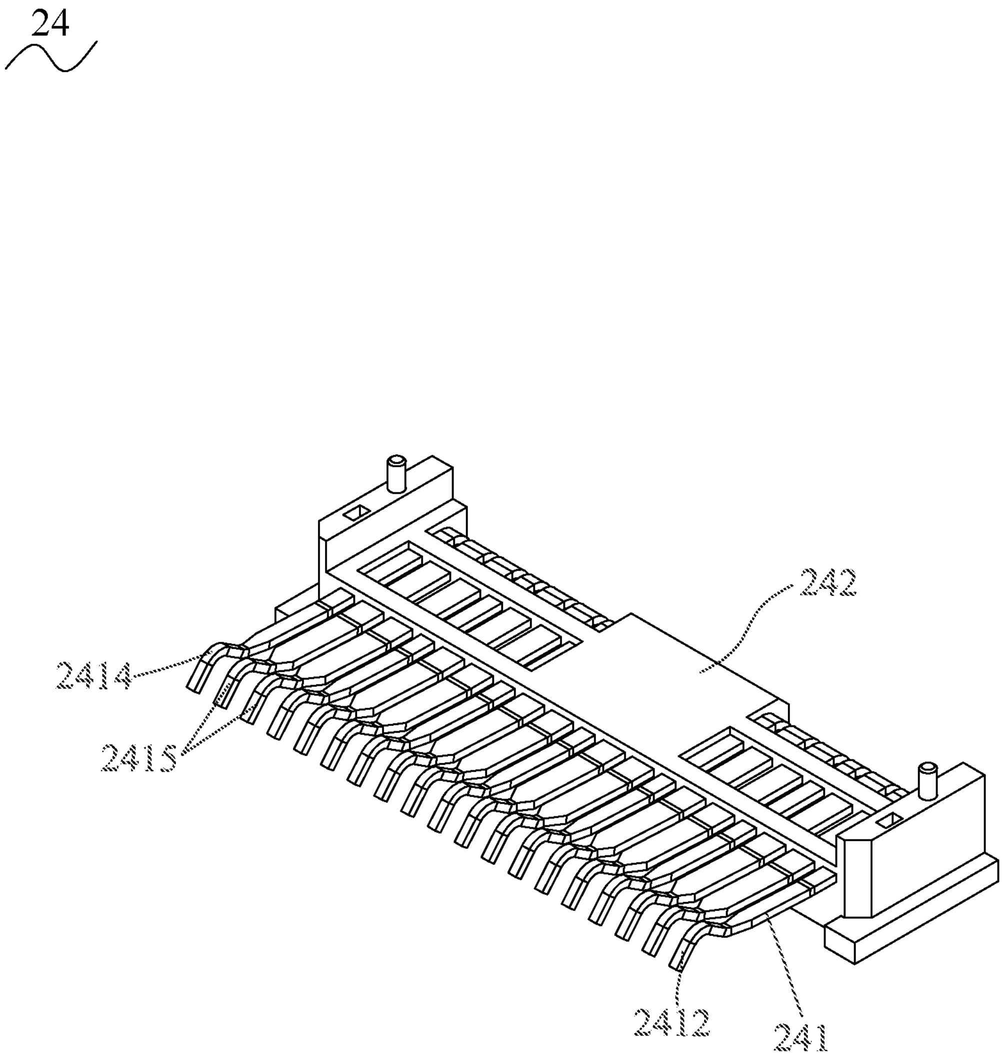
FIG. 19 is a perspective view of a fourth terminal assembly of the terminal module of the high-speed connector of FIG. 3.
Figure 20:
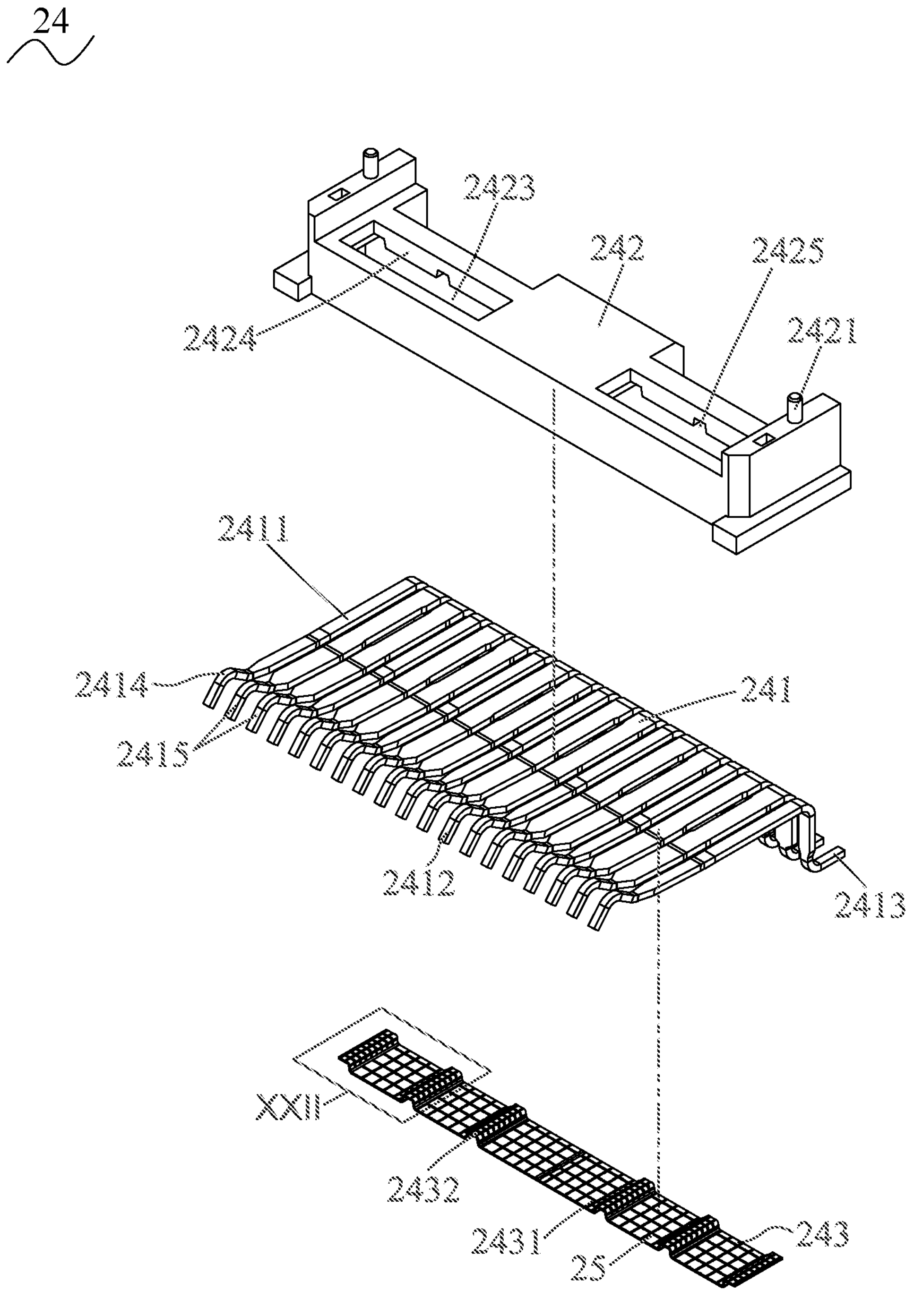
FIG. 20 is an exploded view of the fourth terminal assembly of the terminal module of the high-speed connector of FIG. 3.
Figure 21:
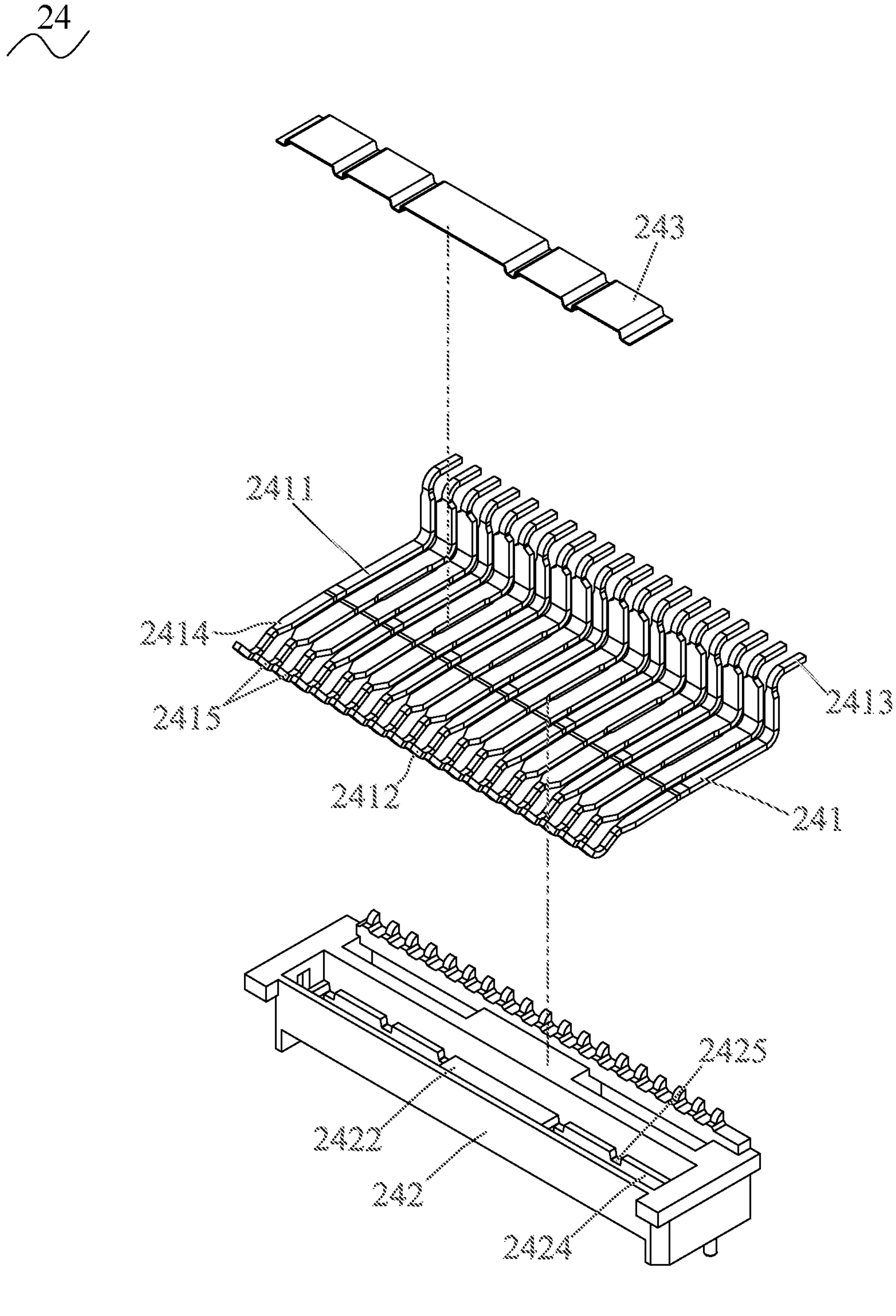
FIG. 21 is another exploded view of the fourth terminal assembly of the terminal module of the high-speed connector of FIG. 20.
Figure 22:
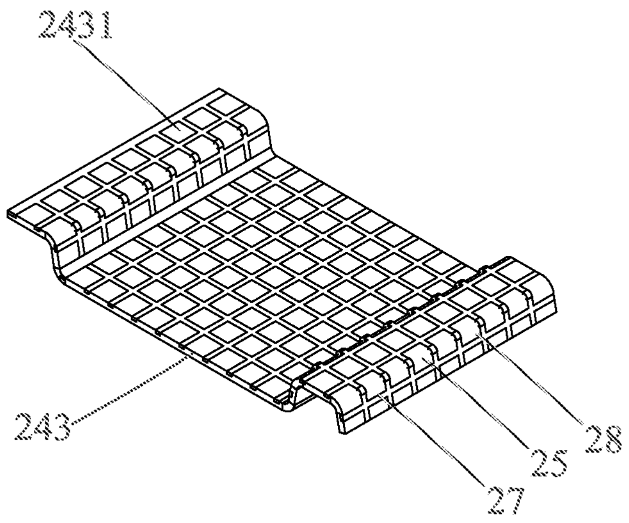
FIG. 22 is an enlarged view of an encircled portion XXII of the high-speed connector of FIG. 20.

Referring to FIG. 6, FIG. 12 and FIG. 13, in the first preferred embodiment, the second metal layer 2231 is adhered to the top surface of the at least one second protruding portion 2223. The second metal layer 2231 of the second conductive film 223 is partially inserted into the at least two second lacking grooves 2224, and are electrically connected with the second fastening portions 2211 of at least two of the plurality of the second grounding terminals 2215 to form the grounding structure 26. The plurality of the second ribs 2232 project into the plurality of the second lacking grooves 2224. The plurality of the second ribs 2232 contact with the second fastening portions 2211 of the plurality of the second grounding terminals 2215 to make the plurality of the second grounding terminals 2215 form the grounding structure 26. In the second preferred embodiment, the second metal layer 2231 of the second conductive film 22 is adhered to the top surfaces of the plurality of the second protruding portions 2223. The plurality of the second ribs 2232 contact with the plurality of the second grounding terminals 2215 in the two second perforations 2222 to make the plurality of the second grounding terminals 2215 form the grounding structure 26. The second metal layer 2231 of the second conductive film 223 is electrically connected with the plurality of the second fastening portions 2211 of the plurality of the second grounding terminals 2215 to form the grounding structure 26. The plurality of the second ribs 2232 of the second metal layer 2231 contacts with the second fastening portions 2211 of the six second grounding terminals 2215 to make the six second grounding terminals 2215 form the grounding structure 26. In this way, the signal noise is able to be effectively absorbed and suppressed for improving the transmission quality of the high-frequency signal.

Referring to FIG. 1 to FIG. 18, the third terminal assembly 23 is corresponding to the first terminal assembly 21 and the fourth terminal assembly 24. The third terminal assembly 23 includes a plurality of third terminals 231, a third base body 232, a third conductive film 233 and a second holding element 234. The plurality of the third terminals 231 are fastened to the third base body 232, and the plurality of the third terminals 231 are partially surrounded by the third base body 232. The third conductive film 233 is disposed under the third base body 232. Rear ends of the plurality of the third terminals 231 are surrounded by the second holding element 234.

Each third terminal 231 has a third fastening portion 2311, a third contact portion 2312, a second bending portion 2313 and a third soldering portion 2314. The plurality of the third terminals 231 include at least two third grounding terminals 2315 and at least two third signal terminals 2316. The plurality of the third terminals 231 include a plurality of the third grounding terminals 2315 and a plurality of the third signal terminals 2316. In the first preferred embodiment, the plurality of the third terminals 231 includes seven third grounding terminals 2315 and twelve third signal terminals 2316. Each two adjacent third signal terminals 2316 are located between two third grounding terminals 2315. Each third signal terminal 2316 is used for transmitting the signals.

A front end of the third fastening portion 2311 of each third terminal 231 extends frontward, and then is arched downward to form the third contact portion 2312. The third contact portion 2312 projects beyond a front surface of the third base body 232. A rear end of the third fastening portion 2311 of each third terminal 231 extends rearward, then slantwise extends downward and rearward, and further extends downward to form the second bending portion 2313. The second bending portion 2313 projects beyond a rear surface of the third base body 232. Tail ends of the plurality of the second bending portions 2313 are fastened to the second holding element 234. The tail ends of the plurality of the second bending portions 2313 are surrounded by the second holding element 234. The tail end of the second bending portion 2313 is bent rearward to form the third soldering portion 2314. The plurality of the third soldering portions 2314 of the plurality of the third terminals 231 are soldered to the third soldering zone 33 of the circuit board 3.

The third base body 232 surrounds the plurality of the third fastening portions 2311 of the plurality of the third terminals 231. The third base body 232 has a location portion 2321, at least one location hole 2322, a third fastening groove 2323, at least two third perforations 2324 and at least one third protruding portion 2325. Preferably, the third base body 232 has a plurality of the third protruding portions 2325. The at least one third protruding portion 2325 is protruded inward from an inner surface of a wall of the third fastening groove 2323, and the at least one third protruding portion 2325 is integrally molded in the third fastening groove 2323. Two sides of the third base body 232 define the at least two third perforations 2324 penetrating through a top surface and a bottom surface of the third base body 232. The third fastening groove 2323 is communicated with each third perforation 2324. The at least two third signal terminals 2316 penetrate through the at least one third protruding portion 2325 along the longitudinal direction. The at least one third protruding portion 2325 is blocked among the at least two third signal terminals 2316 and the third conductive film 233. In the first preferred embodiment, the third base body 232 includes the location portion 2321, two location holes 2322, the third fastening groove 2323, two third perforations 2324 and the plurality of the third protruding portions 2325. A middle of a rear end of the top surface of the third base body 232 is recessed inward to form the location portion 2321. The protrusion 2121 of the first base body 212 of the first terminal assembly 21 is used for being fastened to the location portion 2321 of the third terminal assembly 23, so that the first terminal assembly 21 is located to the third terminal assembly 23, and the first terminal assembly 21 is fastened to the third terminal assembly 23.

At least one side of a bottom surface of the third base body 232 is recessed upward to form the at least one location hole 2322. The at least one location hole 2322 of the third terminal assembly 23 is used for being fastened to a corresponding structure of the fourth terminal assembly 24, so that the third terminal assembly 23 is located to the fourth terminal assembly 24, and the third terminal assembly 23 is fastened to the fourth terminal assembly 24. In the preferred embodiment, two opposite sides of the bottom surface of the third base body 232 are recessed upward to form two location holes 2322. A middle of the bottom surface of the third base body 232 is recessed upward to form the third fastening groove 2323. The third conductive film 233 is disposed in the third fastening groove 2323 of the third base body 232. The third base body 232 defines the at least two third perforations 2324 penetrating through the top surface and the bottom surface of the third base body 232. Specifically, two sides of the third base body 232 define the two third perforations 2324 penetrating through the top surface and the bottom surface of the third base body 232. The third fastening groove 2323 is communicated with each third perforation 2324. The plurality of the third fastening portions 2311 of the plurality of the third grounding terminals 2315 and the plurality of the third fastening portions 2311 of the plurality of the third signal terminals 2316 are partially exposed outside to the at least two third perforations 2324. In the first preferred embodiment, the plurality of the third fastening portions 2311 of the plurality of the third grounding terminals 2315 and the plurality of the third fastening portions 2311 of the plurality of the third signal terminals 2316 are exposed outside to the two third perforations 2324. The third fastening portion 2311 of the middle third grounding terminal 2315 is surrounded by a middle of the third base body 232.

Several portions of a bottom of the third base body 232 extend downward to form the plurality of the third protruding portions 2325. The plurality of the third protruding portions 2325 extend along inner surfaces of front walls and rear walls of the two third perforations 2324. Each third protruding portion 2325 surrounds the two adjacent third signal terminals 2316 along the longitudinal direction. The plurality of the third signal terminals 2316 penetrate through the plurality of the third protruding portions 2325 along the longitudinal direction. The plurality of the third protruding portions 2325 are integrally molded in the third fastening groove 2323. The plurality of the third protruding portions 2325 are located at inner surfaces of a front end wall and a rear end wall of the third fastening groove 2323. The plurality of the third protruding portions 2325 are arranged in two rows. The two rows of the third protruding portions 2325 are arranged along the front-to-rear direction. Each row of the third protruding portions 2325 are arranged transversely. An extending direction of each third protruding portion 2325 is perpendicular to an extending direction of a middle of each third terminal 231.

In the first preferred embodiment, each third protruding portion 2325 is corresponding to the two third signal terminals 2316. Bottom surfaces of the third fastening portions 2311 of the plurality of the third signal terminals 2316 are partially surrounded by the plurality of the third protruding portions 2325. Two sides of the at least one third protruding portion 2325 define at least two third lacking grooves 2326. The at least two third grounding terminals 2315 are fastened in the at least two third lacking grooves 2326. The third conductive film 233 is mounted under the at least one third protruding portion 2325. The at least one third protruding portion 2325 is blocked among the third conductive film 233 and the at least two third signal terminals 2316. The third conductive film 233 is isolated from the at least two third signal terminals 2316 by the at least one third protruding portion 2325. The third base body 232 has a plurality of third lacking grooves 2326 located among the plurality of the third protruding portions 2325. Each third protruding portion 2325 is located between two adjacent third lacking grooves 2326. Each third lacking groove 2326 is corresponding to one third grounding terminal 2315. The plurality of the third grounding terminals 2315 are partially fastened in the plurality of the third lacking grooves 2326 of the third base body 232. The bottom surfaces of the third fastening portions 2311 of the plurality of the third grounding terminals 2315 are exposed to the plurality of the third lacking grooves 2326. The six third grounding terminals 2315 are fastened in the plurality of the third lacking grooves 2326. Bottom surfaces of the third fastening portions 2311 of the six third grounding terminals 2315 are partially exposed to the plurality of the third lacking grooves 2326. Each third protruding portion 2325 is clamped between two third grounding terminals 2315.

The third conductive film 233 is disposed in the third fastening groove 2323. The third conductive film 233 has a third metal layer 2331, a plurality of third ribs 2332 and the plurality of the interlaced lines 27. The third conductive film 233 is adhered to bottom surfaces of the plurality of the third protruding portions 2325 along shapes of the plurality of the third protruding portions 2325. The third conductive film 233 is covered to middles of the plurality of the third signal terminals 2316. The third conductive film 233 covers inner walls of the plurality of the third lacking grooves 2326 along shapes of the plurality of the third lacking grooves 2326. Corresponding portions of the third metal layer 2331 of the third conductive film 233 project into the plurality of the third lacking grooves 2326 of the third base body 232 along the shapes of the plurality of the third lacking grooves 2326. The corresponding portions of the third metal layer 2331 of the third conductive film 233 are electrically connected with the bottom surfaces of the third fastening portions 2311 of the plurality of the third grounding terminals 2315 in the two third perforations 2324 to make the plurality of the third grounding terminals 2315 form the grounding structure 26. The corresponding portions of the third conductive film 233 are electrically connected with the bottom surfaces of the third fastening portions 2311 of the six third grounding terminals 2315 to make the six third grounding terminals 2315 form the grounding structure 26. In this way, the signal noise is able to be effectively absorbed and suppressed for improving the transmission quality of the high-frequency signal. The plurality of the third protruding portions 2325 are blocked among the third conductive film 233 and the third fastening portions 2311 of the plurality of the third signal terminals 2316. The third conductive film 233 is isolated from the third fastening portions 2311 of the plurality of the third signal terminals 2316 by the plurality of the third protruding portions 2325, so that the third conductive film 233 is prevented from contacting the third fastening portions 2311 of the plurality of the third signal terminals 2316.

Figure 27:
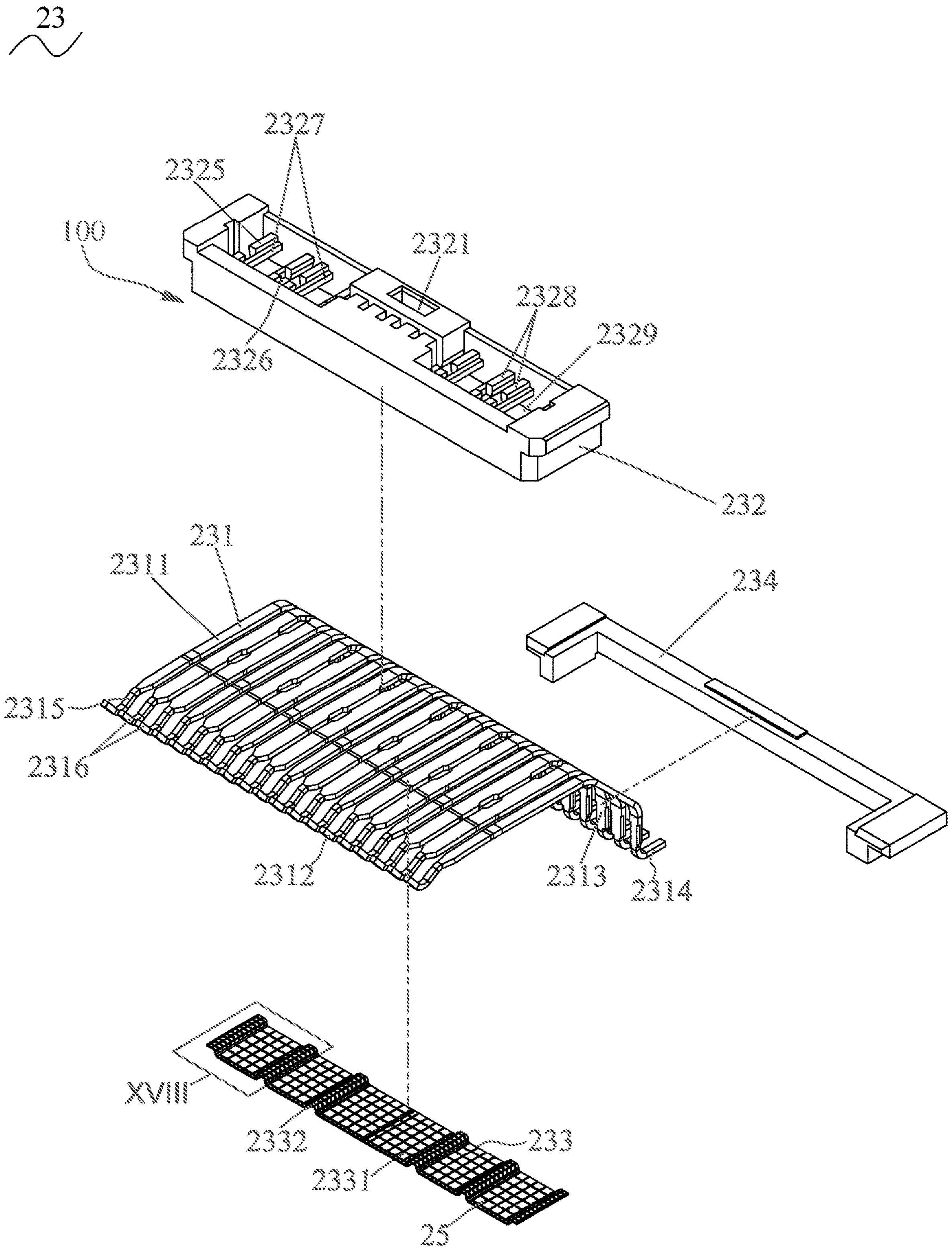
FIG. 27 is an exploded view of the third terminal assembly of the terminal module of the high-speed connector in accordance with the second preferred embodiment of the present invention.
Figure 28:
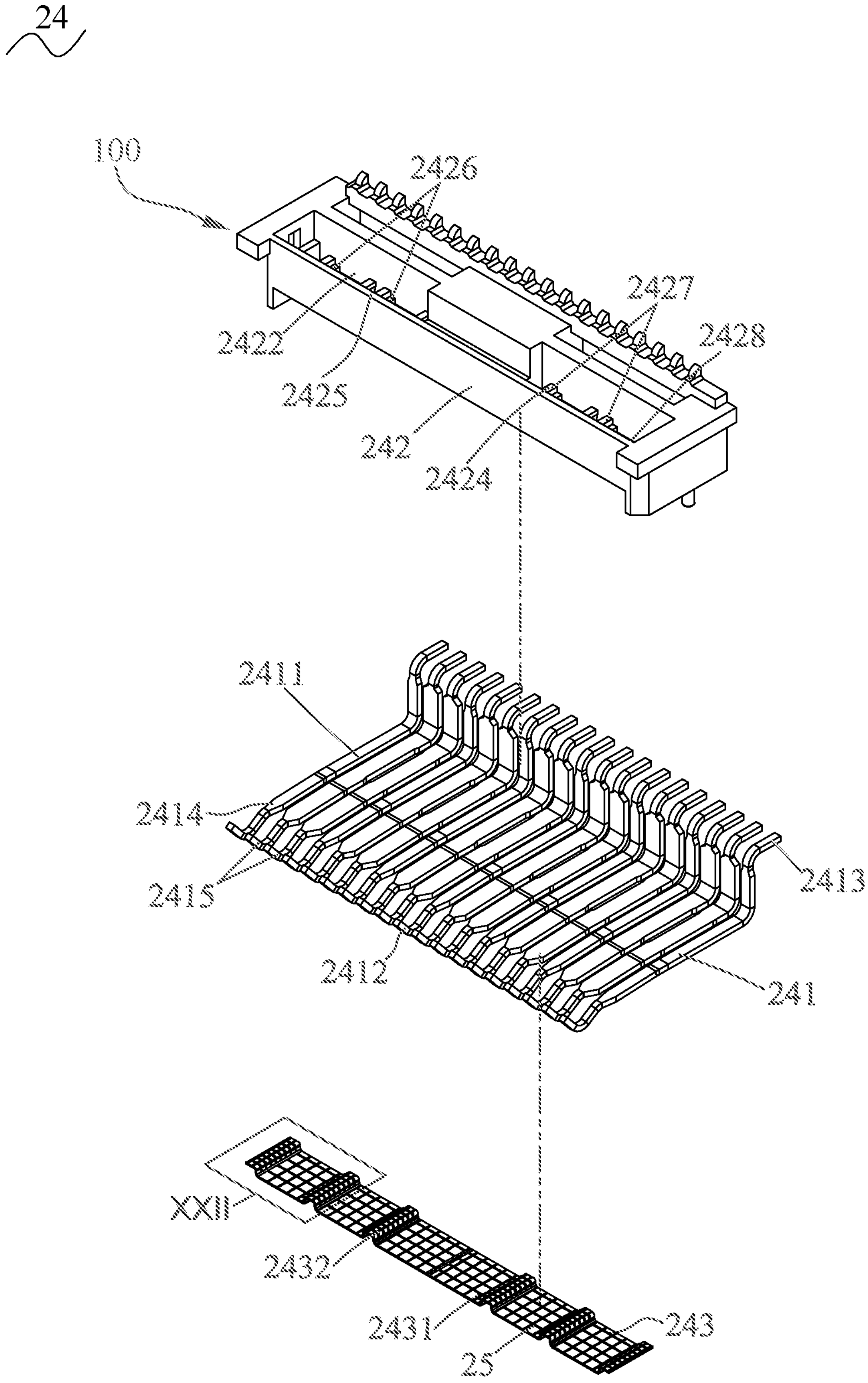
FIG. 28 is an exploded view of the fourth terminal assembly of the terminal module of the high-speed connector in accordance with the second preferred embodiment of the present invention.

Referring to FIG. 1 to FIG. 27, an exploded view of the high-speed connector 100 in accordance with a second preferred embodiment of the present invention is shown in FIG. 27. Differences between the high-speed connector 100 in accordance with the first preferred embodiment and the high-speed connector 100 in accordance with the second preferred embodiment are described as follows. In the second preferred embodiment, several portions of a bottom of the third base body 232 extend downward to form the plurality of the third protruding portions 2325. The third base body 232 has the plurality of the third lacking grooves 2326. The plurality of the third protruding portions 2325 are integrally molded in the third fastening groove 2323. The plurality of the third protruding portions 2325 are transversely arranged in a row. The plurality of the third protruding portions 2325 are transversely arranged in two groups. In each group of the third protruding portions 2325, each two adjacent third lacking grooves 2326 are isolated by two third protruding portions 2325. The two third protruding portions 2325 clamp the two adjacent third signal terminals 2316. Each third protruding portion 2325 extends along the front-to-rear direction. The plurality of the third protruding portions 2325 are longitudinally extended in the third fastening groove 2323. Front ends and rear ends of the plurality of the third protruding portions 2325 are connected to inner surfaces of a front end wall and a rear end wall of the third fastening groove 2323. An extending direction of each third protruding portion 2325 and an extending direction of the middle of each third terminal 231 are the same. The plurality of the third grounding terminals 2315 are disposed among the plurality of the third protruding portions 2325. The plurality of the third grounding terminals 2315 are partially fastened in the plurality of the third lacking grooves 2326. Each third protruding portion 2325 is located between one third grounding terminal 2315 and one third signal terminal 2316. The plurality of the third protruding portions 2325 are blocked among the third conductive film 233 and the plurality of the third signal terminals 2316.

In the second preferred embodiment, the third conductive film 233 is adhered to bottom surfaces of the plurality of the third protruding portions 2325 along shapes of the plurality of the third grounding terminals 2315 and shapes of the plurality of the third protruding portions 2325.

Each third protruding portion 2325 has a third restricting portion 2327 and a third blocking portion 2328. The plurality of the third protruding portions 2325 are transversely arranged in the third fastening groove 2323, and each third protruding portion 2325 extends along the longitudinal direction. One side of each third protruding portion 2325 is recessed downward to form the third restricting portion 2327. The other side of each third protruding portion 2325 protrudes upward to form the third blocking portion 2328. Top spaces of each two facing third restricting portions 2327 of two third protruding portions 2325 extend towards each other to form a third interval 2329. The plurality of the third signal terminals 2316 are corresponding to the plurality of the third restricting portions 2327 of the plurality of the third protruding portions 2325. The plurality of the third signal terminals 2316 are mounted on the plurality of the third restricting portions 2327 of the plurality of the third protruding portions 2325. Each third interval 2329 accommodates the two adjacent third signal terminals 2316. The plurality of the third signal terminals 2316 are disposed in the third intervals 2329 among the plurality of the third restricting portions 2327 of the plurality of the third protruding portions 2325. The plurality of the third grounding terminals 2315 are disposed corresponding to the plurality of the third blocking portions 2328. The plurality of the third grounding terminals 2315 are disposed away from the plurality of the third restricting portions 2327 of the plurality of the third protruding portions 2325. The plurality of the third grounding terminals 2315 project into the third lacking grooves 2326 among the plurality of the third protruding portions 2325. The six third grounding terminals 2315 project into the six third lacking grooves 2326 among the plurality of the third protruding portions 2325. Each third blocking portion 2328 is located between one third grounding terminal 2315 and one third signal terminal 2316. The bottom surfaces of the third fastening portions 2311 of the plurality of the third signal terminals 2316 are partially blocked by the plurality of the third restricting portions 2327 of the plurality of the third protruding portions 2325.

The third conductive film 233 is disposed in the third fastening groove 2323 of the third base body 232. At least two portions of the third metal layer 2331 of the third conductive film 233 project into the at least two third lacking grooves 2326. The third metal layer 2331 is electrically connected with the at least two third grounding terminals 2315 to form the grounding structure. The third conductive film 233 is adhered to the bottom surfaces of the plurality of the third protruding portions 2325 along the shapes of the plurality of the third protruding portions 2325 and the shapes of the plurality of the third grounding terminals 2315. The third conductive film 233 is covered to the middles of the plurality of the third signal terminals 2316. The third conductive film 233 contacts the bottom surfaces of the third fastening portions 2311 of the plurality of the third grounding terminals 2315 in the two third perforations 2324. The plurality of the third restricting portions 2327 of the plurality of the third protruding portions 2325 are blocked among the third conductive film 233 and the third fastening portions 2311 of the plurality of the third signal terminals 2316, so that the third conductive film 233 is prevented from contacting the third fastening portions 2311 of the plurality of the third signal terminals 2316. In the second preferred embodiment, the corresponding portions of the third conductive film 233 of the third terminal assembly 23 are electrically connected with the plurality of the third fastening portions 2311 of the plurality of the third grounding terminals 2315 in the two third perforations 2324 to make the plurality of the third grounding terminals 2315 form the grounding structure 26. In this way, the signal noise is able to be effectively absorbed and suppressed for improving the transmission quality of the high-frequency signal.

Several portions of a top surface of the third conductive film 233 extend upward to form the plurality of the third ribs 2332. A quantity of the plurality of the third ribs 2332 is six. The third metal layer 2331 is located at the top surface of the third conductive film 233. The third metal layer 2331 is designed to be the pattern 28 with the plurality of the pores 25, and the shapes of the plurality of the pores 25 of the pattern 28 of the third metal layer 2331 are the same. The plurality of the pores 25 are formed by the plurality of the interlaced lines 27 spread on the top surface of the third conductive film 233, so the signals partially penetrate through the plurality of the pores 25 of the third metal layer 2331, and the signals are partially reflected by the third metal layer 2331.

The pattern 28 of the third metal layer 2331 is capable of reducing the resonance point in the high frequency characteristic of the high-speed connector 100, so the oscillation is reduced to improve the high frequency characteristic of the high-speed connector 100. The oscillation affection is smaller in the high frequency characteristic. The high-speed connector 100 is capable of improving the far-end crosstalk, the near-end crosstalk, the insertion loss and the return loss, so the performances of the far-end crosstalk, the near-end crosstalk, the insertion loss and the return loss are better.

The pattern 28 of the third metal layer 2331 is without being limited to the shape in accordance with the preferred embodiment. In the concrete implementation, the plurality of the pores 25 of the pattern 28 of the third metal layer 2331 is able to be different shapes. Each pore 25 is shown as the square shape. Each pore 25 is any shape. Each pattern 28 is any shape. The pattern 28 is able to be composed by the at least two groups of the pores 25, and the plurality of the pores 25 of the at least two groups are different. When the pattern 28 is composed by the three groups of the pores 25, the three groups of the pores 25 include the first group of the pores 25, the second group of the pores 25 and the third group of the pores 25. Each pore 25 of the first group is shown as a fan shape, each pore 25 of the second group is shown as a triangle shape, and each pore 25 of the third group is shown as an oval shape. In the concrete implementation, the third metal layer 2331 is formed on the top surface of the third conductive film 233 by the electroplating technology and the laser engraving technology etc. The third metal layer 2331 is formed on the top surface of the third conductive film 233 by the evaporation technology.

In the preferred embodiment, the pattern 28 of the first metal layer 2131 and the pattern 28 of the second metal layer 2231 are different from the pattern 28 of the third metal layer 2331. The pattern 28 of the third metal layer 2331 is able to be cooperated with an overall structure of the third terminal assembly 23 to be designed.

Referring to FIG. 6 to FIG. 27, in the first preferred embodiment, the third metal layer 2331 is adhered to the bottom surfaces of the plurality of the third protruding portions 2325. In the second preferred embodiment, the third metal layer 2331 is adhered to the bottom surfaces of the plurality of the third protruding portions 2325. The third metal layer 2331 of the third conductive film 233 is partially inserted into the plurality of the third lacking grooves 2326. The plurality of the third ribs 2332 of the third metal layer 2331 of the third conductive film 233 project into the plurality of the third lacking grooves 2326 of the third base body 232. The third metal layer 2331 of the third conductive film 233 is electrically connected with the third fastening portions 2311 of the plurality of the third grounding terminals 2315 in the two third perforations 2324 to make the plurality of the third grounding terminals 2315 form the grounding structure 26. Specifically, the plurality of the third ribs 2332 of the third metal layer 2331 of the third conductive film 233 is electrically connected with the third fastening portions 2311 of the six third grounding terminals 2315 to make the six third grounding terminals 2315 form the grounding structure 26. In this way, the signal noise is able to be effectively absorbed and suppressed for improving the transmission quality of the high-frequency signal.

Referring to FIG. 19 to FIG. 22, the fourth terminal assembly 24 is corresponding to an upper portion of the third terminal assembly 23 along the up-down direction. The fourth terminal assembly 24 is corresponding to a lower portion of the third terminal assembly 23 along the longitudinal direction. The fourth terminal assembly 24 is located in front of the lower portion of the third terminal assembly 23. The fourth terminal assembly 24 is located behind the second terminal assembly 22. The fourth terminal assembly 24 includes a plurality of fourth terminals 241, a fourth base body 242 and a fourth conductive film 243. The plurality of the fourth terminals 241 are fastened to the fourth base body 242, and the plurality of the fourth terminals 241 are partially surrounded by the fourth base body 242. The fourth conductive film 243 is disposed on the fourth base body 242.

Each fourth terminal 241 has a fourth fastening portion 2411, a fourth contact portion 2412 and a fourth soldering portion 2413. The plurality of the fourth terminals 241 include a plurality of fourth grounding terminals 2414 and a plurality of fourth signal terminals 2415. The plurality of the fourth terminals 241 include at least two fourth grounding terminals 2414 and at least two fourth signal terminals 2415. In the first preferred embodiment, the plurality of the fourth terminals 241 include seven fourth grounding terminals 2414 and twelve fourth signal terminals 2415. Each two adjacent fourth signal terminals 2415 are located between two fourth grounding terminals 2414. Each fourth signal terminal 2415 is used for transmitting the signals.

A front end of the fourth fastening portion 2411 of each fourth terminal 241 extends frontward, and then is arched upward to form the fourth contact portion 2412. The fourth contact portion 2412 projects beyond a front surface of the fourth base body 242. A rear end of the fourth fastening portion 2411 extends rearward, then is bent downward and is further bent rearward to form the fourth soldering portion 2413. The fourth soldering portion 2413 projects beyond a rear surface of the fourth base body 242. The plurality of the fourth soldering portions 2413 of the plurality of the fourth terminals 241 are soldered to the fourth soldering zone 34 of the circuit board 3.

The plurality of the third soldering portions 2314 of the third terminal assembly 23 and the plurality of the fourth soldering portions 2413 of the fourth terminal assembly 24 are disposed among the plurality of the first soldering portions 2115 of the first terminal assembly 21 and the plurality of the second soldering portions 2214 of the second terminal assembly 22. The plurality of the fourth soldering portions 2413 of the fourth terminal assembly 24 are disposed among the plurality of the second soldering portions 2214 of the second terminal assembly 22 and the plurality of the third soldering portions 2314 of the third terminal assembly 23.

The fourth base body 242 surrounds the plurality of the fourth fastening portions 2411 of the plurality of the fourth terminals 241. The fourth base body 242 has at least one location foot 2421, a fourth fastening groove 2422, at least two fourth perforations 2423 and at least one fourth protruding portion 2424. In the first preferred embodiment, the fourth base body 242 includes two location feet 2421, the fourth fastening groove 2422, two fourth perforations 2423 and the plurality of the fourth protruding portions 2424. At least one side of a top surface of the fourth base body 242 extends upward to form the at least one location foot 2421. Two opposite sides of the top surface of the fourth base body 242 extend upward to form the two location feet 2421. The at least one location foot 2421 of the fourth terminal assembly 24 is fastened to the at least one location hole 2322 of the third terminal assembly 23, so that the fourth terminal assembly 24 is located to the third terminal assembly 23, and the fourth terminal assembly 24 is fastened to the third terminal assembly 23. The two location feet 2421 of the fourth terminal assembly 24 are fastened to the two location holes 2322 of the third terminal assembly 23, so that the fourth terminal assembly 24 is located to the third terminal assembly 23, and the fourth terminal assembly 24 is fastened to the third terminal assembly 23. The at least one fourth protruding portion 2424 is protruded downward from an inner surface of a wall of the fourth fastening groove 2422, and the at least one fourth protruding portion 2424 is integrally molded in the fourth fastening groove 2422. The fourth fastening groove 2422 is communicated with each fourth perforation 2423. The at least two fourth signal terminals 2415 penetrate through the at least one fourth protruding portion 2424 along the longitudinal direction. The at least one fourth protruding portion 2424 is blocked among the at least two fourth signal terminals 2415 and the fourth conductive film 243.

A middle of a bottom surface of the fourth base body 242 is recessed upward to form the fourth fastening groove 2422. The fourth conductive film 243 is disposed in the fourth fastening groove 2422 of the fourth base body 242. Two sides of the fourth base body 242 define the at least two fourth perforations 2423 penetrating through the top surface and the bottom surface of the fourth base body 242. The two sides of the fourth base body 242 define the two fourth perforations 2423 penetrating through the top surface and the bottom surface of the fourth base body 242. The fourth fastening groove 2422 is communicated with the two fourth perforations 2423. The plurality of the fourth fastening portions 2411 of the plurality of the fourth grounding terminals 2414 and the plurality of the fourth fastening portions 2411 of the plurality of the fourth signal terminals 2415 are partially exposed outside to the at least two fourth perforations 2423. In the preferred embodiment, the plurality of the fourth fastening portions 2411 of the plurality of the fourth grounding terminals 2414 and the plurality of the fourth signal terminals 2415 are partially exposed outside to the two fourth perforations 2423.

Several portions of a bottom of the fourth base body 242 extend downward to form the plurality of the fourth protruding portions 2424. Each fourth protruding portion 2424 is corresponding to the two adjacent fourth signal terminals 2415. Each fourth protruding portion 2424 surrounds the two adjacent fourth signal terminals 2415 along the longitudinal direction. The plurality of the fourth protruding portions 2424 are integrally molded in the fourth fastening groove 2422. The plurality of the fourth protruding portions 2424 are located at inner surfaces of a front end wall and a rear end wall of the fourth fastening groove 2422. The plurality of the fourth protruding portions 2424 are longitudinally arranged in two rows. Each row of the fourth protruding portions 2424 are arranged transversely. Each fourth protruding portion 2424 extends transversely. A middle of each fourth terminal 241 extends longitudinally. An extending direction of each fourth protruding portion 2424 is perpendicular to an extending direction of the middle of each fourth terminal 241. Two sides of the at least one fourth protruding portion 2424 define at least two fourth lacking grooves 2425. The at least two fourth grounding terminals 2414 are fastened in the at least two fourth lacking grooves 2425. The fourth conductive film 243 is mounted under the at least one fourth protruding portion 2424. The at least one fourth protruding portion 2424 is blocked among the fourth conductive film 243 and the at least two fourth signal terminals 2415. The fourth conductive film 243 is isolated from the at least two fourth signal terminals 2415 by the at least one fourth protruding portion 2424.

Referring to FIG. 1 to FIG. 21, bottom surfaces of the fourth fastening portions 2411 of the plurality of the fourth signal terminals 2415 are partially surrounded by the plurality of the fourth protruding portions 2424. The fourth base body 242 has a plurality of fourth lacking grooves 2425. Each fourth protruding portion 2424 is located between two adjacent fourth lacking grooves 2425. The plurality of the fourth grounding terminals 2414 are partially corresponding to the plurality of the fourth lacking grooves 2425. The plurality of the fourth grounding terminals 2414 are partially disposed in the plurality of the fourth lacking grooves 2425 of the fourth base body 242. Six fourth grounding terminals

2414 are buckled in the plurality of the fourth lacking grooves 2425. The middle fourth grounding terminal 2414 is surrounded by a middle of the fourth base body 242. Each fourth protruding portion 2424 is clamped between two of the plurality of the fourth grounding terminals 2414.

The fourth conductive film 243 is disposed in the fourth fastening groove 2422. The fourth conductive film 243 has a fourth metal layer 2431 and a plurality of fourth ribs 2432. The fourth conductive film 243 is adhered to bottom surfaces of the plurality of the fourth protruding portions 2424 along shapes of the plurality of the fourth protruding portions 2424. The fourth conductive film 243 covers inner walls of the plurality of the fourth lacking grooves 2425 along shapes of the plurality of the fourth lacking grooves 2425. The fourth conductive film 243 is covered to middles of the plurality of the fourth signal terminals 2415. The fourth conductive film 243 is adhered to bottom surfaces of the fourth fastening portions 2411 of the plurality of the fourth grounding terminals 2414. The fourth conductive film 243 is adhered to the bottom surfaces of the fourth fastening portions 2411 of the six fourth grounding terminals 2414. At least two portions of the fourth metal layer 2431 of the fourth conductive film 243 project into the at least two fourth lacking grooves 2425. The fourth metal layer 2431 is electrically connected with the at least two fourth grounding terminals 2414 to form the grounding structure. Corresponding portions of the fourth metal layer 2431 of the fourth conductive film 243 project into the plurality of the fourth lacking grooves 2425 of the fourth base body 242 along the shapes of the plurality of the fourth lacking grooves 2425. The corresponding portions of the fourth metal layer 2431 of the fourth conductive film 243 are electrically connected with the bottom surfaces of the fourth fastening portions 2411 of the plurality of the fourth grounding terminals 2414 in the two fourth perforations 2423 to make the plurality of the fourth grounding terminals 2414 form the grounding structure 26. The corresponding portions of the fourth conductive film 243 are electrically connected with the bottom surfaces of the fourth fastening portions 2411 of the six fourth grounding terminals 2414 to make the six fourth grounding terminals 2414 form the grounding structure 26. In this way, the signal noise is able to be effectively absorbed and suppressed for improving the transmission quality of the high-frequency signal.

The plurality of the fourth protruding portions 2424 are blocked among the fourth conductive film 243 and the fourth fastening portions 2411 of the plurality of the fourth signal terminals 2415, so that the fourth conductive film 243 is prevented from contacting the fourth fastening portions 2411 of the plurality of the fourth signal terminals 2415. The bottom surfaces of the fourth fastening portions 2411 of the plurality of the fourth grounding terminals 2414 are partially exposed to the plurality of the fourth lacking grooves 2425.

Referring to FIG. 1 to FIG. 28, the high-speed connector 100 in accordance with the second preferred embodiment of the present invention is shown. Differences between the high-speed connector 100 in accordance with the first preferred embodiment and the high-speed connector 100 in accordance with the second preferred embodiment are described as follows. In the second preferred embodiment, several portions of a bottom of the fourth base body 242 extend downward to form the plurality of the fourth protruding portions 2424. The fourth base body 242 has the plurality of the fourth lacking grooves 2425. The plurality of the fourth protruding portions 2424 are integrally molded in the fourth fastening groove 2422. The plurality of the fourth protruding portions 2424 are transversely arranged in a row.

The plurality of the fourth protruding portions 2424 are transversely arranged in two groups. In each group of the fourth protruding portions 2424, each two adjacent fourth lacking grooves 2425 are isolated by two fourth protruding portions 2424. The two fourth protruding portions 2424 clamp the two adjacent fourth signal terminals 2415. The plurality of the fourth protruding portions 2424 are longitudinally extended in the fourth fastening groove 2422. Each fourth protruding portion 2424 extends longitudinally. A front end and a rear end of each fourth protruding portion 2424 are connected to the inner surfaces of the front end wall and the rear end wall of the fourth fastening groove 2422, respectively. An extending direction of each fourth protruding portion 2424 and the extending direction of the middle of each fourth terminal 241 are the same. The plurality of the fourth grounding terminals 2414 are partially fastened in the plurality of the fourth lacking grooves 2425. Each fourth protruding portion 2424 is located between one fourth grounding terminal 2414 and one fourth signal terminal 2415. The plurality of the fourth protruding portions 2424 are blocked among the fourth conductive film 243 and the plurality of the fourth signal terminals 2415.

Each fourth protruding portion 2424 has a fourth restricting portion 2426 and a fourth blocking portion 2427. One side of each fourth protruding portion 2424 is recessed upward to form the fourth restricting portion 2426. The other side of each fourth protruding portion 2424 protrudes downward to form the fourth blocking portion 2427. Bottom spaces of each two facing fourth restricting portions 2426 of two fourth protruding portions 2424 extend towards each other to form a fourth interval 2428. Each fourth blocking portion 2427 is located between one fourth grounding terminal 2414 and one fourth signal terminal 2415. Each fourth interval 2428 accommodates the two adjacent fourth signal terminals 2415.

In the second preferred embodiment, the plurality of the fourth signal terminals 2415 are disposed corresponding to the plurality of the fourth restricting portions 2426 of the plurality of the fourth protruding portions 2424. The plurality of the fourth signal terminals 2415 are disposed under the plurality of the fourth restricting portions 2426 of the plurality of the fourth protruding portions 2424. The plurality of the fourth grounding terminals 2414 are disposed corresponding to the plurality of the fourth blocking portions 2427. The plurality of the fourth grounding terminals 2414 are disposed away from the plurality of the fourth restricting portions 2426 of the plurality of the fourth protruding portions 2424. The plurality of the fourth grounding terminals 2414 project into the fourth lacking grooves 2425 among the plurality of the fourth protruding portions 2424. The six fourth grounding terminals 2414 project into the six fourth lacking grooves 2425 among the plurality of the fourth protruding portions 2424. The plurality of the fourth restricting portions 2426 of the plurality of the fourth protruding portions 2424 are blocked among the fourth conductive film 243 and the fourth fastening portions 2411 of the plurality of the fourth signal terminals 2415. The fourth conductive film 243 is isolated from the fourth fastening portions 2411 of the plurality of the fourth signal terminals 2415 by the plurality of the fourth restricting portions 2426 of the plurality of the fourth protruding portions 2424, so that the fourth conductive film 243 is prevented from contacting the fourth fastening portion 2411 of the plurality of the fourth signal terminals 2415. The bottom surfaces of the fourth fastening portions 2411 of the plurality of the fourth signal terminals 2415 are partially blocked by the plurality of the fourth restricting portions 2426 of the plurality of the fourth protruding portions 2424.

Referring to FIG. 1 to FIG. 28, an exploded view of the fourth terminal assembly 24 in accordance with the second preferred embodiment of the present invention is shown. The fourth conductive film 243 is disposed on the fourth base body 242. In the concrete implementation, the fourth conductive film 243 is adhered to top surfaces of the plurality of the fourth protruding portions 2424 along shapes of the plurality of the fourth protruding portions 2424. The fourth conductive film 243 is covered to the middles of the plurality of the fourth signal terminals 2415. The fourth conductive film 243 is adhered to top surfaces of the fourth fastening portions 2411 of the plurality of the fourth grounding terminals 2414. The fourth conductive film 243 is adhered to the top surfaces of the fourth fastening portions 2411 of the six fourth grounding terminals 2414 along the shapes of the six fourth grounding terminals 2414. The plurality of the fourth protruding portions 2424 are blocked among the fourth conductive film 243 and the fourth fastening portions 2411 of the plurality of the fourth signal terminals 2415, so that the fourth conductive film 243 is prevented from contacting the fourth fastening portions 2411 of the plurality of the fourth signal terminals 2415.

The corresponding portions of the fourth conductive film 243 are electrically connected with the top surfaces of the fourth fastening portions 2411 of the plurality of the fourth grounding terminals 2414 to make the plurality of the fourth grounding terminals 2414 form the grounding structure 26. The corresponding portions of the fourth conductive film 243 are electrically connected with the top surfaces of the fourth fastening portions 2411 of the six fourth grounding terminals 2414 to make the six fourth grounding terminals 2414 form the grounding structure 26.

The fourth metal layer 2431 is located at a bottom surface of the fourth conductive film 243. Several portions of a lower surface of the fourth conductive film 243 extend downward to form the plurality of the fourth ribs 2432. A quantity of the plurality of the fourth ribs 2432 is six. The plurality of the fourth ribs 2432 project into the plurality of the fourth lacking grooves 2425. The six fourth grounding terminals 2414 are corresponding to the six fourth ribs 2432. The top surfaces of the fourth fastening portions 2411 of the six fourth grounding terminals 2414 contact with bottom surfaces of the six fourth ribs 2432 to form the grounding structure 26. In this way, the signal noise is able to be effectively absorbed and suppressed for improving the transmission quality of the high-frequency signal. The fourth metal layer 2431 is designed to be the pattern 28 with the plurality of the pores 25, the shapes of the plurality of the pores 25 of the pattern 28 of the fourth metal layer 2431 are the same. The plurality of the pores 25 are formed by the plurality of the interlaced lines 27 spread on the bottom surface of the fourth conductive film 243, so the signals partially penetrate through the plurality of the pores 25 of the fourth metal layer 2431, and the signals are partially reflected by the fourth metal layer 2431.

The pattern 28 of the fourth metal layer 2431 is capable of reducing the resonance point. Thus, the oscillation reflection affects smaller in the high frequency characteristic in the high frequency characteristic of the high-speed connector 100, so the oscillation is reduced to improve the high frequency characteristic of the high-speed connector 100. The high-speed connector 100 is capable of improving the far-end crosstalk, the near-end crosstalk, the insertion loss and the return loss, so the performances of the far-end crosstalk, the near-end crosstalk, the insertion loss and the return loss are better.

The pattern 28 of the fourth metal layer 2431 is without being limited to the shape in accordance with the first preferred embodiment and the second preferred embodiment of the present invention. In the concrete implementation, the plurality of the pores 25 of the pattern 28 of the fourth metal layer 2431 are able to be the different shapes. Each pore 25 is shown as the square shape. In practice, each pore 25 is any shape, and the pattern 28 is any shape. In the concrete implementation, the pattern 28 is able to be composed by the at least two groups of the pores 25, and the plurality of the pores 25 of the at least two groups are different. When the pattern 28 is composed by the two groups of the pores 25, each pore 25 of the one group is shown as the oval shape, and each pore 25 of the other group is shown as a diamond shape.

The fourth metal layer 2431 is formed on the bottom surface of the fourth conductive film 243 by the electroplating technology and the laser engraving technology etc. The fourth metal layer 2431 is formed on the bottom surface of the fourth conductive film 243 by the evaporation technology. The pattern 28 of the first metal layer 2131, the pattern 28 of the second metal layer 2231, the pattern 28 of the third metal layer 2331 and the pattern 28 of the fourth metal layer 2431 are different. The pattern 28 of the fourth metal layer 2431 is able to be cooperated with an overall structure of the fourth terminal assembly 24 to be designed.

The third terminal assembly 23 and the fourth terminal assembly 24 are disposed between the first terminal assembly 21 and the second terminal assembly 22. The plurality of the third soldering portions 2314 of the third terminal assembly 23 and the plurality of the fourth soldering portions 2413 of the fourth terminal assembly 24 are disposed among the plurality of the first soldering portions 2115 of the first terminal assembly 21 and the plurality of the second soldering portions 2214 of the second terminal assembly 22. The plurality of the third soldering portions 2314 of the third terminal assembly 23 are disposed among the plurality of the first soldering portions 2115 of the first terminal assembly 21 and the plurality of the fourth soldering portions 2413 of the fourth terminal assembly 24. The plurality of the fourth soldering portions 2413 of the fourth terminal assembly 24 are disposed among the plurality of the second soldering portions 2214 of the second terminal assembly 22 and the plurality of the third soldering portions 2314 of the third terminal assembly 23.

A front of the first holding element 214 of the first terminal assembly 21 abuts against a rear of the second holding element 234 of the third terminal assembly 23. The bottom surface of the third base body 232 of the third terminal assembly 23 abuts against a top of the fourth base body 242 of the fourth terminal assembly 24. A front of the fourth base body 242 of the fourth terminal assembly 24 abuts against a rear of the second base body 222 of the second terminal assembly 22.

The pattern 28 of the first metal layer 2131 of the first terminal assembly 21, the pattern 28 of the second metal layer 2231 of the second terminal assembly 22, the pattern 28 of the third metal layer 2331 of the third terminal assembly 23 and the pattern 28 of the fourth metal layer 2431 of the fourth terminal assembly 24 are the same and have the plurality of the pores 25. Shapes of the first metal layer 2131, the second metal layer 2231, the third metal layer 2331 and the fourth metal layer 2431 are without being limited.

In practice, the first metal layer 2131 of the first terminal assembly 21, the second metal layer 2231 of the second terminal assembly 22, the third metal layer 2331 of the third terminal assembly 23 and the fourth metal layer 2431 of the fourth terminal assembly 24 are any shape.

As described above, the first conductive film 213, the second conductive film 223, the third conductive film 233 and the fourth conductive film 243 of the terminal module 2 are adhered to the plurality of the first protruding portions 2124, the second protruding portions 2223, the third protruding portions 2325 and the fourth protruding portions 2424. The first metal layer 2131 of the first terminal assembly 21 contacts the first grounding terminals 2116 in the plurality of the first lacking grooves 2125, the second metal layer 2231 of the second terminal assembly 22 contacts the second grounding terminals 2215 in the plurality of the second lacking grooves 2224, the third metal layer 2331 of the third terminal assembly 23 contacts the third grounding terminals 2315 in the plurality of the third lacking grooves 2326, and the fourth metal layer 2431 of the fourth terminal assembly 24 contacts the fourth grounding terminals 2414 in the plurality of the fourth lacking grooves 2425 to form the grounding structure 26. Furthermore, the pattern 28 of each of the first metal layer 2131 of the first terminal assembly 21, the second metal layer 2231 of the second terminal assembly 22, the third metal layer 2331 of the third terminal assembly 23 and the fourth metal layer 2431 of the fourth terminal assembly 24 has the plurality of the same pores 25 or the plurality of the different pores 25. So the signals partially penetrate through the first conductive film 213, the second conductive film 223, the third conductive film 233 and the fourth conductive film 243, and the signals are partially reflected by the first conductive film 213, the second conductive film 223, the third conductive film 233 and the fourth conductive film 243. As a result, the pattern 28 of the fourth metal layer 2431 of the high-speed connector 100 is capable of reducing the resonance point, the high-speed connector 100 is capable of improving the far-end crosstalk, the near-end crosstalk, the insertion loss and the return loss, so the performances of the far-end crosstalk, the near-end crosstalk, the insertion loss and the return loss are better.

What is claimed is:

1. A high-speed connector, comprising:

an insulating housing; and a first terminal assembly mounted in the insulating housing, the first terminal assembly including a plurality of first terminals, a first base body and a first conductive film, the plurality of the first terminals being fastened to the first base body, the first conductive film being disposed under the first base body, the plurality of the first terminals including at least two first grounding terminals and at least two first signal terminals, each two adjacent first signal terminals being located between two first grounding terminals, a middle of a bottom surface of the first base body being recessed upward to form a first fastening groove, the first conductive film being disposed in the first fastening groove, at least one portion of a bottom of the first base body extending downward to form at least one first protruding portion, two sides of the at least one first protruding portion defining at least two first lacking grooves, the at least one first protruding portion being integrally molded in the first fastening groove, the at least two first signal terminals penetrating through the at least one first protruding portion along a longitudinal direction, the at least two first grounding terminals being fastened in the at least two first lacking grooves, the first conductive film being covered to the at least one first protruding portion, the at least one first protruding portion being blocked among the first conductive film and the at least two first signal terminals, the first conductive film having a first metal layer, the first metal layer being located at a top surface of the first conductive film, the first metal layer being a pattern with a plurality of pores, the plurality of the pores being formed by a plurality of interlaced lines, at least two portions of the first metal layer of the first conductive film projecting into the at least two first lacking grooves, the first metal layer being electrically connected with the at least two first grounding terminals to form a grounding structure.

2. The high-speed connector as claimed in claim 1, wherein several portions of the bottom of the first base body extend downward to form a plurality of the first protruding portions, the plurality of the first protruding portions are integrally molded in the first fastening groove, the plurality of the first protruding portions are arranged in three rows, the plurality of the first protruding portions are located at a front end, a middle and a rear end of the first fastening groove, each row of the first protruding portions are arranged transversely, each first protruding portion extends transversely, a middle of each first terminal extends longitudinally, an extending direction of each first protruding portion is perpendicular to an extending direction of the middle of each first terminal, each first protruding portion is corresponding to two first signal terminals, the two first signal terminals penetrate through one first protruding portion along the longitudinal direction, each two adjacent first protruding portions are spaced from each other to form the first lacking groove, each first grounding terminal is corresponding to one first lacking groove, each first grounding terminal is buckled in the one first lacking groove, the first conductive film is adhered to bottom surfaces of the plurality of the first protruding portions along a shape of each first protruding portion, and the first conductive film covers inner walls of the plurality of the first lacking grooves of the first base body along a shape of each first lacking groove.

3. The high-speed connector as claimed in claim 1, wherein each first terminal has a first fastening portion, a front end of the first fastening portion is bent downward to form a first stepping portion, a front end of the first stepping portion extends frontward and then is arched downward to form a first contact portion, the first contact portion of each first terminal projects beyond a front surface of the first base body, a rear end of the first fastening portion extends rearward, then slantwise extends downward and rearward, and further extends downward to form a first bending portion, the first bending portion of each first terminal projects beyond a rear surface of the first base body, a tail end of the first bending portion is bent rearward and extends rearward to form a first soldering portion, the plurality of the first soldering portions of the plurality of the first terminals are soldered to a first soldering zone of a circuit board.

4. The high-speed connector as claimed in claim 3, wherein two sides of the first base body define a plurality of first perforations penetrating through a top surface and the bottom surface of the first base body, the plurality of the first terminals include a plurality of the first grounding terminals and a plurality of the first signal terminals, the first fastening portions of the plurality of the first grounding terminals and the first fastening portions of the plurality of the first signal terminals are partially exposed outside to the plurality of the first perforations.

5. The high-speed connector as claimed in claim 3, wherein the first base body surrounds the front ends and rear ends of the plurality of the first fastening portions and the plurality of the first stepping portions of the plurality of the first terminals, a middle of a rear end of the bottom surface of the first base body extends downward to form a protrusion, two sides of the first base body define four first perforations penetrating through a top surface and the bottom surface of the first base body, the first fastening groove is communicated with each first perforation, the plurality of the first terminals include a plurality of the first grounding terminals and a plurality of the first signal terminals, the plurality of the first fastening portions of the plurality of the first grounding terminals and the plurality of the first fastening portions of the plurality of the first signal terminals are partially exposed outside to the four first perforations.

6. The high-speed connector as claimed in claim 5, wherein the first metal layer of the first conductive film is electrically connected to the first fastening portions of the plurality of the first grounding terminals to make the plurality of the first grounding terminals form the grounding structure.

7. The high-speed connector as claimed in claim 5, further comprising a second terminal assembly corresponding to the first terminal assembly along an up-down direction, the second terminal assembly including a plurality of second terminals, a second base body and a second conductive film, the plurality of the second terminals being fastened to the second base body, the plurality of the second terminals including a plurality of second grounding terminals and a plurality of second signal terminals, each two adjacent second signal terminals being located between two second grounding terminals, each second terminal having a second fastening portion, a front end of the second fastening portion being bent upward to form a second stepping portion, the second stepping portion of each second terminal being disposed in a front end of the second base body, a front end of the second stepping portion extending frontward and then being arched upward to form a second contact portion, the second contact portion of each second terminal projecting beyond a front surface of the second base body, a rear end of the second fastening portion being bent downward and then extending rearward to form a second soldering portion, the plurality of the second soldering portions of the plurality of the second terminals being soldered to a second soldering zone of the circuit board.

8. The high-speed connector as claimed in claim 7, wherein lengths of the plurality of the first fastening portions of the plurality of the first terminals are longer than lengths of the plurality of the second fastening portions of the plurality of the second terminals, lengths of the plurality of the first stepping portions of the plurality of the first terminals and lengths of the plurality of the second stepping portions of the plurality of the second terminals are the same along the longitudinal direction, lengths of the plurality of the first contact portions of the plurality of the first terminals and lengths of the plurality of the second contact portions of the plurality of the second terminals are the same along the longitudinal direction.

9. The high-speed connector as claimed in claim 8, wherein the second base body surrounds the plurality of the second fastening portions and the plurality of the second stepping portions of the plurality of the second terminals, a middle of a top surface of the second base body is recessed downward to form a second fastening groove, the second conductive film is disposed in the second fastening groove, several portions of a top of the second base body extend upward to form a plurality of second protruding portions, and the plurality of the second protruding portions are integrally molded in the second fastening groove, the plurality of the second protruding portions are located at a front end wall and a rear end wall of the second fastening groove, the plurality of the second protruding portions are arranged in two rows, each row of the second protruding portions are arranged transversely, an extending direction of each second protruding portion is perpendicular to an extending direction of a middle of each second terminal, each second protruding portion is corresponding to two second signal terminals, the two second signal terminals penetrate through one second protruding portion along the longitudinal direction, each two adjacent second protruding portions are spaced from each other to form a second lacking groove, the plurality of the second grounding terminals are fastened in the plurality of the second lacking grooves, the second conductive film is adhered to top surfaces of the plurality of the second protruding portions along a shape of each second protruding portion and a shape of each second lacking groove, the second conductive film covers inner walls of the plurality of the second lacking grooves along the shape of each second lacking groove, two sides of the second base body define two second perforations penetrating through the top surface and a bottom surface of the second base body, the second fastening groove is communicated with each second perforation, the second fastening portions of the plurality of the second grounding terminals and the second fastening portions of the plurality of the second signal terminals are partially exposed outside to the two second perforations, the plurality of the second protruding portions are blocked among the second conductive film and the plurality of the second signal terminals, the second conductive film has a second metal layer, the second metal layer is designed to be the pattern with the plurality of the pores, the plurality of the pores are formed by the plurality of the interlaced lines, corresponding portions of the second conductive film project into the plurality of the second lacking grooves among the plurality of the second protruding portions, the corresponding portions of the second conductive film are electrically connected with the second fastening portions of the plurality of the second grounding terminals to make the plurality of the second grounding terminals form the grounding structure.

10. The high-speed connector as claimed in claim 9, further comprising a third terminal assembly and a fourth terminal assembly, the third terminal assembly being corresponding to the first terminal assembly and the fourth terminal assembly, the third terminal assembly including a plurality of third terminals, a third base body, a third conductive film and a second holding element, the plurality of the third terminals being fastened to the third base body, the third conductive film being disposed under the third base body, rear ends of the plurality of the third terminals being surrounded by the second holding element, the plurality of the third terminals including a plurality of third grounding terminals and a plurality of third signal terminals, each two adjacent third signal terminals being located between two third grounding terminals, a rear end of a top surface of the third base body being recessed inward to form a location portion, the protrusion being used for being fastened to the location portion, a middle of a bottom surface of the third base body being recessed upward to form a third fastening groove, the third conductive film being disposed in the third fastening groove, two sides of the third base body defining two third perforations penetrating through the top surface and the bottom surface of the third base body, the third fastening groove being communicated with each third perforation, the plurality of the third grounding terminals and the plurality of the third signal terminals being exposed outside to the two third perforations, several portions of a bottom of the third base body extending downward to form a plurality of third protruding portions, the plurality of the third signal terminals penetrating through the plurality of the third protruding portions along the longitudinal direction, the plurality of the third protruding portions being located at inner surfaces of a front end wall and a rear end wall of the third fastening groove, the plurality of the third protruding portions being blocked among the third conductive film and the plurality of the third signal terminals, the third base body having a plurality of third lacking grooves, each third protruding portion being located between two third lacking grooves, the plurality of the third grounding terminals being fastened in the plurality of the third lacking grooves, corresponding portions of the third conductive film projecting into the plurality of the third lacking grooves, the corresponding portions of the third conductive film being electrically connected with the plurality of the third grounding terminals in the two third perforations to make the plurality of the third grounding terminals form the grounding structure.

11. The high-speed connector as claimed in claim 10, wherein the fourth terminal assembly is corresponding to an upper portion of the third terminal assembly along the up-down direction, the fourth terminal assembly is corresponding to a lower portion of the third terminal assembly along the longitudinal direction, the fourth terminal assembly includes a plurality of fourth terminals, a fourth base body and a fourth conductive film, the plurality of the fourth terminals are fastened to the fourth base body, the plurality of the fourth terminals include a plurality of fourth grounding terminals and a plurality of fourth signal terminals, each two adjacent fourth signal terminals are located between two fourth grounding terminals, a middle of a bottom surface of the fourth base body is recessed upward to form a fourth fastening groove, the fourth conductive film is disposed in the fourth fastening groove, two sides of the fourth base body define two fourth perforations penetrating through a top surface and the bottom surface of the fourth base body, the plurality of the fourth grounding terminals and the plurality of the fourth signal terminals are partially exposed outside to the two fourth perforations, the fourth fastening groove is communicated with the two fourth perforations, several portions of a bottom of the fourth base body extend downward to form a plurality of fourth protruding portions, the plurality of the fourth protruding portions are located at inner surfaces of a front end wall and a rear end wall of the fourth fastening groove, two adjacent fourth signal terminals penetrate through one fourth protruding portion along the longitudinal direction, the plurality of the fourth protruding portions are blocked among the fourth conductive film and the plurality of the fourth signal terminals, the fourth base body has a plurality of fourth lacking grooves, each fourth protruding portion is located between each two adjacent fourth lacking grooves, the plurality of the fourth grounding terminals are partially disposed in the plurality of the fourth lacking grooves, corresponding portions of the fourth conductive film project into the plurality of the fourth lacking grooves, the corresponding portions of the fourth conductive film are electrically connected with the plurality of the fourth grounding terminals in the two fourth perforations to make the plurality of the fourth grounding terminals form the grounding structure.

12. The high-speed connector as claimed in claim 11, wherein the insulating housing has a main portion and a penetrating groove, the penetrating groove penetrates through a middle of a front end of the main portion along the longitudinal direction, an inside of the main portion defines an accommodating space, the accommodating space penetrates through a bottom of a rear end of the main portion, several portions of the front end of the main portion of the insulating housing form a plurality of terminal slots, the plurality of the terminal slots are communicated with an upper portion and a lower portion of the accommodating space, the plurality of the terminal slots are arranged in an upper row and a lower row, the plurality of the first contact portions of the plurality of the first terminals are disposed in the upper row of the terminal slots, bottom surfaces of the plurality of the first contact portions of the plurality of the first terminals are exposed out of bottoms of the upper row of the terminal slots and project into the penetrating groove, the plurality of the second contact portions of the plurality of the second terminals are disposed in the lower row of the plurality of the terminal slots, top surfaces of the plurality of the second contact portions of the plurality of the second terminals are exposed out of the lower row of the terminal slots and project into the penetrating groove, an assembling groove penetrates through a rear surface of the main portion, the assembling groove is located behind a rear end of the accommodating space, the assembling groove is communicated with the rear end of the accommodating space, front ends of the upper row and the lower row of the terminal slots are communicated with the penetrating groove, the penetrating groove is communicated with a front end of the accommodating space, the first terminal assembly, the second terminal assembly, the third terminal assembly and the fourth terminal assembly are inserted into the accommodating space from the assembling groove.

13. The high-speed connector as claimed in claim 1, wherein shapes of the plurality of the pores of the pattern are the same.

14. The high-speed connector as claimed in claim 1, wherein the plurality of the pores of the pattern are different shapes.

15. A high-speed connector, comprising:

an insulating housing;

a first terminal assembly mounted in the insulating housing, the first terminal assembly including a plurality of first terminals, a first base body and a first conductive film, the plurality of the first terminals being fastened to the first base body, the plurality of the first terminals including a plurality of first grounding terminals and a plurality of first signal terminals, a middle of a bottom surface of the first base body being recessed upward to form a first fastening groove, the first conductive film being disposed in the first fastening groove, several portions of a bottom of the first base body extending downward to form a plurality of first protruding portions, the plurality of the first protruding portions being arranged in three rows, the plurality of the first protruding portions being located at a front end, a middle and a rear end of the first fastening groove, each row of the first protruding portions being arranged transversely, each first protruding portion surrounding two adjacent first signal terminals along a longitudinal direction, the first conductive film being adhered to bottom surfaces of the plurality of the first protruding portions, the plurality of the first protruding portions being blocked among the first conductive film and the plurality of the first signal terminals, each two adjacent first protruding portions being spaced from each other to form a first lacking groove, each first grounding terminal being buckled in one first lacking groove, the first conductive film having a first metal layer, the first metal layer being located at a top surface of the first conductive film, the first metal layer being a pattern with a plurality of pores, corresponding portions of the first metal layer of the first conductive film projecting into the plurality of the first lacking grooves of the first base body, the corresponding portions of the first metal layer being electrically connected to the plurality of the first grounding terminals to make the plurality of the first grounding terminals form a grounding structure;

a second terminal assembly mounted in the insulating housing, the second terminal assembly being corresponding to the first terminal assembly along an up-down direction, the second terminal assembly including a plurality of second terminals, a second base body and a second conductive film, the plurality of the second terminals being fastened to the second base body, the plurality of the second terminals including a plurality of second grounding terminals and a plurality of second signal terminals, a middle of a top surface of the second base body being recessed downward to form a second fastening groove, the second conductive film being disposed in the second fastening groove, several portions of a top of the second base body extending upward to form a plurality of second protruding portions, the plurality of the second protruding portions being located at a front end wall and a rear end wall of the second fastening groove, the plurality of the second protruding portions being arranged in two rows, each row of the second protruding portions being arranged transversely, each second protruding portion surrounding two adjacent second signal terminals along the longitudinal direction, the second conductive film being adhered to top surfaces of the plurality of the second protruding portions, the plurality of the second protruding portions being blocked among the second conductive film and the plurality of the second signal terminals, each two adjacent second protruding portions being spaced from each other to form a second lacking groove, the plurality of the second grounding terminals being partially fastened in the plurality of the second lacking grooves of the second base body, the second conductive film having a second metal layer, the second metal layer being located at a bottom surface of the second conductive film, the second metal layer being the pattern with the plurality of the pores, corresponding portions of the second metal layer of the second conductive film projecting into the plurality of the second lacking grooves among the plurality of the second protruding portions, the corresponding portions of the second metal layer of the second conductive film being electrically connected with the plurality of the second grounding terminals to make the plurality of the second grounding terminals form the grounding structure;

a third terminal assembly mounted in the insulating housing, the third terminal assembly being corresponding to the first terminal assembly, the third terminal assembly including a plurality of third terminals, a third base body and a third conductive film, the plurality of the third terminals being fastened to the third base body, the plurality of the third terminals including a plurality of third grounding terminals and a plurality of third signal terminals, a middle of a bottom surface of the third base body being recessed upward to form a third fastening groove, the third conductive film being disposed in the third fastening groove, several portions of a bottom of the third base body extending downward to form a plurality of third protruding portions, the plurality of the third protruding portions being located at inner surfaces of a front end wall and a rear end wall of the third fastening groove, the plurality of the third protruding portions being arranged in two rows, each row of the third protruding portions being arranged transversely, each third protruding portion surrounding two adjacent third signal terminals along the longitudinal direction, the third conductive film being adhered to bottom surfaces of the plurality of the third protruding portions, the plurality of the third protruding portions being blocked among the third conductive film and the plurality of the third signal terminals, the third base body having a plurality of third lacking grooves, each third protruding portion being located between two adjacent third lacking grooves, the plurality of the third grounding terminals being partially fastened in the plurality of the third lacking grooves, the third conductive film having a third metal layer, the third metal layer being located at a top surface of the third conductive film, the third metal layer being the pattern with the plurality of the pores, corresponding portions of the third metal layer of the third conductive film projecting into the plurality of the third lacking grooves of the third base body, the corresponding portions of the third metal layer of the third conductive film being electrically connected with the plurality of the third grounding terminals to make the plurality of the third grounding terminals form the grounding structure; and a fourth terminal assembly mounted in the insulating housing, the fourth terminal assembly being corresponding to an upper portion of the third terminal assembly along the up-down direction, the fourth terminal assembly being corresponding to a lower portion of the third terminal assembly along the longitudinal direction, the fourth terminal assembly including a plurality of fourth terminals, a fourth base body and a fourth conductive film, the plurality of the fourth terminals being fastened to the fourth base body, the plurality of the fourth terminals including a plurality of fourth grounding terminals and a plurality of fourth signal terminals, a middle of a bottom surface of the fourth base body being recessed upward to form a fourth fastening groove, the fourth conductive film being disposed in the fourth fastening groove, several portions of a bottom of the fourth base body extending downward to form a plurality of fourth protruding portions, the plurality of the fourth protruding portions being located at inner surfaces of a front end wall and a rear end wall of the fourth fastening groove, the plurality of the fourth protruding portions being longitudinally arranged in two rows, each row of the fourth protruding portions being arranged transversely, each fourth protruding portion surrounding two adjacent fourth signal terminals along the longitudinal direction, the fourth conductive film being adhered to bottom surfaces of the plurality of the fourth protruding portions, the plurality of the fourth protruding portions being blocked among the fourth conductive film and the plurality of the fourth signal terminals, the fourth base body having a plurality of fourth lacking grooves, each fourth protruding portion being located between two adjacent fourth lacking grooves, the plurality of the fourth grounding terminals being partially disposed in the plurality of the fourth lacking grooves of the fourth base body, the fourth conductive film having a fourth metal layer, the fourth metal layer being located at a bottom surface of the fourth conductive film, the fourth metal layer being the pattern with the plurality of the pores, corresponding portions of the fourth metal layer of the fourth conductive film projecting into the plurality of the fourth lacking grooves of the fourth base body, the corresponding portions of the fourth metal layer of the fourth conductive film being electrically connected with the plurality of the fourth grounding terminals to make the plurality of the fourth grounding terminals form the grounding structure.

16. A high-speed connector, comprising:

an insulating housing;

a first terminal assembly mounted in the insulating housing, the first terminal assembly including a plurality of first terminals, a first base body and a first conductive film, the plurality of the first terminals being fastened to the first base body, the plurality of the first terminals including a plurality of first grounding terminals and a plurality of first signal terminals, a middle of a bottom surface of the first base body being recessed upward to form a first fastening groove, the first conductive film being disposed in the first fastening groove, several portions of a bottom of the first base body extending downward to form a plurality of first protruding portions, the plurality of the first protruding portions being transversely arranged in a row, the plurality of the first protruding portions being transversely arranged in two groups, in each group of the first protruding portions, each two adjacent first lacking grooves being isolated by two first protruding portions, the two first protruding portions clamping two adjacent first signal terminals, the plurality of the first protruding portions extending longitudinally in the first fastening groove, a front end and a rear end of each first protruding portion being connected to a front end wall and a rear end wall of the first fastening groove, respectively, the first base body having a plurality of first lacking grooves, the plurality of the first lacking grooves being disposed among the plurality of the first protruding portions, in each group of the first protruding portions, the plurality of the first grounding terminals being partially fastened in the plurality of the first lacking grooves, each first protruding portion being located between one first grounding terminal and one first signal terminal, the first conductive film being adhered to bottom surfaces of the plurality of first protruding portions, the plurality of the first protruding portions being blocked among the first conductive film and the plurality of the first signal terminals, the first conductive film having a first metal layer, the first metal layer being located at a top surface of the first conductive film, the first metal layer being a pattern with a plurality of pores, corresponding portions of the first metal layer projecting into the plurality of the first lacking grooves of the first base body, the corresponding portions of the first metal layer being electrically connected to the plurality of the first grounding terminals to make the plurality of the first grounding terminals form a grounding structure;

a second terminal assembly mounted in the insulating housing, the second terminal assembly being corresponding to the first terminal assembly along an up-down direction, the second terminal assembly including a plurality of second terminals, a second base body and a second conductive film, the plurality of the second terminals being fastened to the second base body, the plurality of the second terminals including a plurality of second grounding terminals and a plurality of second signal terminals, a middle of a top surface of the second base body being recessed downward to form a second fastening groove, the second conductive film being disposed in the second fastening groove, several portions of a top of the second base body extending upward to form a plurality of second protruding portions, the second base body having a plurality of second lacking grooves, the plurality of the second protruding portions being transversely arranged in a row, the plurality of the second protruding portions being longitudinally extended in the second fastening groove, a front end and a rear end of each second protruding portion being connected to a front end wall and a rear end wall of the second fastening groove, the plurality of the second protruding portions being transversely arranged in two groups, in each group of the second protruding portions, each two adjacent second lacking grooves being isolated by two second protruding portions, the two second protruding portions clamping two adjacent second signal terminals, the plurality of the second grounding terminals being partially fastened in the plurality of the second lacking grooves, each second protruding portion being located between one second grounding terminal and one second signal terminal, the second conductive film being adhered to top surfaces of the plurality of the second protruding portions, the plurality of the second protruding portions being blocked among the second conductive film and the plurality of the second signal terminals, the second conductive film having a second metal layer, the second metal layer being located at a bottom surface of the second conductive film, the second metal layer being the pattern with the plurality of the pores, corresponding portions of the second metal layer of the second conductive film projecting into the plurality of the second lacking grooves among the plurality of the second protruding portions, the corresponding portions of the second metal layer of the second conductive film being electrically connected with the plurality of the second grounding terminals to make the plurality of the second grounding terminals form the grounding structure;

a third terminal assembly mounted in the insulating housing, the third terminal assembly being corresponding to the first terminal assembly, the third terminal assembly including a plurality of third terminals, a third base body and a third conductive film, the plurality of the third terminals being fastened to the third base body, the plurality of the third terminals including a plurality of third grounding terminals and a plurality of third signal terminals, a middle of a bottom surface of the third base body being recessed upward to form a third fastening groove, the third conductive film being disposed in the third fastening groove, several portions of a bottom of the third base body extending downward to form a plurality of third protruding portions, the third base body having a plurality of third lacking grooves, the plurality of the third protruding portions being transversely arranged in a row, the plurality of the third protruding portions being longitudinally extended in the third fastening groove, front ends and rear ends of the plurality of the third protruding portions being connected to inner surfaces of a front end wall and a rear end wall of the third fastening groove, the plurality of the third protruding portions being transversely arranged in two groups, in each group of the third protruding portions, each two adjacent third lacking grooves being isolated by two third protruding portions, the two third protruding portions clamping two adjacent third signal terminals, the plurality of the third grounding terminals being partially fastened in the plurality of the third lacking grooves, each third protruding portion being located between one third grounding terminal and one third signal terminal, the third conductive film being adhered to bottom surfaces of the plurality of the third protruding portions, the plurality of the third protruding portions being blocked among the third conductive film and the plurality of the third signal terminals, the third conductive film having a third metal layer, the third metal layer being located at a top surface of the third conductive film, the third metal layer being the pattern with the plurality of the pores, corresponding portions of the third metal layer of the third conductive film projecting into the plurality of the third lacking grooves of the third base body, the corresponding portions of the third metal layer of the third conductive film being electrically connected with the plurality of the third grounding terminals to make the plurality of the third grounding terminals form the grounding structure; and a fourth terminal assembly mounted in the insulating housing, the fourth terminal assembly being corresponding to an upper portion of the third terminal assembly along the up-down direction, the fourth terminal assembly being corresponding to a lower portion of the third terminal assembly along the longitudinal direction, the fourth terminal assembly including a plurality of fourth terminals, a fourth base body and a fourth conductive film, the plurality of the fourth terminals being fastened to the fourth base body, the plurality of the fourth terminals including a plurality of fourth grounding terminals and a plurality of fourth signal terminals, a middle of a bottom surface of the fourth base body being recessed upward to form a fourth fastening groove, the fourth conductive film being disposed in the fourth fastening groove, several portions of a bottom of the fourth base body extending downward to form a plurality of fourth protruding portions, the fourth base body having a plurality of fourth lacking grooves, the plurality of the fourth protruding portions being transversely arranged in a row, the plurality of the fourth protruding portions being longitudinally extended in the fourth fastening groove, a front end and a rear end of each fourth protruding portion being connected to inner surfaces of a front end wall and a rear end wall of the fourth fastening groove, the plurality of the fourth protruding portions being transversely arranged in two groups, in each group of the fourth protruding portions, each two adjacent fourth lacking grooves being isolated by two fourth protruding portions, the two fourth protruding portions clamping two adjacent fourth signal terminals, the plurality of the fourth grounding terminals being partially fastened in the plurality of the fourth lacking grooves, each fourth protruding portion being located between one fourth grounding terminal and one fourth signal terminal, the fourth conductive film being adhered to top surfaces of the plurality of the fourth protruding portions, the plurality of the fourth protruding portions being blocked among the fourth conductive film and the plurality of the fourth signal terminals, the fourth conductive film having a fourth metal layer, the fourth metal layer being located at a bottom surface of the fourth conductive film, the fourth metal layer being the pattern with the plurality of the pores, corresponding portions of the fourth metal layer projecting into the plurality of the fourth lacking grooves of the fourth base body, the corresponding portions of the fourth metal layer being electrically connected with the plurality of the fourth grounding terminals to make the plurality of the fourth grounding terminals form the grounding structure.

17. The high-speed connector as claimed in claim 16, wherein the plurality of the first protruding portions are integrally molded in the first fastening groove, an extending direction of each first protruding portion and an extending direction of a middle of each first terminal are the same, one side of each first blocking portion is recessed inward to form a first restricting portion, the other side of each first protruding portion extends upward to form a first blocking portion, top spaces of each two facing first restricting portions of the two first protruding portions extend towards each other to form a first interval, each first blocking portion is disposed between the one first grounding terminal and the one first signal terminal, each first interval accommodates the two adjacent first signal terminals, the plurality of the first signal terminals are disposed on the plurality of the first restricting portions, the plurality of the first grounding terminals are disposed away from the plurality of the first restricting portions, the plurality of the first restricting portions of the plurality of first protruding portions are blocked among the first conductive film and the plurality of the first signal terminals.

18. The high-speed connector as claimed in claim 17, wherein the plurality of the second protruding portions are integrally molded in the second fastening groove, an extending direction of each second protruding portion and an extending direction of a middle of each second terminal are the same, one side of each second protruding portion protrudes downward to form a second blocking portion, the other side of each second protruding portion is recessed upward to form a second restricting portion, bottom spaces of each two facing second restricting portions of the two second protruding portions extend towards each other to form a second interval, each second blocking portion is located between the one second grounding terminal and the one second signal terminal, each second interval accommodates the two adjacent second signal terminals, the plurality of the second signal terminals are located under the plurality of the second restricting portions of the plurality of the second protruding portions, the plurality of the second grounding terminals are disposed away from the plurality of the second restricting portions of the plurality of the second protruding portions, the plurality of the second restricting portions of the plurality of the second protruding portions are blocked among the second conductive film and the plurality of the second signal terminals.

19. The high-speed connector as claimed in claim 18, wherein the plurality of the third protruding portions are integrally molded in the third fastening groove, an extending direction of each third protruding portion and an extending direction of a middle of each third terminal are the same, one side of each third protruding portion is recessed downward to form a third restricting portion, the other side of each third protruding portion protrudes upward to form a third blocking portion, top spaces of each two facing third restricting portions of the two third protruding portions extend towards each other to form a third interval, each third blocking portion is located between the one third grounding terminal and the one third signal terminal, each third interval accommodates the two adjacent third signal terminals, the plurality of the third signal terminals are mounted on the plurality of the third restricting portions of the plurality of the third protruding portions, the plurality of the third grounding terminals are disposed away from the plurality of the third restricting portions of the plurality of the third protruding portions, the plurality of the third restricting portions of the plurality of the third protruding portions are blocked among the third conductive film and the plurality of the third signal terminals.

20. The high-speed connector as claimed in claim 19, wherein the plurality of the fourth protruding portions are integrally molded in the fourth fastening groove, an extending direction of each fourth protruding portion and an extending direction of a middle of each fourth terminal are the same, one side of each fourth protruding portion is recessed upward to form a fourth restricting portion, the other side of each fourth protruding portion protrudes downward to form a fourth blocking portion, bottom spaces of each two facing fourth restricting portions of the two fourth protruding portions extend towards each other to form a fourth interval, each fourth blocking portion is located between the one fourth grounding terminal and the one fourth signal terminal, each fourth interval accommodates the two adjacent fourth signal terminals, the plurality of the fourth signal terminals are disposed under the plurality of the fourth restricting portions of the plurality of the fourth protruding portions, the plurality of the fourth grounding terminals are disposed away from the plurality of the fourth restricting portions of the plurality of the fourth protruding portions, the plurality of the fourth restricting portions of the plurality of the fourth protruding portions are blocked among the fourth conductive film and the plurality of the fourth signal terminals.

* * * * *